(12) United States Patent
Oh et al.

(10) Patent No.: US 9,961,564 B2
(45) Date of Patent: May 1, 2018

(54) TERMINAL IN COMMUNICATION SYSTEM AND METHOD FOR CONTROLLING SAME

(75) Inventors: Seong-Keun Oh, Gyeonggi-do (KR); Min Lee, Gyeonggi-do (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 13 days.

(21) Appl. No.: 14/238,684

(22) PCT Filed: Aug. 10, 2012

(86) PCT No.: PCT/KR2012/006390
§ 371 (c)(1),
(2), (4) Date: Feb. 12, 2014

(87) PCT Pub. No.: WO2013/025015
PCT Pub. Date: Feb. 21, 2013

(65) Prior Publication Data
US 2014/0206414 A1    Jul. 24, 2014

(30) Foreign Application Priority Data
Aug. 12, 2011 (KR) .................. 10-2011-0080893

(51) Int. Cl.
*H04B 7/00* (2006.01)
*H04W 16/28* (2009.01)
(Continued)

(52) U.S. Cl.
CPC ............ *H04W 16/28* (2013.01); *H04B 7/022* (2013.01); *H04B 7/0404* (2013.01);
(Continued)

(58) Field of Classification Search
CPC .. H04B 7/0686; H04B 7/0689; H04B 7/0691; H04W 36/00; H04W 36/0066; H04W 36/36; H04W 88/10
(Continued)

(56) References Cited

U.S. PATENT DOCUMENTS 5,970,408 A * 10/1999 Carlsson ............... H04W 36/36
                                                          455/11.1
7,558,603 B2 * 7/2009 Kadel ..................... H04L 67/12
                                                          370/332
(Continued)

FOREIGN PATENT DOCUMENTS

EP       2 291 048 A1     3/2011
KR    1020080021494       3/2008
(Continued)

OTHER PUBLICATIONS

European Search Report dated Feb. 5, 2015, issued to European Application No. 12 82 3529.
(Continued)

*Primary Examiner* — Duc M Nguyen
(74) *Attorney, Agent, or Firm* — Stein IP, LLC

(57) ABSTRACT

A terminal for communicating with at least one communication device is disclosed. A terminal according to the present invention comprises an antenna unit having at least one antenna; and a controlling unit for: determining at least one communication device; determining an antenna individual operation mode of each of the at least one antennas; determining at least one antenna for communication with each of the at least one communication devices from among the at least one antennas; determining a combination operation mode of an antenna set which includes at least two antennas for each of some or all of the communication devices performing communication using the antenna set when communication is performed using at least two anten-
(Continued)

nas for each of some or all of the at least one communication devices; and controlling transmission and reception of data with at least one communication device by using at least one antenna for communication with each of the at least one communication devices according to an antenna individual operation mode of each antenna or to the antenna individual operation mode of each antenna and a combination operation mode of an antenna set for each communication device.

14 Claims, 41 Drawing Sheets

(51) Int. Cl.
*H04B 7/0404* (2017.01)
*H04W 88/10* (2009.01)
*H04B 7/08* (2006.01)
*H04B 7/022* (2017.01)
*H04W 36/00* (2009.01)
*H04B 7/06* (2006.01)

(52) U.S. Cl.
CPC ......... *H04B 7/0689* (2013.01); *H04B 7/0871* (2013.01); *H04W 88/10* (2013.01); *H04B 7/0617* (2013.01); *H04B 7/0669* (2013.01); *H04B 7/0671* (2013.01); *H04W 36/0027* (2013.01)

(58) Field of Classification Search
USPC ...... 455/436, 440–444, 561, 562.1; 375/260, 375/267
See application file for complete search history.

(56) References Cited

U.S. PATENT DOCUMENTS

| | | | | |
|---|---|---|---|---|
| 7,904,085 B2* | 3/2011 | Nakata | | H04B 7/08 455/132 |
| 8,489,093 B2* | 7/2013 | Souissi | | H04W 36/14 370/331 |
| 9,288,688 B2* | 3/2016 | Kim | | H04W 16/28 |
| 2002/0122383 A1* | 9/2002 | Wu et al. | | 370/210 |
| 2002/0132600 A1* | 9/2002 | Rudrapatna | | H01Q 1/246 455/277.1 |
| 2002/0142796 A1* | 10/2002 | Sutton | | H04B 1/406 455/553.1 |
| 2003/0017833 A1* | 1/2003 | Forrester | | H04B 7/022 455/456.1 |
| 2003/0125040 A1* | 7/2003 | Walton et al. | | 455/454 |
| 2003/0157975 A1* | 8/2003 | Kadel et al. | | 455/575 |
| 2004/0214606 A1* | 10/2004 | Wichman | | H04B 7/0408 455/562.1 |
| 2005/0105632 A1* | 5/2005 | Catreux-Erces et al. | | 375/267 |
| 2005/0185575 A1* | 8/2005 | Hansen et al. | | 370/208 |
| 2006/0083195 A1* | 4/2006 | Forenza | | H04B 7/0689 370/328 |
| 2007/0189151 A1* | 8/2007 | Pan et al. | | 370/210 |
| 2008/0002627 A1* | 1/2008 | Cha et al. | | 370/334 |
| 2008/0039015 A1* | 2/2008 | Nakata et al. | | 455/39 |
| 2008/0049672 A1* | 2/2008 | Barak et al. | | 370/330 |
| 2008/0056414 A1 | 3/2008 | Kim et al. | | |
| 2008/0152030 A1* | 6/2008 | Abramov et al. | | 375/260 |
| 2008/0292035 A1* | 11/2008 | Chang | | 375/347 |
| 2009/0003466 A1* | 1/2009 | Taherzadehboroujeni et al. | | 375/260 |
| 2009/0187616 A1* | 7/2009 | Hansen | | G06F 7/4806 708/511 |
| 2009/0189812 A1* | 7/2009 | Xia | | H04B 7/0617 342/374 |
| 2009/0213955 A1* | 8/2009 | Higuchi et al. | | 375/267 |
| 2009/0238114 A1* | 9/2009 | Deshpande | | H04J 11/0069 370/328 |
| 2009/0316807 A1* | 12/2009 | Kim et al. | | 375/260 |
| 2010/0135420 A1* | 6/2010 | Xu et al. | | 375/260 |
| 2010/0207819 A1* | 8/2010 | Uhl et al. | | 342/372 |
| 2010/0279689 A1* | 11/2010 | Tinnakornsrisuphap | | H04W 36/14 455/435.2 |
| 2011/0051835 A1 | 3/2011 | Yuan et al. | | 375/267 |
| 2011/0170624 A1* | 7/2011 | Goodman et al. | | 375/295 |
| 2011/0176430 A1* | 7/2011 | Zetterberg | | H04L 43/16 370/242 |
| 2012/0106613 A1* | 5/2012 | Piazza et al. | | 375/227 |
| 2012/0250612 A1* | 10/2012 | Jalloul | | H04B 7/0805 370/328 |
| 2013/0039271 A1* | 2/2013 | de la Garrigue | | 370/328 |
| 2013/0309981 A1* | 11/2013 | Ngai | | H04B 7/0404 455/78 |
| 2014/0293874 A1* | 10/2014 | Oh et al. | | 370/328 |

FOREIGN PATENT DOCUMENTS

| | | |
|---|---|---|
| KR | 1020080031552 | 4/2008 |
| KR | 1020110060976 | 6/2011 |
| WO | WO 2009102954 | 8/2009 |

OTHER PUBLICATIONS

PCT/ISA/237 Written Opinion issued on PCT/KR2012/006390 (pp. 3).

PCT/ISA/210 Search Report issued on PCT/KR2012/006390 (pp. 3).

* cited by examiner

| $S_0$ | $S_\pi$ | Radiation Pattern |
|---|---|---|
| 0 | 0 | |
| 0 | 1 | |
| 1 | 0 | |
| 1 | 1 | |
FIG.9
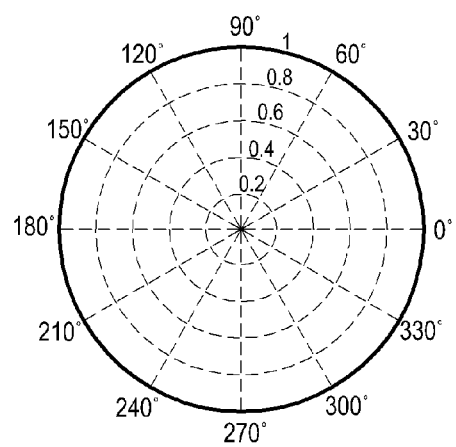
FIG.10A
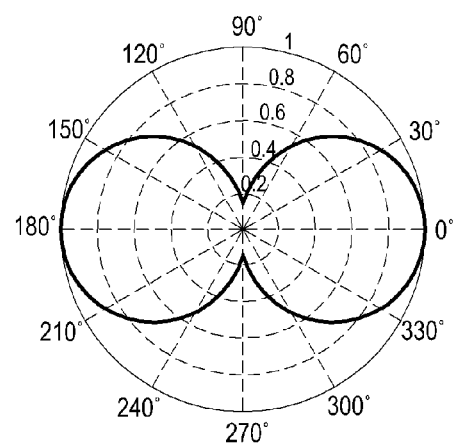
FIG.10B

TERMINAL IN COMMUNICATION SYSTEM AND METHOD FOR CONTROLLING SAME

PRIORITY

This application is a National Stage application under 35 U.S.C. § 371 of International Application No. PCT/KR2012/006390 filed Aug. 10, 2012, which claims priority under 35 U.S.C. § 365(b) to Korean Patent Application No. 10-2011-0080893 filed Aug. 12, 2011, the disclosure of each of which is incorporated herein by reference.

TECHNICAL FIELD

The present invention relates to a terminal which equips with at least one antenna and control method thereof.

BACKGROUND ART

In a mobile communication system, a study for providing terminals with high-speed services having various required Quality of Services (QoSs) has been actively developed. Here, the mobile communication system may be a Long Term Evolution (LTE) mobile communication system, a mobile communication system using a 3rd Generation Partnership Project 2 (3GPP2) standard based on a Code Division Multiple Access (CDMA) scheme (hereinafter, called as '3GPP2 mobile communication system'), a mobile communication system using a 3rd Generation Partnership Project (3GPP) standard based on a Wideband Code Division Multiple Access (WCDMA) scheme (hereinafter, called as '3GPP mobile communication system'), a WiMAX mobile communication system using a Worldwide Interoperability for Microwave Access (WiMAX) Forum Network Working Group standard, an Institute of Electrical and Electronics Engineers (IEEE) 802.16m mobile communication system, and the like.

In a conventional mobile communicating scheme related to the described various mobile communication systems, a terminal firstly asks a base station whether to perform a communication by providing information which the terminal acquires, receives information about whether to perform the communication from the base station, and performs a communication based on this.

Unlike this configuration in which a terminal firstly asks a base station whether to perform a communication by providing information which the terminal acquires, receives information about whether to perform the communication from the base station, and performs a communication based on this, there is a need for a configuration in which a terminal selects a base station or repeater for performing a communication and communicates with the selected base station or repeater. However, there is no disclosure for this.

DISCLOSURE

Technical Problem

The present invention is proposed to address at least the above-mentioned problems and/or disadvantages and to respond to a request of the above-mentioned development. The present invention provides a terminal and a control method thereof. The control method includes directly determining a base station and/or a repeater, determining an antenna element operation mode of each of the at least one antenna, determining at least one antenna for communicating with each of the at least one base station and/or repeater among the at least one antenna, determining a combined operation mode of an antenna set for a part or all of the base station and/or repeater which performs a communication using an antenna set which consists of at least two antennas upon performing a communication for the part or all of the at least base station and/or repeater using the at least two antennas, and transmitting/receiving data to/from the at least base station and/or repeater using at least one antenna for communicating with each of the at least one base station and/or repeater according to an antenna element operation mode of each antenna, or according to the antenna element operation mode of each antenna and a combined operation mode of an antenna set for each communication node.

Technical Solution

In accordance with an aspect of the present invention, a control method of a terminal which equips with at least one antenna for communicating with at least one communication node is provided. The control method includes determining the at least one communication node; determining an antenna element operation mode of each of the at least one antenna; determining at least one antenna among the at least one antenna, for communicating with each of the at least one communication node, determine a combined operation mode of an antenna set for each of a part or all of the at least one communication node which the terminal communicates through the antenna set which consists of at least two antennas when the terminal communicates with each of the part or all of the at least one communication node through the at least two antennas; and transmitting/receiving data to/from the at least one communication node through the at least one antenna for communicating with each of the at least one communication node using the antenna element operation mode of each of the at least one antenna, or using both the antenna element operation mode of each of the at least one antenna and the combined operation mode of the antenna set for each of the at least one communication node.

In accordance with another aspect of the present invention, a control method of a terminal which equips with at least one antenna for communicating with at least one communication node is provided. The control method includes including at least one of: changing an antenna element operation mode of each of the at least one antenna of the terminal; changing the at least one communication node with which the terminal communicates; changing at least one antenna among the at least one antenna of the terminal, for communicating with each of the at least one communication node; changing a combined operation mode of an antenna set for each of a part or all of the at least one communication node with which the terminal communicates through the antenna set which consists of at least two antennas when the terminal communicates with each of the part or all of the at least one communication node through the at least two antennas; and changing a common use configuration of a part or all of the at least one antenna for the part or all of the at least one communication node, or changing a sharing configuration of a part or all of resource for the part or all of the at least one communication node; and transmitting/receiving data to/from at least one communication node through the at least one antenna for communicating with each of at least one communication node using the antenna element operation mode of each of the at least one antenna, or using both the antenna element operation mode of each of the at least one antenna and the combined operation mode of the antenna set for each of the at least one communication node.

In accordance with another aspect of the present invention, a terminal for communicating with at least one communication node is provided. The terminal includes an antenna unit configured to equip with at least one antenna; and a controller configured to determine the at least one communication node, to determine an antenna element operation mode of each of the at least one antenna, to determine at least one antenna among the at least one antenna, for communicating with each of the at least one communication node, to determine a combined operation mode of an antenna set for each of a part or all of the at least one communication node with which the terminal communicates through the antenna set which consists of at least two antennas when the terminal communicates with each of the part or all of the at least one communication node through the at least two antennas, and to control the at least one antenna transmission/reception of data to/from the at least one communication node through the least one antenna for communicating with each of the at least one communication node using the antenna element operation mode of each of the at least one antenna, or using both the antenna element operation mode of each of the at least one antenna and the combined operation mode of the antenna set for each of the at least one communication node.

In accordance with another aspect of the present invention, a terminal for communicating with at least one communication node is provided. The terminal includes an antenna unit configured to equip with at least one antenna; and a controller configured to change at least one of an antenna element operation mode of each of the at least one antenna of the terminal, the at least one communication node with which the terminal communicates, at least one antenna among the at least one antenna, for communicating with each of the at least one communication node, a combined operation mode of an antenna set for each of a part or all of the at least one communication node with which the terminal communicates through the antenna set which consists of at least two antennas when the terminal communicates with each of the part or all of the at least one communication node through the at least two antennas, and a common use configuration of a part or all of the at least one antenna for the part or all of the at least one communication node, or a sharing configuration of a part or all of resource for the part or all of the at least one communication node, and transmit/receive data to/from at least one communication node through the at least one antenna for communicating with each of at least one communication node using the antenna element operation mode of each of the at least one antenna, or using both the antenna element operation mode of each of the at least one antenna and the combined operation mode of the antenna set for each of the at least one communication node.

Advantageous Effects

As is apparent from various embodiment of the present invention, a terminal equipped with at least one antenna which enables to directly determine at least one communication node such as a base station, a relay, a repeater, a femto cell base station, or other terminal, determine an antenna element operation mode of each of the at least one antenna, determine at least one antenna for communicating with each of the at least one communication node among the at least one antenna, determine a combined operation mode of an antenna set for a part or all of the at least one communication node which communicate using an antenna set which consists of at least two antennas upon communicate using at least two antennas for the part or all of the at least one communication node, and control to transmit/receive data to/from the at least one communication node using at least one antenna for each of the at least one communication node according to the antenna element operation mode of each antenna or according to the antenna element operation mode of each antenna and the combined operation mode of the antenna set of each communication node, and control method thereof may be provided.

A user terminal according to a terminal and control method thereof according to the present invention enables to directly select a base station, a relay, a repeater, a femto cell base station, or other terminal for a communication. Or, a terminal may directly determine at least one communication node such as a base station, a relay, a repeater, a femto cell base station, or other terminal for a communication based on a moving speed, a channel condition, an external input, a service condition, a user profile, an access condition, and the like, and directly determine at least one of an antenna element mode of each antenna, at least one antenna for communicating with each communication node, and a combined operation mode of an antenna set for each communication node.

A terminal according to an embodiment of the present invention enables to significantly decrease interference which affects neighbor communication nodes and interference which is received from the neighbor communication nodes by transmitting or receiving a signal using a directional beam which may be formed through antenna combination for each antenna set and an antenna element operation mode. More particularly, in a cellular system, a related base station and a terminal transmit or receive a signal by forming a directional beam, so interference affecting a neighbor cell and interference received from the neighbor cell may be significantly decreased and a cell capacity as well as a link capacity may be significantly increased according to this.

A terminal equipped with at least one antenna according to the present invention enables to perform a diversity transmission or a multiplexing transmission with forming a directional beam by considering a location, a direction, a channel state, and the like of at least one communication node with which the terminal equipped with the at least one antenna intends to communicate, so a high quality communication or a super-high speed transmission may be implemented by significantly decreasing interference which affects neighbor communication nodes and interference which is received from the neighbor communication nodes.

A terminal according to the present invention enables to simultaneously perform a plurality of modes without stopping a communication by operating various hybrid modes that simultaneously perform at least one function, so a process for changing a mode may be omitted. Therefore, additional time and an interruption to performing an operation corresponding to a mode which is currently operated are unnecessary. So, in most cases, communication without an interruption is possible, communication interruption which may occur upon a network switching or a mode switching may be overcome according to this, a user service continuity may be guaranteed upon the network switching or the mode switching, and service quality may be significantly increased.

A terminal according to the present invention enables to maintain communication to a communication node to which the terminal currently connects and independently connect to other communication node, so an effective and stable handover is possible.

A terminal according to the present invention enables to connect to each of at least two communication nodes and independently communicates with each of the at least two communication nodes, so the terminal enables to perform an effective multi-homing transmission in which the terminal independently transmits/receives to/from a plurality of communication nodes at the same time.

A terminal equipped with at least two antennas according to the present invention enables to receive a multi-service by connecting to at least two communication nodes and independently operating each antenna set for each communication node.

A terminal equipped with at least two antennas according to the present invention enables to establish connection with at least one communication node in order that at least two antennas are combined each other.

Meanwhile, a terminal and a communication node according to the present invention may be a general communication node. So, in the following embodiment, a terminal may be called as a "reference communication node" and, and a communication node with which the terminal establishes a connection for a communication may be called as a "connection-target communication node".

DESCRIPTION OF DRAWINGS

FIG. 6b illustrates an antenna radiation pattern according to FIG. 6a;

FIG. 9 illustrates various radiation patterns according to an element antenna directional multiplexing mode;

FIGS. 10a to 10b illustrate a radiation pattern which is possible in a case that two Binary Phase Shift Keying (BPSK) modulation symbols are directional multiplexing transmitted using three element ESPAR antennas;

BEST MODE

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
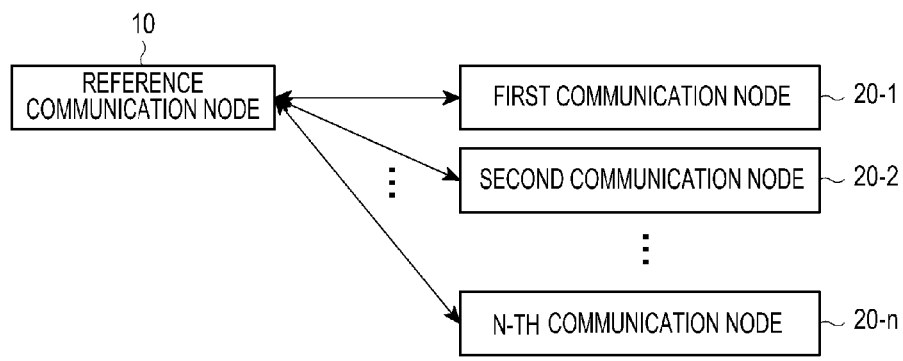
FIG. 1 illustrates a connection relationship among a reference communication node and a first to an n-th connection-target communication nodes according to the present invention.

FIG. 1 illustrates a connection relationship among a reference communication node and a first to an n-th connection-target communication nodes according to the present invention.

As described in FIG. 1, a reference communication node 10 according to the present invention may communicate with a first to an n-th connection-target communication nodes 20-1, 20-2, . . . , 20-n.

Here, the reference communication node 10 may be preferably a communication terminal such as a wearable terminal, a portable terminal, a transportable terminal, and a movable, or a repeater, a relay, a repeater transmission base station, a repeater transmission femto cell base station, a repeater transmission terminal, and the like, and may include at least one antenna. A kind of antennas included in the reference communication node 10 is not limited, and the kind of antennas will be described below.

A communication node may be a base station, a relay, a repeater, a femto cell base station, other terminal, a relay transmission terminal, an Access Point (AP), and the like. Hereinafter, a communication node which actually transmits/receives data to/from the reference communication node 10 among the first to the n-th connection-target communication nodes 20-1, 20-2, . . . , 20-n will be called as a 'connection-target communication node'.

The reference communication node 10 may communicate with a connection-target communication node through a radio using an antenna included in the reference communication node 10. For example, the reference communication node 10 may communicate with one connection-target communication node through a radio using one antenna. For example, the reference communication node 10 may communicate with one connection-target communication node through a radio using two antennas. For example, the reference communication node 10 may communicate with each of two connection-target communication nodes through a radio using one antenna. In this case, the two connection-target communication nodes may share resource such as a frequency and time for the one antenna. For example, the reference communication node 10 may communicate with each of two connection-target communication nodes through a radio using two antennas. In this case, the two connection-target communication nodes may use commonly two antennas or share resource such as a frequency and time for the two antennas. Further, a radio communication relationship among the reference communication node 10 and connection-target communication nodes will be more detailed described below.

A conventional reference communication node firstly asks at least one of the first to the n-th communication nodes 20-1, 20-2, ..., 20-n whether communication with the conventional reference communication node is possible by providing information which the conventional reference communication node acquires to the at least one of the first to the n-th communication nodes 20-1, 20-2, ..., 20-n, the at least one of the first to the n-th communication nodes 20-1, 20-2, ..., 20-n allows the conventional reference communication node to communicate, the at least one communication node transmits a response indicating that a communication is possible to the conventional reference communication node, and the conventional reference communication node may perform a wireless communication among the conventional reference communication node and the first to the n-th communication nodes 20-1, 20-2, ..., 20-n after receiving the response. On the other hand, a reference communication node 10 according to the present invention may directly determine connection-target communication nodes, and may perform a wireless communication with the directly determined connection-target communication nodes. Further, the reference communication node 10 according to the present invention may independently perform a control for an element antenna beam pattern, so an effect that an interference among a plurality of connection-target communication nodes is minimized may be created if the reference communication node 10 performs a wireless communication with the plurality of connection-target communication nodes. Here, a beam characteristic is an element for determining the number of directional beams, the number of beam spaces, and the like.

Figure 2:
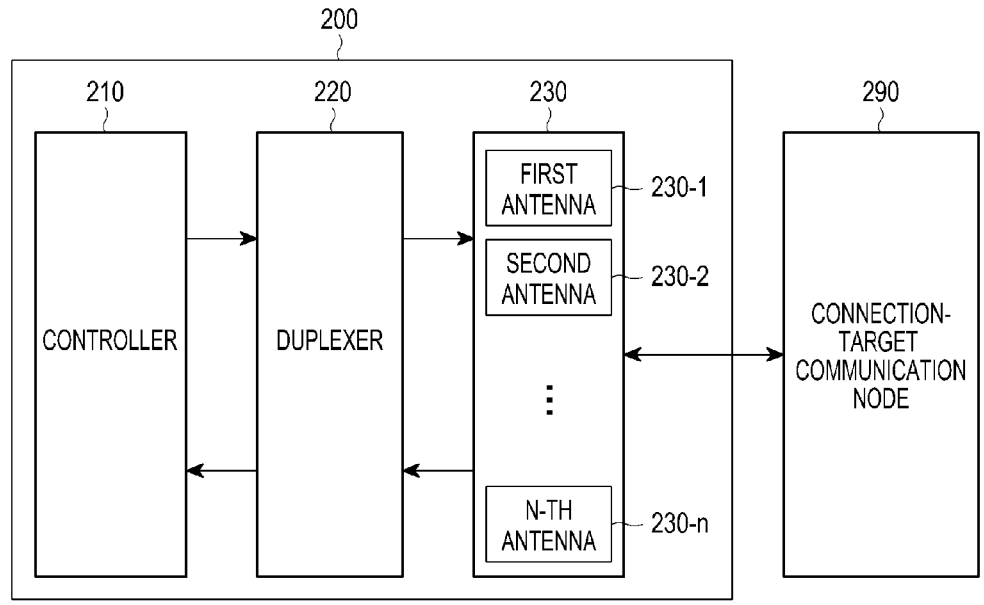
FIG. 2 illustrates a block diagram for describing a reference communication node according to an embodiment of the present invention.

FIG. 2 illustrates a block diagram for describing a reference communication node according to an embodiment of the present invention.

As described in FIG. 2, a reference communication node 200 may include a controller 210, a duplexer 220, and an antenna unit 230. The antenna unit 230 may include a first to an n-th antenna 230-1, 230-2, ..., 230-n.

The antenna unit 230 may control all or a part of the first to the n-th antenna 230-1, 230-2, ..., 230-n included in the antenna unit 230 under a control of a controller. Here, the part of the first to the n-th antenna 230-1, 230-2, ..., 230-n may operate, so the resting antennas except for the operating antennas may not operate.

The controller 210 may autonomously determine a connection-target communication node 290 which will communicate with the reference communication node 200 among a plurality of communication nodes 20-1, 20-2, ..., 20-n in FIG. 1. The controller 210 may determine a connection-target communication node 290 based on a channel quality from each of communication nodes 20-1, 20-2, ..., 20-n received from the antenna unit 230. The controller 210 may determine a connection-target communication node 200 among the communication nodes 20-1, 20-2, ..., 20-n based on at least one of a moving speed between a reference communication node 200 and each of the communication nodes 20-1, 20-2, ..., 20-n, a channel condition, an external input, a channel information use method, a service condition, a user profile, and an access condition. The controller 210 may be preferably a microprocessor, and may be implemented as a format of a control module including a mini computer or the microprocessor.

A moving speed is information indicating a speed at which the reference communication node 200 moves, and the moving speed includes an absolute speed, a relative speed, and acceleration. The reference communication node 200 may measure a moving speed of the reference communication node 200 using a gyroscope sensor, a Global Positioning System (GPS) sensor, and the like. The reference communication node 200 may establish connection with at least one connection-target communication node 290 which is mounted in a mobile object such as an airplane, a train, a car, and the like within the mobile object, so the reference communication node 200 may use information on a relative speed between the reference communication node 200 and a mobile object where the reference communication node 200 is located. The reference communication node 200 may establish connection with at least one connection-target communication node 290 using acceleration as change of a speed.

Here, the channel condition is a quality factor for determining the channel characteristic between at least one connection-target communication node and a reference communication node including a multi-antenna situation.

A channel condition may be a frequency band which has been already set between the reference communication node 200 and each of the communication nodes 20-1, 20-2, ..., 20-n. Using data for the reference communication node 200 which may be designated by a user and a preset frequency band for each of data streams to be transmitted/received, the controller 210 may determine a connection-target communication node. For example, if the data to be transmitted/received which is designated from the user is voice communication data, and a frequency band through which the voice communication data is transmitted/received is designated as 829.56 MHz and 874.56 MHz, the controller 210 may determine a communication node of which a transmission/reception frequency band is designated as 829.56 MHz and 874.56 MHz among a plurality of communication nodes 20-1, 20-2, ..., 20-n as a connection-target communication node 290.

As not shown in FIG. 2, a storage (not shown) may store data which will be transmitted/received and a lookup table indicating a relationship among channel conditions corresponding to this, and a controller 210 may read the lookup table and determine a connection-target communication node 290 based on this.

A channel condition may be a channel characteristic quality factor among the reference communication node 200 and each of communication nodes 20-1, 20-2, ..., 20-n. For example, if the channel characteristic quality factor between the reference communication node 200 and each of the communication nodes 20-1, 20-2, . . . , 20-n is equal to or greater than a preset reference, the controller 210 may determine the communication node of which the channel characteristic quality factor is equal to or greater than the preset reference as a connection-target communication node 290. Preferably, the controller 210 may determine a communication node of which an Signal-to-Noise Ratio (SNR) or an Signal-to-Noise plus Interference Ratio (SINR) among the reference communication node and the communication node is equal to or greater than a preset value as the connection-target communication node 290. The controller 210 may determine the connection-target communication node 290 based on a Received Signal Strength Indicator (RSSI), an SNR, an SINR, an error rate, a channel capacity, a providable transmit rate, variance of a providable transmit rate, an outage rate, and the like determined according to fading, a path decrease, shadowing, delay spread, a multipath, an intra cell interference, an inter cell interference, Doppler, an antenna gain, a channel allocation, and the like. The RSSI is an index indicating a received signal strength measured in a reception end. The SNR is a signal-to-noise ratio, and is an index indicating a ratio of signal power to noise power. The SINR is a signal-to-noise plus interference ratio, and is an index indicating a ratio of signal power to interference and noise power. The error rate is an error probability which occurs on a signal transmission, and includes a Bit Error Rate (BER), a Block Error Rate (BLER), a Frame Error Rate (FER), a Packet Error Rate (PER), and the like. The channel capacity is maximal information quantity which may be transmitted through a channel without an error. The providable transmit rate is a transmit rate which is practically transmittable by considering channel characteristic elements, may be indicated with a format of an instantaneous transmit rate or an average transmit rate, and includes a total transmit rate, a transmit rate for each user, a transmit rate for each stream, and the like. The variance of the providable transmit rate is an index indicating a change degree of a providable transmit rate according to a channel characteristic. The outage rate is a communication outage probability which may occur if a channel quality is less than or equal to a reference according to a preset communication outage criterion. The communication outage criterion includes a RSSI, an SNR, an SINR, an error rate, a channel capacity, a providable transmit rate, and the like. In one embodiment, if the communication outage criterion is set to 0 dB SNR, an outage rate of a user is determined according to a probability that the user experiences a channel of which an SNR is less than or equal to 0 dB.

The channel condition may be a space characteristic quality factor. The space characteristic quality factor is a quality factor for considering a space characteristic in addition to a channel characteristic quality factor if a signal is transmitted to a plurality of communication nodes through multiple antennas, and includes a correlation among user channels, a correlation among antennas, a rank of a channel matrix, a channel quality factor for each stream, and the like. An element related to a space characteristic may be used as a space characteristic channel quality factor. The correlation among the user channels is an index indicating a similarity of a channel characteristic among the user channels. If the correlation among the user channels is high, a channel characteristic is similar, so a performance decreases on a multi-user space division multiplexing transmission. The correlation among the antennas is an index indicating a similarity of a channel characteristic among channels which are formed through via a plurality of antennas if a reception communication node uses the plurality of the antennas. If the correlation among the antennas is high, a channel characteristic among the antennas is similar, so a performance decreases on a space division multiplexing transmission using multiple antennas. The rank of the channel matrix is an index indicating the number of data streams which are independently available for a matrix channel which is generated between a transmitter and a receiver. The channel quality factor for each stream is an index indicating channel quality of each stream corresponding to the number of data streams which are independently available for the matrix channel which is generated between the transmitter and the receiver. The channel quality factor for each stream includes the described RSSI, SNR, SINR, error rate, channel capacity, providable transmit rate, variance of the providable transmit rate, and outage rate.

The external information may be an external information which designates a connection-target communication node 290 which a user directly inputs. For example, a user may directly input an external information which commands a reference communication node 200 to determine the first communication node 20-1 among the communication nodes 20-1, 20-2, . . . , 20-n in FIG. 1 as a connection-target communication node 290 to the reference communication node 200. The controller 210 may determine the first communication node 20-1 as the connection-target communication node 290 based on the input the external information.

The channel use method is classified into a channel quality information use method and a channel state information use method according to channel information which the reference communication node 200 uses upon transmitting a plurality of user signals. Here, channel state information is information indicating a channel state such as a gain and a phase of a channel which is formed between a reference communication node and at least one communication node. If the reference communication node 200 does not use channel state information and uses channel quality information, the reference communication node 200 may transmit a signal using all methods corresponding to an open-loop transmission. The open-loop transmission includes a power division transmission, a code division transmission, a space multiplexing, a beam forming, a transmit diversity, an antenna selection, an antenna set division, and the like. If the reference communication node 200 uses channel state information, the reference communication node 200 may transmit a signal using all methods corresponding to a closed-loop transmission. The closed-loop transmission includes a Dirty Paper Coding (DPC), an Interference Alignment (IA), a pre-coding, a beam forming, and the like.

The service condition is a condition related to a required service and an environment of a user, and includes a service requirement, a service environment, and a service plan. An element related to a service may be uses as the service condition. The service requirement includes a Quality of Service (QoS), and a traffic class. Here, the QoS includes a required transmission rate for a required service of each user, packet loss, delay, and the like. The traffic class denotes a type of a service which each user requires, and includes a large file, a voice call, a video call, a video streaming, a web-browsing, a game, and the like. Service environment includes a location, and the like. Here, the location denotes a location or coordinates where each user is located, and includes a specific space such as a hospital, a school, a police, and the like or user coordinates within a cell. The service plan denotes a service price, and includes a subscription plan, and the like.

The user profile denotes a condition related to a characteristic of service user, and includes a user preference, a terminal profile, a security level, and the like. An element related to a user characteristic may be used as a user condition. The user preference includes a RAT type which a user prefers, a service type which the user prefers, and the like. The terminal profile denotes a performance of a terminal which each user has, and includes the number of antennas, a processing power, a memory capacity, a signal processing speed, a Central Processing Unit (CPU) processing speed, a RAT configuration, a modem configuration, a display configuration, and the like. The security level denotes a security grade which each user requires, and may be set from a grade where a security is unnecessary step-by step.

The access condition denotes access environmental factor between at least one connection-target communication node and a reference communication node, and includes an available RAT type, the number of available communication nodes for each RAT, the availability of each communication node, a load condition of each communication node, an access purpose, an access format, and the like. The available RAT type denotes a type of RAT with which a reference communication node may connect nearby the reference communication node. Here, a RAT type may be at least one of a Wireless-Fidelity (Wi-Fi), a Long Term Evolution (LTE), a 3rd Generation Partnership Project 2 (3GPP2), a 3rd Generation Partnership Project (3GPP), a Worldwide Interoperability for Microwave Access (WiMAX), an Institute of Electrical and Electronics Engineers (IEEE) 802.16m. For example, if a user designates the Wi-Fi as a RAT type, the controller 210 may determine a communication node which provides a Wi-Fi service as a connection-target communication node 290. In other example, the controller 210 may automatically determine a type of RAT without a user's intervention based on a quality of data which is received from each of the communication nodes 20-1, 20-2, . . . , 20-n or strength of a signal which is received from each of the communication nodes 20-1, 20-2, . . . , 20-n. For example, if strength of a received signal power from a first communication node 20-1 in FIG. 1 is greater than strength of a received signal power from a second communication node 20-2, the controller 210 may determine a RAT type as the RAT type of the first communication node 20-1, and the first communication node 20-1 as the connection-target communication node 290 at the same time. The number of available communication nodes for each RAT denotes the number of connection-target communication nodes with which a reference communication node may connect nearby the reference communication node for each RAT. The availability of each communication node indicates whether a reference communication node may access connection-target communication nodes nearby the reference communication node. The load condition of each communication node denotes load conditions for connection-target communication nodes nearby the reference communication node.

The access purpose denotes a reason why a reference communication node intends to access neighbor connection-target communication nodes, and includes an initial access, a handover access, and the like. The initial access denotes an access that the reference communication node establishes new connection with at least one communication node. The handover access denotes an access that the reference communication node releases connection with at least one communication node with which the reference communication node currently connects, or the reference communication node establishes new connection with at least one other communication node, or the reference communication node releases connection with at least one communication node with which the reference communication node currently connects and establishes new connection with at least one other communication node. The handover access includes intra-cell handover access, an inter-cell handover access, a heterogeneous network handover access, and the like. The intra-cell handover access is a handover access which the reference communication node performs if the reference communication node moves from one area to another area within a single cell. The inter-cell handover access is a handover access which the reference communication node performs if the reference communication node moves from a cell area of a communication node to which the reference communication node currently connects to a cell area in which other communication node provides a service. The heterogeneous network handover access is a handover access which the reference communication node performs if the reference communication node moves between cell areas of which RATs are different each other. In one embodiment, a terminal performs the heterogeneous network handover access if the terminal moves from a WCDMA area to a WLAN area.

The access format denotes a format in which a reference communication node establishes connection with neighbor connection-target communication nodes, and includes a single access, a multiple access, a cooperative access, and the like. The single access is an access in which the a reference communication node establishes connection with one connection-target communication node, the multiple access is an access in which the reference communication node establishes at least one service session by establishing independent connection with each of a plurality of connection-target communication nodes, and the cooperative access is an access in which the reference communication node at least one service session through a cooperative transmission to/from the plurality of connection-target communication nodes.

The cooperative access includes a same information cooperative access in which the same information is transmitted, a different information cooperative access in which different information is transmitted, a hybrid information cooperative access in which at least two information is multiply transmitted, and a partial set cooperative access in which partial information is cooperatively transmitted.

The same information cooperative access is an access in which a reference communication node cooperatively transmits the same information to at least two connection-target communication nodes, or the at least two connection-target communication nodes cooperatively transmits the same information to the reference communication node. The reference communication node may cooperatively transmit the same information through a single session or a multi-session, and may transmit the same information through the same resource or different resources. Upon performing the same information cooperative access, the reference communication node may cooperatively transmit the same information with the same transmission scheme or different transmission schemes. The transmission scheme includes a RAT, a modulation/de-modulation scheme, a channel coding scheme, a source coding scheme, a re-transmission scheme, and the like. The re-transmission scheme includes a Hybrid Automatic Repeat request (HARQ), an Automatic Repeat request (ARQ), a Transmission Control Protocol (TCP) re-transmission, and the like.

The different information cooperative access is an access in which a reference communication node cooperatively transmits different information to at least two connection-target communication nodes, or the at least two connection-target communication nodes cooperatively transmits the different information to the reference communication node. Here, the reference communication node may cooperatively transmit different information through a single session or multiple sessions, and may transmit the different information through the same resource or different resources. Upon performing the different information cooperative access, the reference communication node may cooperatively transmit different information with the same transmission scheme or different transmission schemes.

The hybrid information cooperative access is an access in which a reference communication node cooperatively transmits/receives hybrid information through each cooperative transmission path to/from at least two connection-target communication nodes, wherein hybrid information is combined so that one part of cooperative transmission paths carries identical information and another part of the cooperative transmission paths carries different information. Upon cooperatively transmitting/receiving identical information through the part of the cooperative transmission paths to/from the at least two connection-target communication nodes, the reference communication node performs the same information cooperative access. Upon cooperatively transmitting/receiving different information through the another part of the cooperative transmission paths, the reference communication node performs the different information cooperative access.

The partial set cooperative information cooperative access is an access in which a reference communication node does not transmit/receive a signal to/from a part of at least two connection-target communication nodes, and performs cooperative transmission to/from the rest of the at least two connection-target communication nodes. The reference communication node may perform one of the same information cooperative access, the different information cooperative access, and the hybrid information cooperative access with the part of the at least two connection-target communication nodes to/from which the reference communication node transmits/receives the signal.

The controller 210 may determine the connection-target communication node 290 based on at least one of the described seven conditions. The number of the connection-target communication node 290 may be one or more than two.

In one possible embodiment, if the connection-target communication node 290 is determined, the controller 210 may determine a communicating antenna which will communicate with at least one connection communication node 290 among a plurality of antennas 230-1, 230-2, . . . , 230-n. The communicating antenna may be a part or all of the plurality of antennas 230-1, 230-2, . . . , 230-n. In an embodiment related to FIG. 2, for example, it is assumed that the controller 210 determines a second antenna 230-2 as the communicating antenna. After determining the second antenna 230-2 as the communicating antenna, the controller 210 determines an antenna element operation mode of the second antenna 230-2, and may control transmission/reception of data to/from a connection-target communication node 290 through the second antenna 230-2 using the determined antenna element operation mode.

Upon determining a communicating antenna, the controller 210 may determine a communicating antenna 230-2 based on at least one of a moving speed between each of a plurality of antennas 230-1, 230-2, . . . , 230-n and a connection-target communication node 290, a channel condition, an external input, a channel information use method, a service condition, a user profile, and an access condition. The number of the communicating antenna 230-2 may be one or more than two.

The controller 210 may determine at least one communicating antenna 230-2 among a plurality of antennas 230-1, 230-2, . . . , 230-n based on at least one of the moving speed between each of the plurality of antennas 230-1, 230-2, . . . , 230-n and the connection-target communication node 290, the channel condition, the external input, the channel information use method, the service condition, the user profile, and the access condition.

The controller 210 may determine a communicating antenna based on the described moving speed.

The controller 210 may determine a communicating antenna based on the described channel condition. Here, the channel condition may be a frequency band which has been already set between a plurality of antennas 230-1, 230-2, . . . , 230-n and a connection-target communication node 290. A reference communication node 200 may be designated data to be transmitted/received from a user, so the controller 210 may determine a communicating antenna using a frequency band which has been already set for each data to be transmitted/received. For example, if the data to be transmitted/received which the user designates is voice call data, and frequency bands through which the voice call data is transmitted/received are designated as 829.56 MHz and 874.56 MHz, respectively, the controller 210 may determine an antenna of which transmission/reception frequency bands are designated as 829.56 MHz and 874.56 MHz, respectively among the plurality of antennas 230-1, 230-2, . . . , 230-n as a communicating antenna 230-2.

As not shown in FIG. 2, a storage (not shown) may store data which will be transmitted/received and a lookup table indicating a relationship among channel conditions corresponding to this, and the controller 210 may read the lookup table and determine the communicating antenna 230-2 based on this.

The channel condition may be a channel characteristic quality factor between each of the plurality of antennas 230-1, 230-2, . . . , 230-n and the connection-target communication node 290. For example, if a quality condition between each of the plurality of antennas 230-1, 230-2, . . . , 230-n and the connection-target communication node 290 is greater than or equal to a preset reference, the controller 210 may determine an antenna which has a quality condition greater than or equal to the preset reference as a communicating antenna 230-2. The channel characteristic quality factor is preferably an SNR or an SINR between each of the plurality of antennas 230-1, 230-2, . . . , 230-n and the connection-target communication node 290, the controller 210 may determine an antenna which has an SNR or an SINR greater than or equal to the preset threshold as the communicating antenna 230-2. The controller 210 may determine a communicating antenna based on a RSSI, an SNR, an SINR, an error rate, a channel capacity, a providable transmit rate, a variance of the providable transmit rate, and an outage rate which are determined according to fading, path attenuation, shadowing, delay spread, a multipath, intra-cell interference, inter-cell interference, Doppler, an antenna gain, a channel allocation, and the like.

The controller 210 may determine a communicating antenna based on the described space characteristic quality factor.

The controller 210 may determine a communicating antenna based on the described external input. For example, a user may directly input an external information which commands the reference communication node 200 to determine a second antenna 230-2 among the plurality of antennas 230-1, 230-2, . . . , 230-n as a communicating antenna 230-2, the controller 210 may determine a second antenna 230-2 as the communicating antenna 230-2 based on the external input.

The controller 210 may determine a communicating antenna based on the described channel information use method.

The controller 210 may determine a communicating antenna based on the described service condition.

The controller 210 may determine a communicating antenna based on the described user profile.

The controller may determine a communicating antenna based on the described access condition. Here, the access condition may be an available RAT type. The controller 210 may determine an antenna which may communicate with an available RAT by considering an available RAT type as a communicating antenna 230-2. For example, if a user designates a Wi-Fi as a RAT type, the controller 210 may determine an antenna which provides a Wi-Fi service as a communicating antenna 230-2. In another example, the controller 210 may automatically determine a type of RAT without a user's intervention based on a quality of data which is received from each of the communication nodes 20-1, 20-2, . . . , 20-n or strength of a signal which is received from each of the communication nodes 20-1, 20-2, . . . , 20-n. For example, if strength of a signal received from a first communication node 20-1 in FIG. 1 is greater than strength of a signal received from a second communication node 20-2, the controller 210 may determine a RAT type as the RAT type of the first communication node 20-1, and determine antenna corresponding to the first communication node 20-1 as a communicating antenna 230-2.

A concept in which the controller 210 determines the communicating antenna 230-2 based on the described moving speed, channel condition, external input, channel information use method, service condition, user profile, and access condition is very similar to the described concept for determining the connection-target communication node 290, so a detailed description will be omitted herein.

The controller 210 may determine a communicating antenna 230-2 based on at least one of the described seven conditions. The number of the communicating antenna 230-2 may be one or more than two.

After determining the at least one communicating antenna, the controller 210 may determine an antenna element operation mode of each of the at least one communicating antenna. The antenna element operation mode of each antenna may be one of an element antenna omni-directional mode, an element antenna directional mode, an element antenna directional diversity mode, an element antenna directional multiplexing mode, and an element antenna off mode.

Each antenna element operation mode of each antenna may be determined by controlling an element antenna beam pattern of each communicating antenna. For example, an antenna element operation mode of each communicating antenna will be determined as one of an element antenna omni-directional mode, an element antenna directional mode, an element antenna directional diversity mode, an element antenna directional multiplexing mode, and an element antenna off mode by controlling at least one of a beam shape, the number of beams, and a beam direction for each communicating antenna. Here, a related each antenna is not operated in an element antenna off mode. An antenna element operation mode of each antenna may be determined based on at least one of a moving speed, a channel condition, an external input, a channel information use method, a service condition, a user profile, and an access condition.

A concept in which the controller 210 determines the antenna element operation mode of each communicating antenna according to the described moving speed, channel condition, external input, channel information use method, service condition, user profile, and access condition is very similar to the described concept for determining the connection-target communication node 290, so a detailed description will be omitted herein.

Upon communicating for a part or all of connection-target communication nodes using at least two antennas, the controller 210 may determine a combined operation mode of an antenna set of the part or all of the connection-target communication nodes with which the controller 210 communicates using at least two antennas. A combined operation mode of an antenna set for each connection-target communication node may be one of a combined omni-directional mode, a combined directional mode, a combined diversity mode, a combined multiplexing mode, a combined diversity-multiplexing complex mode, and a combined Cyclic Delay Diversity (CDD) mode.

Each combined operation mode of the antenna set for each connection-target communication node may be determined by controlling a combined beam pattern of each communicating antenna set. For example, a combined operation mode of an antenna set for each connection-target communication node may be determined as one of the combined omni-directional mode, the combined directional mode, the combined diversity mode, the combined multiplexing mode, the combined diversity-multiplexing complex mode, and the combined CDD mode by controlling at least one of a combined directional beam shape, the number of combined beams, and a combined directional beam direction. A combined operation mode of an antenna set for each connection-target communication node may be determined based on at least one of a moving speed, a channel condition, an external input, a channel information use method, a service condition, a user profile, and an access condition.

A concept in which the controller 210 determines the combined operation mode of the antenna set for each connection-target communication node according to the described moving speed, channel condition, external input, channel information use method, service condition, user profile, and access condition is very similar to the described concept for determining the connection-target communication node 290, so a detailed description will be omitted herein.

As described above, the controller 210 may determine at least one connection-target communication node 290, determine a communicating antenna which communicates with the connection-target communication node 290, and determine an antenna element operation mode for each communicating antenna. Upon communicating using at least two antennas for a part or all of connection-target communication nodes, the controller 210 may determine a combined operation mode of an antenna set for the part or all of the connection-target communication nodes with which the controller 210 communicates using the at least two antennas. If the four elements are determined, the controller 210 may control a communicating antenna within an antenna unit 230 to transmit/receive data by communicating with the connection-target communication node 290 with the determined operation mode.

The duplexer 220 may be adjusted under a control of a controller in order that the antenna unit 230 performs a data transmission or a data reception.

In the described embodiments, the controller 210 determines a connection-target communication node, determines an operation mode for each communicating antenna after determining a communicating antenna, and determines a combined operation mode of an antenna set for each connection-target communication node. However, it will be understood by those of ordinary skill in the art that an order of the determining operations is arbitrary, so the order of the determining operations may be changed. For example, the controller 210 may determine an antenna element operation mode for each communicating antenna after firstly determining communicating antennas, determine a combined operation mode of an antenna set for each connection-target communication node, and determine a connection-target communication node.

Various embodiments related to an order of determining, by the controller 210, each of a connection-target communication node, a communicating antenna, an antenna element operation mode, and a combined operation mode of an antenna set may be described below.

In one embodiment for a step of determining through a interconnection, the controller 210 may firstly determine a connection-target communication node, cooperatively determine a communicating antenna for each connection-target communication node and an antenna element operation mode, and determine a combined operation mode of an antenna set for each connection-target communication node.

In another embodiment for a step of determining through an interconnection, firstly the controller 210 may cooperatively determine a connection-target communication node set and a communicating antenna set for each connection-target communication node, determine an antenna element operation mode according to the determined connection-target communication node and the determined communicating antenna set for each connection-target communication node, and a combined operation mode of an antenna set for each connection-target communication node.

In another embodiment for a step of determining through an interconnection, firstly the controller 210 may cooperatively determine a connection-target communication node set and an antenna element operation mode, determine an antenna set for each connection-target communication node according to the determined connection-target communication node set and the determined antenna element operation mode, and determine a combined operation mode of an antenna set for each connection-target communication node.

In another embodiment for a step of determining through an interconnection, firstly the controller 210 may cooperatively determine an antenna set for each connection-target communication node and an antenna element operation mode, determine a connection-target communication node set according to the determined antenna set for each connection-target communication node and the determined antenna element operation mode, and determine a combined operation mode of an antenna set for each connection-target communication node.

In another embodiment for a step of determining through an interconnection, the controller 210 may firstly determine a connection-target communication node set, cooperatively determine a communicating antenna set for each connection-target communication node and an antenna element operation mode according to the determined connection-target communication node set, and determine a combined operation mode of an antenna set for each connection-target communication node.

In another embodiment for a step of determining through an interconnection, the controller 210 may firstly determine an antenna set for each connection-target communication node, cooperatively determine a connection-target communication node set and an antenna element operation mode according to the determined communicating antenna set for each connection-target communication node, and determine a combined operation mode of an antenna set for each connection-target communication node.

In another embodiment for a step of determining through an interconnection, the controller 210 may firstly determine an antenna element operation mode, cooperatively determine connection-target communication node set and a communicating antenna set for each connection-target communication node, and determine a combined operation mode of an antenna set for each connection-target communication node.

In another embodiment for a step of determining through an interconnection, the controller 210 may firstly determine a connection-target communication node set, determine an antenna set for each connection-target communication node according to the determined connection-target communication node set, determine an antenna element operation mode by considering the determined connection-target communication node set and the determined antenna set for each connection-target communication node, and determine a combined operation mode of an antenna set for each connection-target communication node.

In another embodiment for a step of determining through an interconnection, the controller 210 may firstly determine a connection-target communication node set, determine an antenna element operation mode according to the determined connection-target communication node set, determine an antenna set for each connection-target communication node by considering the determined connection-target communication node set and the determined antenna element operation mode, and determine a combined operation mode of an antenna set for each connection-target communication node.

In another embodiment for a step of determining through an interconnection, the controller 210 may firstly determine an antenna set for each connection-target communication node, determine a connection-target communication node set according to the determined antenna set for each connection-target communication node, determine an antenna element operation mode by considering the determined antenna set for each connection-target communication node and the determined connection-target communication node set, and determine a combined operation mode of an antenna set for each connection-target communication node.

In another embodiment for a step of determining through an interconnection, the controller 210 may firstly determine an antenna set for each connection-target communication node, determine an antenna element operation mode according to the determined antenna set for each connection-target communication node, determine a connection-target communication node set by considering the determined antenna set for each connection-target communication node and the determined antenna element operation mode, and determine a combined operation mode of an antenna set for each connection-target communication node.

In another embodiment for a step of determining through an interconnection, the controller 210 may firstly determine an antenna element operation mode, determine a connection-target communication node set according to the determined antenna element operation mode, determine an antenna set for each connection-target communication node by considering the determined antenna element operation mode and the connection-target communication node set, and determine a combined operation mode of an antenna set for each connection-target communication node.

In another embodiment for a step of determining through an interconnection, the controller 210 may firstly determine an antenna element operation mode, determine an antenna set for each connection-target communication node according to the determined antenna element operation mode, determine a connection-target communication node set by considering the determined antenna element operation mode and the antenna set for each connection-target communication node, and determine a combined operation mode of an antenna set for each connection-target communication node.

In another embodiment for a step of determining through an interconnection, the controller 210 may firstly determine a combined operation mode of an antenna set for each connection-target communication node, determine an antenna element operation mode according to the determined combined operation mode of the antenna set for each connection-target communication node, and determine a combined operation mode of an antenna set for each connection-target communication node.

In another embodiment for a step of determining through an interconnection, the controller 210 may firstly determine an antenna set for each connection-target communication node, determine a combined operation mode of an antenna set for each connection-target communication node according to the determined antenna set for each connection-target communication node, determine an antenna element operation mode, and determine a connection-target communication node set.

In another embodiment for a step of determining through an interconnection, the controller 210 firstly determines a connection-target communication node set, and determines a communicating antenna set for each connection-target communication node, an antenna element operation mode, an a combined operation mode of an antenna set for each connection-target communication node according to the determined connection-target communication node set. As described above, the controller 210 may determine a connection-target communication node, a communicating antenna element operation mode, and a combined operation mode an antenna set by various orders, and may control the antenna unit 230 thereby the determined communicating antenna transmits/receives data to/from a connection-target communication node in the determined operation mode.

As described above, upon establishing connection with at least one connection-target communication node, the controller 210 may determine a combined operation mode of an antenna set by combining a plurality of communicating antennas when there are at least two communicating antennas for each of at least one connection-target communication node.

That is, the controller 210 may determine a combined operation mode of a related antenna set for each connection-target communication node as one of a combined omnidirectional mode, a combined directional mode, a combined diversity mode, a combined multiplexing mode, a combined diversity-multiplexing hybrid mode, and a combined CDD mode by determining at least one of a combined beam pattern and a combining signal transmission/reception scheme of a plurality of communicating antennas.

The controller 210 may determine a combined operation mode of an antenna set for each communication node which consists of a plurality of communicating antennas based on the described conditions.

The controller 210 may determine a connection-target communication node, a communicating antenna, an antenna element operation mode, and a combined operation mode of an antenna set through an interconnection. An interconnection among the described four elements according to various embodiments of the present invention will be described below.

In one embodiment for a step of determining through a interconnection, the controller 210 cooperatively determines a connection-target communication node set, an antenna set for each connection-target communication node set, an antenna element operation mode, and a combined operation mode of an antenna set for each connection-target communication node.

In one embodiment for a step of determining through a interconnection, the controller 210 cooperatively determines a connection-target communication node set, an antenna set for each connection-target communication node, and an antenna element operation mode, and determines a combined operation mode of an antenna set for each connection-target communication node according to the determined connection-target communication node set, antenna set for each connection-target communication node, and antenna element operation mode.

In one embodiment for a step of determining through a interconnection, the controller 210 cooperatively determines a connection-target communication node set, and an antenna set for each connection-target communication node, and cooperatively determines an antenna element operation mode and a combined operation mode of an antenna set for each connection-target communication node according to the determined connection-target communication node set and antenna set for each connection-target communication node.

In one embodiment for a step of determining through a interconnection, the controller 210 firstly determines a connection-target communication node set, and cooperatively determines an antenna set for each connection-target communication node, an antenna element operation mode and a combined operation mode of an antenna set for each connection-target communication node according to the determined connection-target communication node set.

In one embodiment for a step of determining through a interconnection, the controller 210 firstly determines a connection-target communication node set, determines an antenna set for each connection-target communication node according to the determined connection-target communication node set, determines an antenna element operation mode according to the determined connection-target communication node set and antenna set for each connection-target communication node, and determines a combined operation mode of an antenna set for each connection-target communication node according to the determined connection-target communication node set, antenna set for each connection-target communication node, and antenna element operation mode.

Further, various embodiments are possible. Upon determining a connection-target communication node set, an antenna set for each connection-target communication node, an antenna element operation mode, and combined operation mode of an antenna set for each connection-target communication node, a reference communication node may establish various connections with at least one connection-target communication node according to an order of determining a cooperatively determining target and target sets which are determined respectively or cooperatively.

Various embodiments as well as this are possible. A connection-target communication node set, an antenna set for each connection-target communication node, an antenna element operation mode, whether to use commonly an antenna set and/or to share resource, an order of determining these, and whether to cooperatively determine these may be different according to a combined operation mode of an antenna set for each connection-target communication node, so a reference communication node may establish various connections with at least one connection-target communication node.

Hereinafter, various embodiments of the present invention will be described with reference to the appended drawings.

FIGS. 3a to 3e illustrate a connection configuration that a reference communication node determines an antenna set for communicating with each of connection-target communication nodes and determines a common use configuration of the antenna set for communicating with each of the connection-target communication nodes according to an embodiment of the present invention.

Figure 3A:
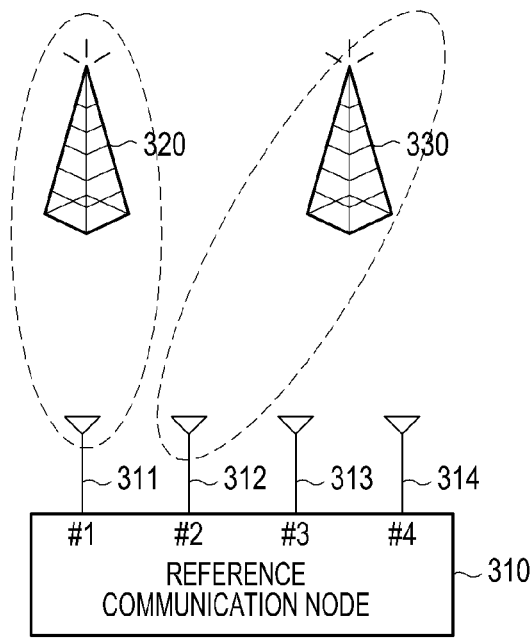
FIGS. 3a to 3e illustrate a connection configuration that a reference communication node determines an antenna set for communicating with each of connection-target communication nodes and determines a common use configuration of the antenna set for the communication with each of the connection-target communication nodes according to an embodiment of the present invention.

As described in FIG. 3a, a reference communication node 310 includes four antennas 311, 312, 313, 314, and may communicate with a first and a second connection-target communication nodes 320, 330. In this case, the reference communication node 310 may determine a communicating antenna for communicating with a connection-target communication as at least one among the four antennas. At least one communicating antenna composing an antenna ser for communicating with one connection-target communication node 320 may be compose an antenna set for another connection-target communication node 330. That is, a part or all of communication nodes which composes a connection-target communication node set to which the reference communication node 310 connects may establish a connection in order to use commonly a part or all of antennas included in an antenna set for each connection-target communication node.

Upon using commonly at least one communicating antenna which composes an antenna set for each connection-target communication nodes 320, 330, the reference communication node 310 may establish a connection using different resources or the same resource. Here, the resource includes a frequency, time, a code, and the like.

FIG. 3a schematically illustrates a connection configuration in which a reference communication node determines antenna sets for each of two connection-target communication nodes which consist of one different communicating antenna according to an embodiment of the present invention.

As illustrated in FIG. 3a, for example, a reference communication node 320 may firstly determine a first communication node 330 and a second communication node 320 as a connection-target communication node. After determining the connection-target communication node, the reference communication node 310 may determine a first antenna 311 and a second antenna 312 among a plurality of antennas 311, 312, 313, 314 as a communicating antenna. Specially, the reference communication node 310 may determine a communicating antenna for a first connection-target communication node 320 and a communicating antenna for a second connection-target communication node 330 as the first antenna 311 and the second antenna 312, respectively. Further, the reference communication node 310 may determine an operation mode for each of the determined communicating antennas 311, 312, and may control the communicating antennas 311, 312 to transmit/receive data to/from the first connection-target communication node 320 and the second connection-target communication node 330, respectively according to the determined operation mode.

In this way, each of connection-target communication nodes determines antenna sets for each connection-target communication node which consists of at least one different antenna, so a reference communication node may establish a connection.

Figure 3B:
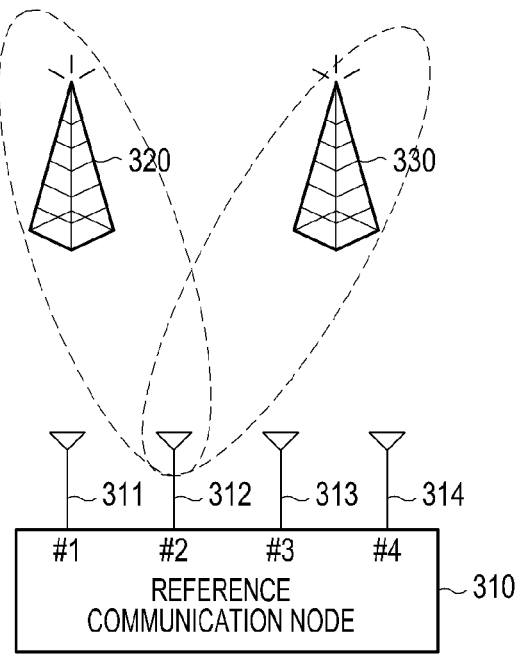

FIG. 3b schematically illustrates a connection configuration in which a reference communication node determines antenna sets for each of two connection-target communication nodes which are configured in order to use commonly one communicating antenna according to an embodiment of the present invention.

In an embodiment described in FIG. 3b, for example, a reference communication node 310 may determine a first communication node 310 and a second communication node 320 as a connection-target communication node. The reference communication node 310 may determine a communicating antenna for a first connection-target communication node 320 and a second connection-target communication node 330 as a second antenna 312.

In this way, a reference communication node may determine an antenna set for each connection-target communication node such that each of connection-target communication nodes uses commonly at least one communicating antenna.

Figure 3C:
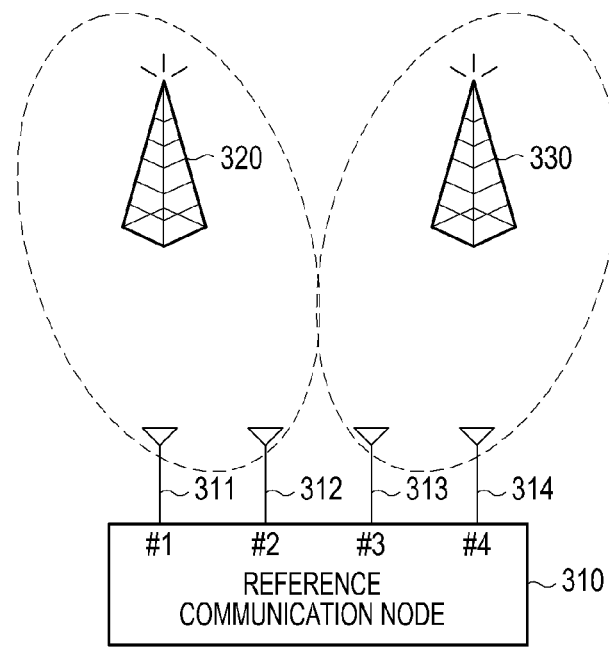

FIG. 3c schematically illustrates a connection configuration in which a reference communication node determines antenna sets for each of two connection-target communication nodes which consist of two different communicating antennas according to an embodiment of the present invention.

As illustrated in FIG. 3c, for example, a reference communication node 310 may firstly determine a first node 310 and a second node 320 as a connection-target communication node. The reference communication node 310 may determine a set of communicating antenna for a first connection-target communication node 320 as a first antenna 311 and a second antenna 312, and may determine a set of communicating antenna for a second connection-target communication node 330 as a third antenna 313 and a fourth antenna 314.

In this way, a reference communication node may determine an antenna set for each connection-target communication node, so that at least one communicating antenna for a connection-target communication node is different from another at least one communicating antenna for anther connection-target communication node.

Figure 3D:
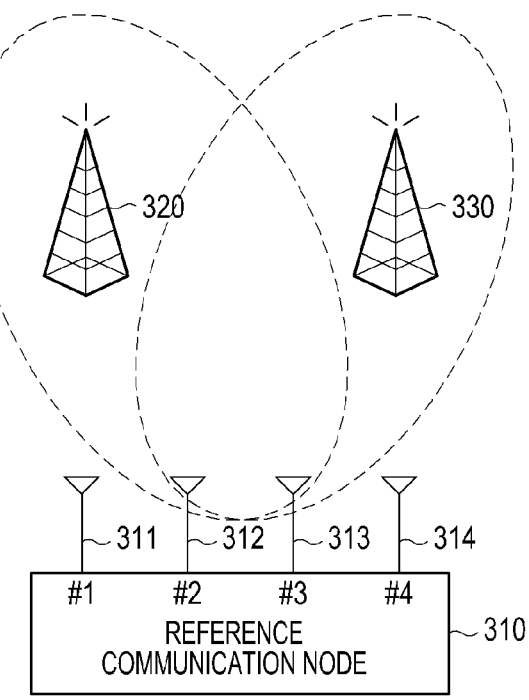

FIG. 3d schematically illustrates a connection configuration in which a reference communication node determines antenna sets for each of two connection-target communication nodes which are configured in order to use commonly two communicating antennas according to an embodiment of the present invention.

As illustrated in FIG. 3d, for example, a reference communication node 310 may firstly determine a first node 310 and a second node 320 as a connection-target communication node. The reference communication node 310 may determine a set of communicating antenna for a first connection-target communication node 320 as a second antenna 312 and a third antenna 313, and may determine a set of communicating antenna for a second connection-target communication node 330 as the second antenna 312 and the third antenna 313.

In this way, a reference communication node may determine an antenna set for each connection-target communication node which each of connection-target communication nodes uses commonly at least one antenna.

Figure 3E:
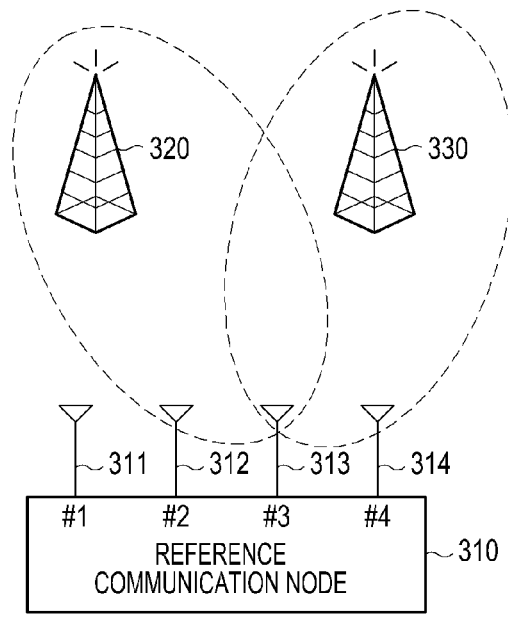

FIG. 3e schematically illustrates a connection configuration in which a reference communication node determines antenna sets for each connection-target communication node in order to use commonly a part or all of antennas included in each antenna set according to an embodiment of the present invention.

As illustrated in FIG. 3e, for example, a reference communication node 310 may firstly determine a first node 310 and a second node 320 as a connection-target communication node. The reference communication node 310 may determine a set of communicating antenna for a first connection-target communication node 320 as a second antenna 312 and a third antenna 313, and may determine a set of communicating antenna for a second connection-target communication node 330 as the third antenna 313 and a fourth antenna 314.

In this way, a reference communication node may determine an antenna set for each connection-target communication node which each of connection-target communication nodes uses commonly at least one antenna.

Figure 4A:
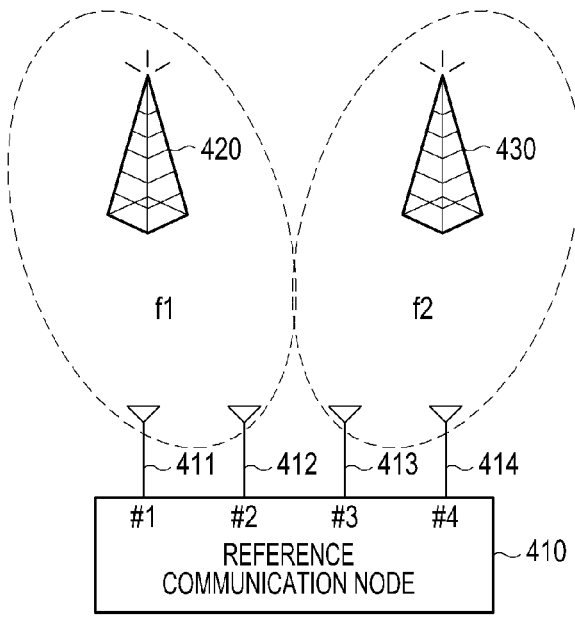
FIGS. 4a to 4c illustrate a connection configuration that a reference communication node determines a sharing configuration of resource for communicating with each of at least two connection-target communication nodes.
Figure 4B:
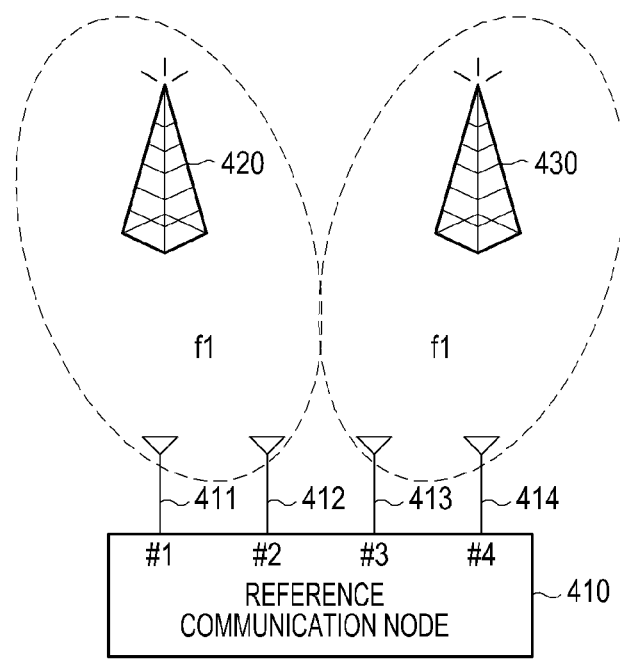
Figure 4C:
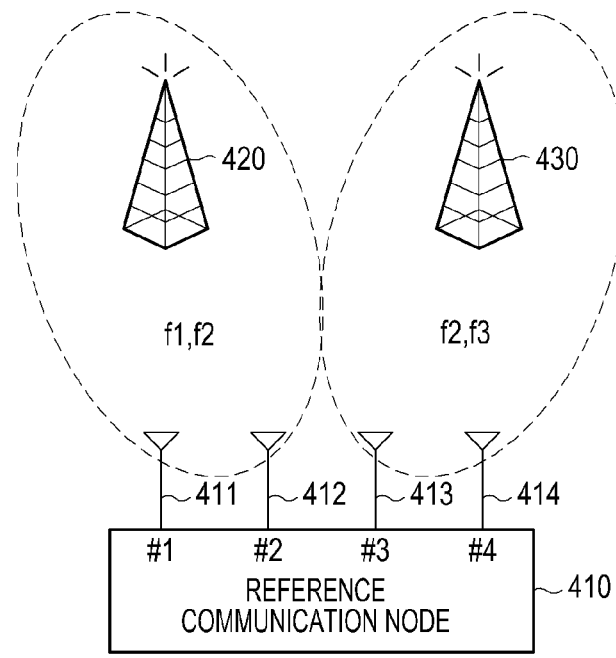

FIGS. 4a to 4c illustrate a connection configuration that a reference communication node determines a sharing configuration of resource for communicating with each of at least two connection-target communication nodes.

As described in FIG. 4a, a reference communication node 410 may connect to at least two connection-target communication nodes 420, 430. In this regard, the reference communication node 410 may determine to share resource. The resource may include a frequency, time, a code, and the like. Specially, in one possible embodiment, the reference communication node 410 in FIGS. 4a to 4c may determine whether to share a frequency resource.

FIG. 4a schematically illustrates a connection configuration in which a reference communication node determines a resource sharing configuration in order that each of two connection-target communication nodes does not share resource according to an embodiment of the present invention.

As illustrated in FIG. 4a, for example, a reference communication node 410 may firstly determine a first communication node 420 and a second communication node 430 as a connection-target communication node. After determining the connection-target communication node, the reference communication node 310 may determine a first antenna 411 and a second antenna 412 as a communicating antenna corresponding to a first connection-target communication node 420, and may determine a third antenna 413 and a fourth antenna 414 as a communicating antenna corresponding to a second connection-target communication node 430.

The reference communication node 410 may control a first antenna 411 and a second antenna 412 to use a first frequency (f1), and control a third antenna 413 and a fourth antenna 414 to use a second frequency (f2), so the reference communication node 410 may control the first connection-target communication node 420 and the second connection-target communication node 430 not to share resource using different frequencies, respectively.

In this way, a reference may determine that each of connection-target communication nodes determines antenna sets for each connection-target communication node which consists of at least one different antenna, and uses a resource for each different connection-target communication node.

FIG. 4b schematically illustrates a connection configuration in which a reference communication node determines a resource sharing configuration in order that each of two connection-target communication nodes shares resource according to an embodiment of the present invention.

As illustrated in FIG. 4b, for example, a reference communication node 410 may firstly determine a first communication node 420 and a second communication node 430 as a connection-target communication node. After determining the connection-target communication node, the reference communication node 410 may determine a first antenna 411 and a second antenna 412 as a communicating antenna corresponding to a first connection-target communication node 420, and may determine a third antenna 413 and a fourth antenna 414 as a communicating antenna corresponding to a second connection-target communication node 430.

The reference communication node 410 may control the first antenna 411 and the second antenna 412 to use the first frequency (f1), and control the third antenna 413 and the fourth antenna 414 to use the second frequency (f2), so the reference communication node 410 may control the first connection-target communication node 420 and the second connection-target communication node 430 to share resource using the different frequency, respectively.

In this way, a reference may determine that each of connection-target communication nodes determines antenna sets for each connection-target communication node which consists of at least one different antenna, and shares resource for each of at least one connection-target communication node.

FIG. 4c schematically illustrates a connection configuration in which a reference communication node determines a resource sharing configuration in order that each of two connection-target communication nodes shares a part of resource according to an embodiment of the present invention.

As illustrated in FIG. 4c, for example, a reference communication node 410 may firstly determine a first communication node 420 and a second communication node 430 as a connection-target communication node. After determining the connection-target communication node, the reference communication node 410 may determine a first antenna 411 and a second antenna 412 as a communicating antenna corresponding to a first connection-target communication node 420, and may determine a third antenna 413 and a fourth antenna 414 as a communicating antenna corresponding to a second connection-target communication node 430.

The reference communication node 410 controls the first antenna 411 and the second antenna 412 to use a first frequency (f1) and a second frequency (f2), may control the third antenna 413 and the fourth antenna 414 to use the second frequency (f2) and a third frequency (f3), so the reference communication node 410 controls each of the first connection-target communication node 420 and the second connection-target communication node 430 to share a part of resource by sharing a partially same frequency. So, the first connection-target communication node 420 and the second connection-target communication node 430 may share a part of resource, i.e., the second frequency (f2).

In this way, a reference may determine that each of connection-target communication nodes determines antenna sets for each connection-target communication node which consists of at least one different antenna, and shares a part or all of resource for each connection-target communication node.

FIGS. 5a to 5d illustrate a connection configuration that a reference communication node determines a common use configuration of an antenna set and a sharing configuration of resource for communicating with each of at least two connection-target communication nodes according to various embodiments.

Figure 5A:
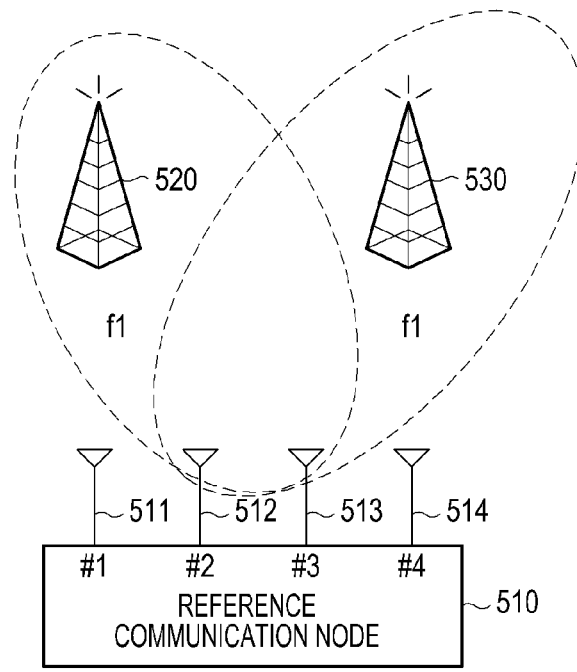
FIGS. 5a to 5d illustrate a connection configuration that a reference communication node determines a common use configuration of an antenna set and a sharing configuration of resource for communicating with each of at least two connection-target communication nodes according to various embodiments.

FIG. 5a schematically illustrates a connection configuration in which a reference communication node determines a common use configuration of an antenna set and a sharing configuration of resource in order that each of two connection-target communication nodes uses commonly an antenna set and shares resource according to an embodiment of the present invention.

As illustrated in FIG. 5a, for example, a reference communication node 510 may firstly determine a first communication node 520 and a second communication node 530 as a connection-target communication node. After determining the connection-target communication node, the reference communication node 510 may determine a second antenna 512 and a third antenna 513 as a communicating antenna corresponding to a first connection-target communication node 520, and may determine the second antenna 512 and the third antenna 513 as a communicating antenna corresponding to a second connection-target communication node 530.

The reference communication node 510 controls the second antenna 512 and the third antenna 513 to communicate with the first connection-target communication node 520 using a first frequency (f1), may control the second antenna 512 and the third antenna 513 to communicate with the second connection-target communication node 530 using the first frequency (f1), so the first connection-target communication node 520 and the second connection-target communication node 530 may share resource using the same frequency.

In this way, a reference may determine that each of connection-target communication nodes determines antenna sets for each connection-target communication node in order to use commonly at least one antenna which composes each of antenna sets for each connection-target communication node, and shares resource for each of at least one connection-target communication node.

Figure 5B:
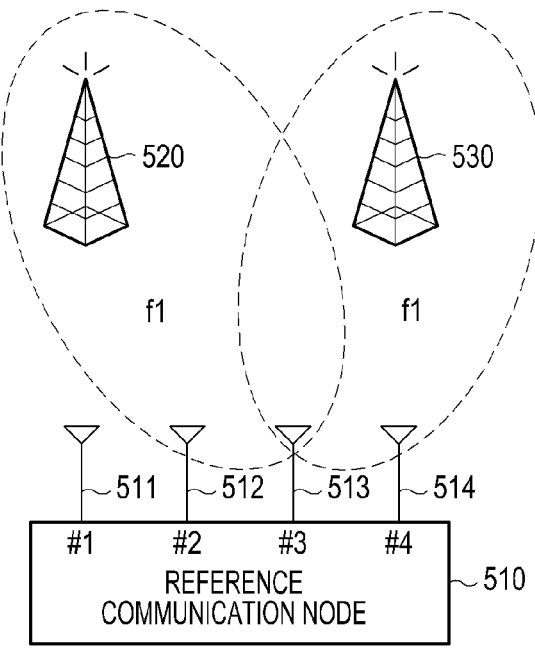

FIG. 5b schematically illustrates a connection configuration in which a reference communication node determines a common use configuration of an antenna set and a sharing configuration of resource in order that each of two connection-target communication nodes uses commonly a part of antennas included in an antenna set and shares resource according to an embodiment of the present invention.

As illustrated in FIG. 5b, for example, a reference communication node 510 may firstly determine a first communication node 520 and a second communication node 530 as a connection-target communication node. After determining the connection-target communication node, the reference communication node 510 may determine a second antenna 512 and a third antenna 513 as a communicating antenna corresponding to a first connection-target communication node 520, and may determine the third antenna 513 and a fourth antenna 514 a communicating antenna corresponding to a second connection-target communication node 530.

The reference communication node 510 controls the second antenna 512 and the third antenna 513 to communicate with the first connection-target communication node 520 using a first frequency (f1), may control the third antenna 513 and the fourth antenna 514 to communicate with the second connection-target communication node 530 using the first frequency (f1), so the first connection-target communication node 520 and the second connection-target communication node 530 may share resource using the same frequency.

In this way, a reference may determine that each of connection-target communication nodes determines antenna sets for each connection-target communication node in order to use commonly a part or all of antennas which compose each of antenna sets for connection-target communication node, and shares resource for each of at least one connection-target communication node.

Figure 5C:
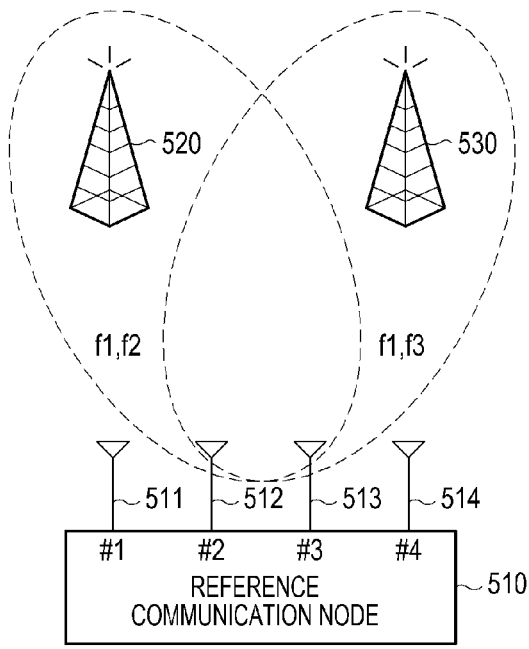

FIG. 5c schematically illustrates a connection configuration in which a reference communication node determines a common use configuration of an antenna set and a sharing configuration of resource in order that each of two connection-target communication nodes uses commonly an antenna set and shares a part of resource according to an embodiment of the present invention.

As illustrated in FIG. 5c, for example, a reference communication node 510 may firstly determine a first communication node 520 and a second communication node 530 as a connection-target communication node. After determining the connection-target communication node, the reference communication node 510 may determine a second antenna 512 and a third antenna 513 as a communicating antenna corresponding to a first connection-target communication node 520, and may determine the second antenna 512 and the third antenna 513 a communicating antenna corresponding to a second connection-target communication node 530.

The reference communication node 510 controls the second antenna 512 and the third antenna 513 to communicate with the first connection-target communication node 520 using a first frequency (f1) and a second frequency (f2), may control the second antenna 512 and the third antenna 513 to communicate with the second connection-target communication node 530 using the first frequency (f1) and a third frequency (f3), so the first connection-target communication node 520 and the second connection-target communication node 530 may share a part of resource, i.e., the first frequency (f1).

In this way, a reference may determine that each of connection-target communication nodes determines antenna sets for each connection-target communication node in order to use commonly at least one antenna which composes each of antenna sets for each connection-target communication node, and shares a part or all of resource for each connection-target communication node.

Figure 5D:
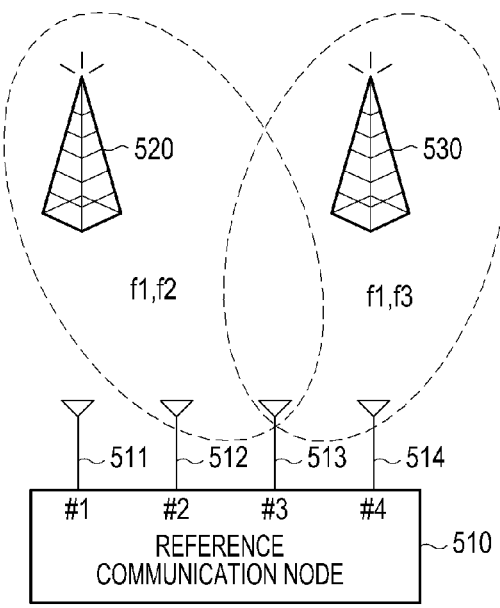

FIG. 5d schematically illustrates a connection configuration in which a reference communication node determines a common use configuration of an antenna set and a sharing configuration of resource in order that each of two connection-target communication nodes uses commonly a part of antennas included in an antenna set and shares a part of resource according to an embodiment of the present invention.

As illustrated in FIG. 5d, for example, a reference communication node 510 may firstly determine a first communication node 520 and a second communication node 530 as a connection-target communication node. After determining the connection-target communication node, the reference communication node 510 may determine a second antenna 512 and a third antenna 513 as a communicating antenna corresponding to a first connection-target communication node 520, and may determine the third antenna 514 and a forth antenna 514 a communicating antenna corresponding to a second connection-target communication node 530.

The reference communication node 510 controls the second antenna 512 and the third antenna 513 to communicate with the first connection-target communication node 520 using a first frequency (f1) and a second frequency (f2), may control the third antenna 513 and the fourth antenna 514 to communicate with the second connection-target communication node 530 using the first frequency (f1) and a third frequency (f3), so the first connection-target communication node 520 and the second connection-target communication node 530 may share a part of resource using a partially same resource. The first connection-target communication node 520 and the second connection-target communication node 530 may use commonly the third antenna 513 as a part of a communicating antenna set of each of the first connection-target communication node 520 and the second connection-target communication node 530 and the partial resource, i.e., the first frequency (f1).

In this way, a reference may determine that each of connection-target communication nodes determines antenna sets for each connection-target communication node in order to use commonly a part or all of antennas which compose each of antenna sets for each connection-target communication node, and shares a part or all of resource for each connection-target communication node.

As described above, if the reference communication node 510 shares and uses resource for each connection-target communication node, a resource sharing technology such as a superposition method, a code division multiplexing method, a space multiplexing method, a multi user-multiple input multiple output (MU-MIMO) method, a beam forming method, a switched beam method, and the like may be applied.

Here, the superposition coding method is a method in which a plurality of independent signals are superposed-transmitted through one radio resource, and a method in which signals are transmitted by hierarchizing the signals by dividing transmit power of each signal.

The code division multiplexing method is a method in which a plurality of signals are transmitted using sequences which are mutually orthogonal or sequences which have few or no mutual orthogonality, and a multiplexing method in which each user signal is transmitted using codes which have low correlation or low orthogonality.

The space multiplexing method is a method in which a plurality of independent signals are multiplexed in order to classify the plurality of the independent signals using an antenna in which a spatial division is possible or a spatial path, and a multiplexing method in which multi user signals are transmitted using a channel of which a spatial characteristic is different.

A multi-user MIMO transmission method is a multiplexing method in which signals for each user are transmitted in order to spatially classify the signals for each user, and a multiplexing method in which each user transmits each user's signal in order to classify each user's signal through an MIMO pre-coding transmission method or a spatial division of a plurality of independent user signals.

A beam forming method is a multiplexing method in which a plurality of independent signals are multiplexing transmitted by classifying the plurality of independent signals through directional beams of which mutual interference is small, and a multiplexing method in which each user signal is transmitted using a related directional beam by forming a directional beam towards each user using channel information or location information of multi users.

A switched beam method is a multiplexing method in which a plurality of independent signals are multiplexing transmitted by classifying the plurality of independent signals through a pre-formed directional beams, and a multiplexing method in which each user signal is transmitted using at least one directional beam which is appropriate in a location of a user among pre-formed directional beams.

Hereinafter, a detailed description of an antenna element operation mode of each communicating antenna will be followed with reference to the appended drawings. Here, the communicating antenna element operation mode may configure a plurality of beam spaces. So, an antenna control method in which an element antenna beam pattern is adjusted in order to for at least one beam space or change at least one beam space according to a communication environment using one antenna which may form a directional beam may be implemented.

The element antenna beam pattern may be determined by controlling a beam space shape, the number of beam spaces, a beam space direction, and the like. The antenna element operation mode includes an element antenna omni-directional mode, an element antenna directional mode, an element antenna directional diversity mode, an element antenna directional multiplexing mode, and an element antenna off mode, and may provide a high quality and/or a high-speed communication by operating an antenna element operation mode appropriate for a communication environment.

Figure 6A:
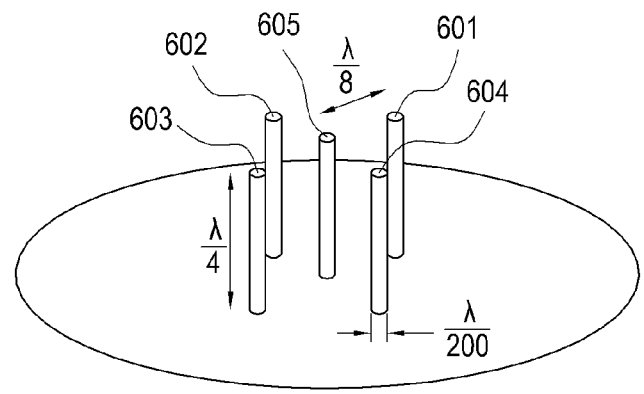
FIG. 6a illustrates a monopole Switched Parasitic Antenna (SPA) including five elements.

FIG. 6a schematically illustrates a monopole Switched Parasitic Antenna (SPA) including five elements.

A Switched Parasitic Antenna (SPA) is one antenna technology for operating an antenna element operation mode, and consists of one active element which is generally located in a center, and a plurality of passive elements which are located around the active element. The active element which is generally located in the center is connected to a radio transceiver, and the plurality of passive elements determines a direction of a beam by opening or shorting using a pin diode. The SPA denotes an antenna which may form a directional beam using one RF front-end with various methods as well as this.

As illustrated in FIG. 6a, a monopole SPA may include a first to a fifth elements 601 to 605. Preferably, each of elements 601 to 605 may be implemented in the same size, and have a ¼ length and a ¹⁄₂₀₀ diameter of a wave of a transmission/reception electric wave.

A first to a fourth elements 601 to 604 are passive elements, may be opened or shorted using a pin diode, so the first to the fourth elements 601 to 604 may determine a direction of a beam. The fifth element 605 is an active element, and may be connected to a reference communication node.

Figure 6B:
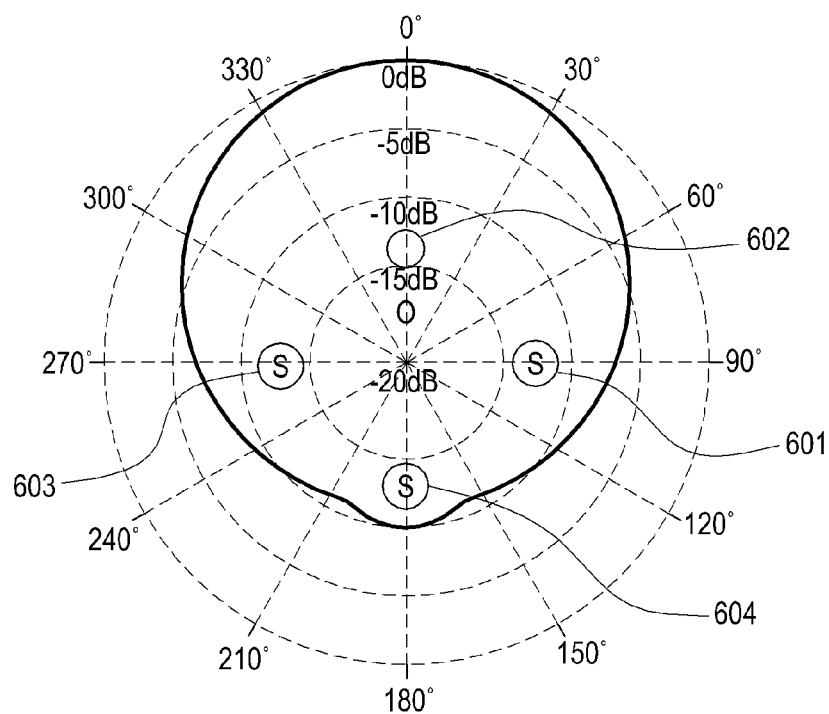

FIG. 6b schematically illustrates an antenna radiation pattern if a second element 602 is opened and a first, a third, and a fourth elements 601, 603, 604 are shorted. As illustrated in FIG. 6b, a reference communication node may form a different radiation pattern by controlling an opening or shortening of each element of an SPA, so the reference communication node may form a desired directional beam. If all elements are shorted or opened, a beam which omni-directionally radiates may be formed.

Figure 7:
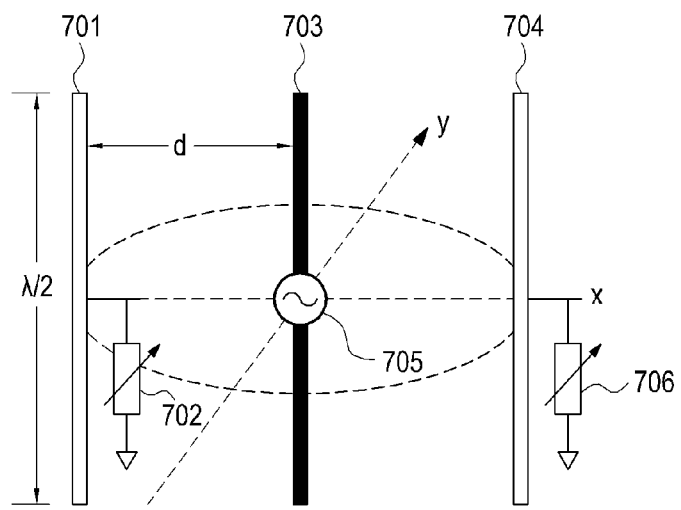
FIG. 7 illustrates an Electronically Steerable Passive Array Radiator (ESPAR)

FIG. 7 schematically illustrates an Electronically Steerable Passive Array Radiator (ESPAR).

As illustrated in FIG. 7, an ESPAR antenna consists of one active element 703 which is located in a center, and a plurality of passive elements 701, 704 which are located around the active element 703. The active element 703 and the passive element 701 may be arranged a predetermined distance (d) apart. The ESPAR may transmit/receive an electric wave of one wave. Lengths of the active element 703 and the passive elements 701, 704 may be preferably ½ of a wave. Meanwhile, y denotes an admittance matrix indicating mutual coupling among elements, and x denotes a reactance matrix for determining a pattern of an antenna.

The active element 703 which is located in the center may be directly connected to a radio transceiver, and the plurality of passive elements 701, 704 may be short or a variable reactor may be added to the plurality of passive elements 701, 704 for controlling a complex part of input impedance. According to an adjustment of a value of a reactor, a beam and null may be formed towards a specific direction, so a radiation pattern which is formed from the ESPAR antennas may be controlled.

The following various communicating antenna element operation modes may be controlled by controlling a shorting or an opening of each element of the monopole SPA in FIG. 6a and the ESPAR in FIG. 7.

An element antenna omni-directional mode as a first antenna element operation mode of a communicating antenna may be an operation in which all beam spaces are used at the same time or a signal is transmitted or received by forming a beam which omni-directionally radiates with other method which forms an omni-directional beam.

For example, a monopole SPA in FIG. 6a opens all of four passive elements 601 to 604, so the monopole SPA in FIG. 6a may transmit or receive a signal by forming a beam which omni-directionally radiates using all beam spaces. The monopole SPA in FIG. 6a may transmit or receive a signal by forming a beam which omni-directionally radiates by shorting the four passive elements 601 to 604.

An operation of an element antenna omni-directional mode using a single SPA may differentiate the number of available beam spaces, a beam width, and the like by differentiating an SPA design method, and transmit and/or receive a signal by forming a beam which omni-directionally radiates by selecting all available beam spaces and using the selective available beam spaces or by not using all beam spaces. Further, omni-directional radiation beam may be formed using various beam space pattern designs and a beam space selection according to an antenna design method, and the formed omni-directional radiation beam may be used.

An element antenna directional mode as a second antenna element operation mode of a communicating antenna may be an operation in which a directional beam which radiates towards a specific direction is formed using at least one beam space, and a signal is transmitted or received through the directional beam.

For example, a monopole SPA in FIG. 6a may form a beam space which radiates towards a specific direction as described in FIG. 6b by opening one of four passive elements and shorting the rest of the four passive elements. The monopole SPA in FIG. 6a may form a directional beam simultaneously using a beam space which radiates towards more than two different directions by simultaneously opening more than two passive elements. Further, the number of available beam spaces and a beam width may be different according to an SPA design method, and a signal may be transmitted and/or received by forming a directional beam which radiated towards a desired direction by selecting one beam space among available beam spaces. An operation of various element antenna directional modes is possible according to a directional beam adjustment period, a beam width, the number of beam spaces which are simultaneously selected, and the like.

An element antenna directional diversity mode as a third antenna element operation mode of a communicating antenna may be an operation in which a signal is directional diversity transmitted using a method such as a transmit diversity method, an Alamouti diversity method, an STBC method, and the like through at least two available beam spaces.

For a reception on an operation of a directional diversity transmission mode, quality of a received signal may increase by operating in order that an omni-directional reception or a directional reception is possible using beam spaces used for a directional diversity transmission. If two beam spaces are used, a signal may be transmitted using a transmit diversity method by transmitting the same signal through two beam spaces, or a signal may be transmitted using an Alamouti diversity method or an STBC method through a space coding transmission using two beam spaces and a time coding transmission using additional time.

Figure 8:
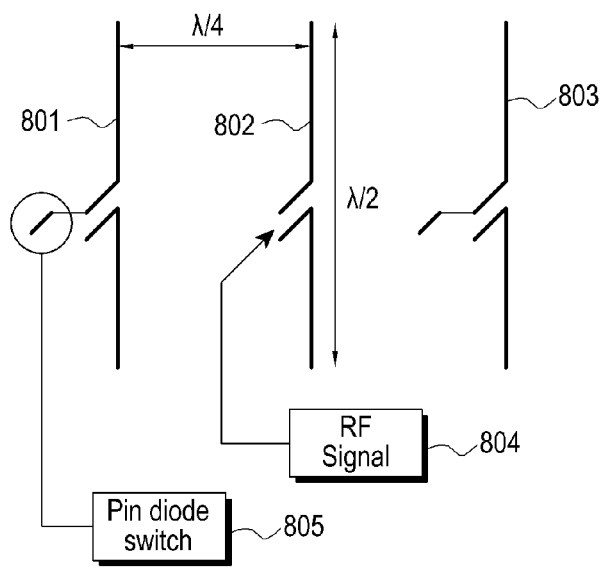
FIG. 8 illustrates a dipole SPA including three elements.

FIG. 8 schematically illustrates a dipole SPA including three elements. As illustrated in FIG. 8, a dipole SPA may include an active element 802 which is arranged in a center, and two passive elements 801, 803 which are arranged on both sides of the active element 802.

A distance between the active element 802 and the passive element 801 may be preferably ¼ of a transmitted/received electromagnetic wave, and lengths of elements may be preferably ½ of the wave.

A dipole SPA antenna omni-directionally forms a beam if all of the passive elements 801, 803 are opened or shorted. If one passive element is short and opposite passive element is opened, the dipole SPA antenna forms a heart shape-directional beam which has an antenna gain which is high towards a direction of the short passive element. Directional diversity transmission or directional multiplexing transmission may be performed by changing a radiation pattern according to an information value which will be transmitted in every symbol using these radiation patterns.

A radiation pattern of a three element-dipole SPA in FIG. 8 may be expressed as $B_T x$. $B_T$ denotes basis vector functions, and x denotes an input signal. $B_T$ is expressed as cardioid functions which are defined as expressed in Equation (1) which is typically used.

$$B_{T,1}(\theta) = 1 + \cos\theta$$
$$B_{T,2}(\theta) = 1 - \cos\theta \qquad [\text{Equation 1}]$$

Upon operating an element antenna directional diversity mode using a transmit diversity method through one SPA which has two beam spaces illustrated in FIG. 8, a reference communication node transmits an input signal x which is defined as Equation (2) in order to transmit the same signal $s_1$ using two beam spaces, so a transmit diversity transmission is possible.

$$x = \sqrt{\frac{E_S}{2}} \begin{bmatrix} s_1 \\ s_2 \end{bmatrix} \qquad [\text{Equation 2}]$$

In this way, a reference communication node simultaneously transmits the same signal using a part or all of available beam spaces, so various transmit diversity transmissions are possible. The number of available beam spaces, a beam width, and the like may be different according to an SPA design method.

Upon operating an element antenna directional diversity mode using one SPA, a reference communication node transmits an input signal which is defined as Equation (3) using an Alamouti diversity method as a typical diversity transmission method through two beam spaces, so a 2×2 beam space-time transmission is possible.

$$x = \sqrt{\frac{E_S}{2}} \begin{bmatrix} s_1 & s_2 \\ -s_2^* & s_1^* \end{bmatrix} \quad \text{[Equation 3]}$$

Upon operating an element antenna directional diversity mode as an STBC method using one SPA, a reference communication node transmits an input signal using a beam space-time coding method through a part or all of available beam spaces, so an STBC transmission is possible. Equation (4) defines an input signal x for an STBC transmission using a Quasi-orthogonal STBC method through four beam spaces and time.

$$X = \sqrt{\frac{E_S}{2}} \begin{bmatrix} s_1 & s_2 & s_3 & s_4 \\ -s_2^* & s_1^* & -s_4^* & s_3^* \\ -s_3^* & -s_4^* & s_1^* & s_2^* \\ s_4 & -s_3 & -s_2 & s_1 \end{bmatrix} \quad \text{[Equation 4]}$$

In this way, various STBC transmissions are possible by selecting beam spaces necessary for an STBC transmission using a part or all of available spaces, and transmitting an input signal using a desired STBC method through the selected beam spaces. The number of available beam spaces, a beam width, and the like may be different according to an SPA design method.

In an element antenna directional multiplexing mode as a fourth antenna element operation mode of a communicating antenna, a reference communication node may perform directional multiplexing transmission for a signal using a space multiplexing method through at least two available beam spaces.

Upon operating a directional multiplexing transmission mode, for a reception, a reference communication node may perform a control operation in order that omni-directional reception or a directional reception is possible using beam spaces used for a directional multiplexing transmission, so quality of a received signal may increase. Upon using at least two beam spaces, a reference communication node may transmit a signal using a space multiplexing method by simultaneously transmitting different signals through each beam space.

In one embodiment for the element antenna directional multiplexing mode as a case that a element antenna directional multiplexing mode is operated using one SPA in FIG. 8, various radiation patterns in FIG. 9 may be used for multiplexing transmitting two On-Off Keying (OOK) modulation symbols.

FIG. 9 schematically illustrates various radiation patterns according to an element antenna directional multiplexing mode. As illustrated in FIG. 9, various radiation patterns may be formed according to a combination of $S_0$ and $S_\pi$.

As illustrated in FIG. 9, if all of values of $S_0$ and $S_\pi$ are 0, a radiation pattern of a circular shape may be formed. If a value of $S_0$ is 0 and a value of $S_\pi$ is 1, a radiation pattern of a circular shape that a left is sunken may be formed. If a value of $S_0$ is 1 and a value of $S_\pi$ is 0, a radiation pattern of a circle shape that a right is sunken may be formed. If all of values of $S_0$ and $S_\pi$ are 1, a radiation pattern of a circular shape may be formed.

The detailed various radiation patterns may be expressed as Equation (5).

$$B_T[1\ 1]^T = B_{T,1}(\hat{\Theta}_T) + B_{T,2}(\hat{\Theta}_T)$$

$$B_T[1\ 0]^T = B_{T,1}(\hat{\Theta}_T)$$

$$B_T[1\ 1]^T = B_{T,2}(\hat{\Theta}_T)$$

$$B_T[0\ 0]^T = 0 \quad \text{[Equation 5]}$$

In Equation (5), $\hat{\Theta}_T$ denotes a directional vector of an Angle Of Departure (AOD). Here, $B_T$ is identical to basis vector functions of an SPA for the diversity transmission.

An operation of element antenna directional multiplexing mode can be also implemented using an ESPAR antenna. FIGS. 10a to 10b schematically illustrate a radiation pattern which is possible in a case that two Binary Phase Shift Keying (BPSK) modulation symbols are directional multiplexing transmitted using three element ESPAR antennas.

FIG. 10a illustrates a case that two BPSK modulation symbols are identical, and it may be understood that a radiation pattern of a circular format may be formed. FIG. 10b illustrates a case that two BPSK modulation signals are different, and a radiation pattern that two successive circular radiation patterns are combined like a radiation pattern that a top and a bottom of a radiation pattern in FIG. 10a are sunken.

This radiation pattern may be expressed as Equation (6).

$$B_T[1\ 1]^T = B_{T,1}(\hat{\Theta}_T) + B_{T,2}(\hat{\Theta}_T)$$

$$B_T[1\ -1]^T = B_{T,1}(\hat{\Theta}_T) - B_{T,2}(\hat{\Theta}_T)$$

$$B_T[-1\ 1]^T = -B_{T,1}(\hat{\Theta}_T) + B_{T,2}(\hat{\Theta}_T)$$

$$B_T[-1\ -1]^T = -B_{T,1}(\hat{\Theta}_T) - B_{T,2}(\hat{\Theta}_T) \quad \text{[Equation 6]}$$

Here, $B_T$ may be identical to basis vector functions of an SPA for the directional diversity transmission. A radiation pattern of $B_T[1\ 1]^T$ and a radiation pattern of $B_T[-1\ -1]^T$ are identical, and a radiation pattern of $B_T[1\ -1]^T$ and a radiation pattern of $B_T[-1\ 1]^T$ are identical. However, two radiation patterns may be distinguished by rotating the two radiation patterns when the two radiation patterns are identical. For example, upon transmitting $B_T[1\ -1]^T$, a reference communication node may transmit the $B_T[1\ -1]^T$ through a radiation pattern depicted in FIG. 10b, and upon transmitting $B_T[-1\ 1]^T$, the reference communication node may transmit the $B_T[-1\ 1]^T$ through a radiation pattern of a shape that a radiation pattern depicted in FIG. 10b is rotated 90 degrees.

In this way, Transmission using various element antenna directional multiplexing modes is possible by changing an element antenna beam pattern according to information combination which the reference communication node intends to directional multiplexing transmit using the number of selectable beam spaces and an element antenna beam pattern which may be formed using the number of the selectable beam spaces. Here, an available beam space shape, the number of beam spaces, a beam space direction, and the like may be different according to an SPA design method. A reference communication node simultaneously transmits different user signals through each beam space using at least two beam spaces, so a multi-user directional multiplexing transmission as well as a single user directional multiplexing transmission is possible.

In a fifth antenna element operation mode of a communicating antenna, an element antenna off mode is a mode which a reference communication node does not use a related antenna.

As described above, an antenna element operation mode for each antenna may be variously configured, so an effective data transmission/reception may be implemented.

Hereinafter, for a plurality of communicating antennas, various embodiments for a combining method of an antenna set which consists of a plurality of antennas will be described with reference to the appended drawings. A terminal according to the present invention may variously configure a combined operation mode of an antenna set for each connection-target communication node through combination of an antenna set which consists of a plurality of antennas, so an effective data transmission/reception may be implemented.

If there are a plurality of communicating antennas, for a set of communicating antenna, an antenna set a reference communication node may multiply each communicating antenna by a combination factor, and may decreases the same channel interference using a direction of a signal by forming a directional beam according to the combination factor multiplication. Increase of a resource efficiency using a Space-Division Multiple Access (SDMA) and an effect of a high signal gain may be created.

A reference communication node may adjust a combination factor, so the reference communication node may form a directional beam towards a desired and arbitrary direction. If a channel among antenna elements of a communicating antenna is independently affected by fading, the reference communication node may increase signal quality or transmission rate by combining output signals for each communicating antenna for a diversity transmission or a space multiplexing.

Hereinafter, various embodiments of a combined operation mode of an antenna set for each communication node will be described using a communicating antenna set which consists of a plurality of communicating antennas.

A combined omni-directional mode as a first embodiment of a combined operation mode of a communicating antenna set is a combined operation mode of an antenna set which forms a beam which omni-directionally radiates by a combination of a communicating antenna set. A reference communication node determines a communicating antenna, and may control a communicating antenna set to form a beam which omni-directionally radiates. The reference communication node controls each communicating antenna to form different directional beams, and may control a communicating antenna to form a combined beam pattern which omni-directionally radiates in all communicating antenna sets.

Figure 11:
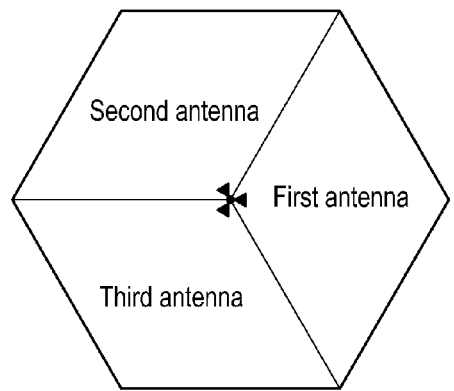
FIG. 11 illustrates an example of a combined omnidirectional mode as an embodiment of a combined operation mode of a communicating antenna set.

FIG. 11 schematically illustrates an example of a combined omni-directional mode as a first embodiment of a combined operation mode of a communicating antenna set.

A reference communication node may determine three communicating antennas. After determining the three communicating antennas, the reference communication node may control the three communicating antennas in order that a difference of a beam width and an angle of a beam direction among each of the three communicating antennas is 120°, so the reference communication node may control a beam which is radiated from the three communicating antennas to be omni-directionally radiated.

A beam pattern may be changed according to a design method of a communicating antenna. It will be understood by those of ordinary skill in the art that various combined omni-directional modes are possible according to a beam pattern, the number of antennas, and the like.

In a combined directional mode as a second embodiment of a combined operation mode of a communicating antenna set, a beam which is formed from sets of a communicating antenna radiates towards a specific direction.

A reference communication node may differently adjust a combination factor of each communicating antenna, so the reference communication node may control a beam which is formed from a communicating antenna set to be radiated towards a specific direction.

In an example of a combined directional mode, in a case that a reference communication node uses channel state information such as a case there is a channel information feedback, the reference communication node may form a beam which radiates towards a direction which the reference communication node intends to communicate and transmit and/or receive a signal through the beam by adjusting a combination factor of each antennas using the channel state information.

A reference communication node may control a combined beam pattern which is determined as a shape of a combined beam, a direction of the combined beam, the number of combined beams, and the like by adjusting a combination factor of each communicating antenna, so the reference communication node may form at least one combined directional beam which radiates towards a desired direction and transmit and/or receive a signal through the beam. Various combined directional modes may be implemented according to an adjustment period, a shape of a combined beam, the number of combined beams, a direction of the combined beam, and the like.

In a combined diversity mode as a third embodiment of a combined operation mode of a communicating antenna set, a reference communication node performs diversity transmission using a transmit diversity method, an Alamouti diversity method, an STBC method, and the like through a communicating antenna set, and performs diversity reception by combining signals which are received using a general reception diversity method.

For example, a reference communication node may simultaneously transmit the same signal using two communicating antennas, so the reference communication node may transmit a signal using a transmit diversity method, or transmit a signal using an Alamouti diversity method or an STBC method through a space coding transmission using two antennas and a time coding transmission using additional time.

Figure 12:
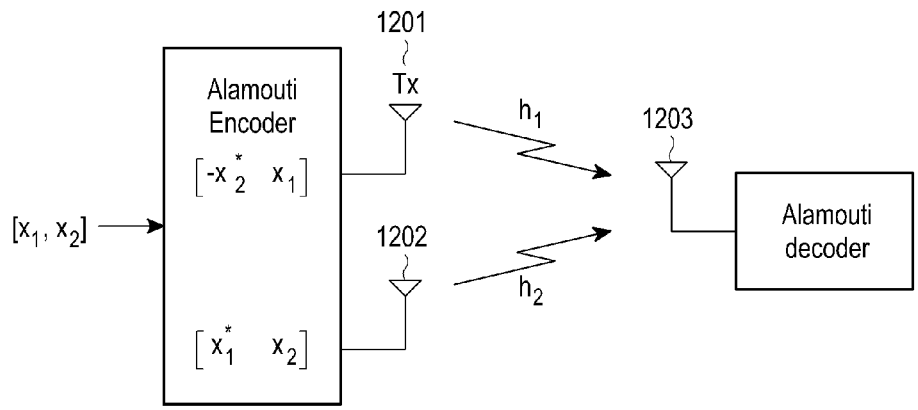
FIG. 12 illustrates a combined diversity mode as an embodiment of a combined operation mode of a communicating antenna set.

FIG. 12 schematically illustrates a combined diversity mode as a third embodiment of a combined operation mode of a communicating antenna set. A reference communication node in FIG. 12 uses a combined diversity mode in which the reference communication node diversity transmits/receives a signal using an Alamouti diversity method.

As illustrated in FIG. 12, a reference communication node may determine two communicating antennas 1201, 1202 as a communicating antenna set. The reference communication node transmits a signal $x_1$ via a first antenna 1201 and a signal $x_2$ via a second antenna on a first time slot. On a second time slot, the reference communication node transmits $-x_2^*$ via a first antenna and $x_1^*$ via the second antenna, so the reference communication node may transmit a signal in order to maintain orthogonality among signals. In an antenna 1203 of a related connection-target communication node, a transmit diversity gain may be maximally acquired through a simple linear decoding process.

Meanwhile, a connection-target communication node may perform a decoding using the followed method. In a case that it will be assumed that a channel is not changed during two successive time slots, if signals which are received during a first time slot and a second time slot are $r_1$ and $r_2$, the $r_1$ and $r_2$ may be expressed as Equation (7).

$$r_1 = h_1 x_1 + h_2 x_2 + n_1$$

$$r_2 = -h_1 x_2^* + h_2 x_1^* + n_2 \qquad \text{[Equation 7]}$$

A vector may be expressed as Equation (8) by performing a conjugate on a signal which is received during a second time slot.

$$y = \begin{bmatrix} r_1 \\ r_2^* \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} n_1 \\ n_2^* \end{bmatrix} = H_{eff} x + n \quad \text{[Equation 8]}$$

Here, an effective channel matrix $H_{eff}$ satisfies a condition of $H_{eff}^H H_{eff} = (|h_1|^2 + |h_2|^2) I_2$. Equation (9) may express a multiplying a received signal y by a Hermitian of an effective channel matrix.

$$z = H_{eff}^H y = (|h_1|^2 + |h_2|^2) x + \tilde{n} \quad \text{[Equation 9]}$$

Here, ñ satisfies a condition of $\tilde{n} = H_{eff}^H n$. So, each symbol may be expressed as Equation (10). So, original signals x1, x2 may be detected from this.

$$z_1 = (|h_1|^2 + |h_2|^2) x_1 + \tilde{n}_1$$

$$z_2 = (|h_1|^2 + |h_2|^2) x_2 + \tilde{n}_2 \quad \text{[Equation 10]}$$

Upon operating a diversity mode as a transmit diversity method using two antennas, a reference communication node transmits an input signal x which is defined as Equation (11) in order to transmit the same signal $s_1$ via each antenna, so a transmit diversity transmission is possible.

$$x = \sqrt{\frac{E_S}{2}} \begin{bmatrix} s_1 \\ s_2 \end{bmatrix} \quad \text{[Equation 11]}$$

In this way, a reference communication node simultaneously transmits the same signal using a part or all of antennas included in an antenna set which consists of at least two antennas, so various transmit diversity transmissions are possible.

Upon performing diversity transmission using an STBC method through an antenna set which consists of at least two antennas, a reference communication node transmits an input signal using a space time coding method through at least two antennas and times, so an STBC transmission is possible. In one embodiment, Equation (12) defines an input signal x for an STBC transmission using a Quasi-orthogonal STBC method using four antennas and time.

$$X = \sqrt{\frac{E_S}{2}} \begin{bmatrix} S_1 & S_2 & S_3 & S_4 \\ -S_2^* & S_1^* & -S_4^* & S_3^* \\ -S_3^* & -S_4^* & S_1^* & S_2^* \\ S_4 & -S_3 & -S_2 & S_1 \end{bmatrix} \quad \text{[Equation 12]}$$

In this way, various combined diversity modes are possible by selecting antennas necessary for an STBC method using a part or all of antennas included in an antenna set which consists of at least two antennas, and transmitting an input signal using a desired STBC method through the selected antennas.

In a combined multiplexing mode as a fourth embodiment of a combined operation mode of a communicating antenna set, a reference communication node performs directional multiplexing transmission/reception for a signal using a space multiplexing method through a plurality of communicating antennas.

A reference communication node may transmit a signal using a space multiplexing method by simultaneously transmitting different signals through each communicating antenna. A connection-target communication node which receives a directional multiplexing may receive a signal using a space multiplexing method by decoding a signal which is received through each antenna using various reception methods such as a Zero-Forcing (ZF), a Minimum Mean Square Error (MMSE), Vertical-Bell Laboratories Layered Space-Time (V-BLAST).

Figure 13:
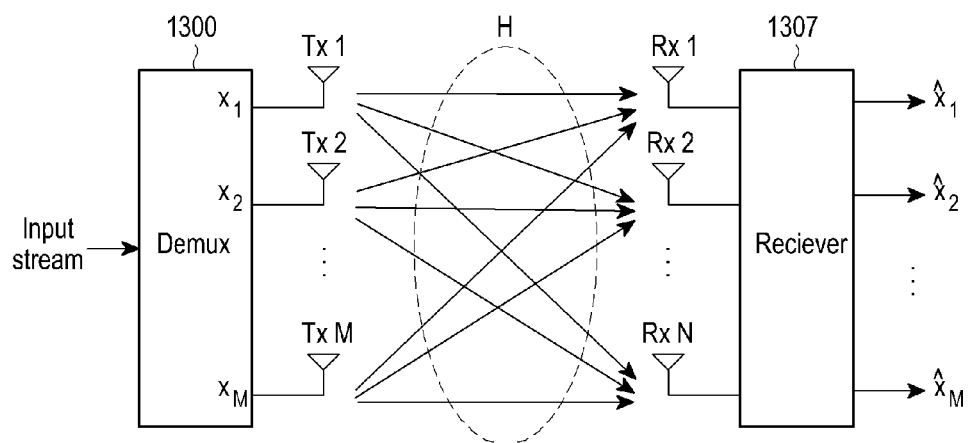
FIG. 13 illustrates a combined multiplexing mode as an embodiment of a combined operation mode of a communicating antenna set.

FIG. 13 schematically illustrates a combined multiplexing mode as a fourth embodiment of a combined operation mode of a communicating antenna set. A reference communication node 1300 and a connection-target communication node 1307 in FIG. 13 may operate a space multiplexing method that a plurality of signals are simultaneously transmitted/received through a Multiple Input Multiple Output (MIMO) channel as a combined multiplexing mode.

A reference communication node 1300 in FIG. 13 may output a plurality of signals, e.g., M signals by de-multiplexing an input stream. For example, if M is 3, a reference communication node may generate a combination matrix for each stream in Equation (13) in order to transmit each of three data streams via one antenna by performing a multiplexing transmission for three communicating antennas, and allocate the combination matrix for each stream to each data stream.

$$w = \begin{bmatrix} 1 & 0 & 0 \\ 0 & 1 & 0 \\ 0 & 0 & 1 \end{bmatrix} \text{ or } w = \begin{bmatrix} 0 & 0 & 1 \\ 1 & 0 & 0 \\ 0 & 1 & 0 \end{bmatrix} \quad \text{[Equation 13]}$$

In this way, a reference communication node may transmit three independent data streams in a combined multiplexing mode.

A combination factor for each stream is allocated in order that a connection-target communication node which equips with an antenna set performs a space multiplexing reception through a multiplexing transmission. In this case, it should be set that a multiplexing reception method of overcoming an interference which occurs among signals due to a MIMO channel is performed. Well-known multiplexing reception method includes a Zero-Forcing (ZF) method, a Minimum Mean Square Error (MMSE) method, a Vertical-Bell Laboratories Layered Space-Time (V-BLAST) method, and the like. If a ZF method as a typical linear multiplexing reception method is uses, an intermediate signal vector in Equation (15) may be acquired by multiplying signals which are received through an antenna set using a combination matrix for each stream by a pseudo-inverse matrix of a MIMO channel H in Equation (14).

$$V^H = (H^H H)^{-1} H^H = \begin{bmatrix} V_{11} & V_{12} & V_{13} \\ V_{21} & V_{22} & V_{23} \\ V_{31} & V_{32} & V_{33} \end{bmatrix}^H = \begin{bmatrix} V_1^H \\ V_2^H \\ V_3^H \end{bmatrix} \quad \text{[Equation 14]}$$

$$d = V^H x = (H^H H)^{-1} H^H x \quad \text{[Equation 15]}$$

A connection-target communication node detects three data streams which a reference communication node transmits by independently determining each element of an intermediate signal vector.

In this way, upon a multiplexing transmission using a part or all of antennas included in an antenna set which consists of at least two antennas, a reference communication node simultaneously transmits different signals via an antenna set, and a connection-target communication node may perform various space multiplexing transmissions and/or receptions by decoding a received signal using a multiplexing reception method such as a ZF, an MMSE, and a V-BLAST.

In a combined diversity-multiplexing hybrid mode as a fifth embodiment of a combined operation mode of a communicating antenna set, upon transmitting a signal using a plurality of communicating antennas, a combined diversity-multiplexing hybrid mode is a combined operation mode which a reference communication node simultaneously performs space diversity transmission and space multiplexing transmission.

A reference communication node may combine a space diversity transmission and a space multiplexing transmission by transmitting a signal using a space diversity transmission method or a space multiplexing transmission method through a part of at least two antennas, and transmitting a signal using another space diversity transmission method or another space multiplexing transmission method through the rest of the at least two antennas at the same time.

In one embodiment, if a reference communication node equips with four antennas, the reference communication node transmits a signal using an Alamouti scheme through two antennas, and transmits a signal using another Alamouti scheme through other two antennas.

$$D = \begin{bmatrix} s_1 & -s_2^* \\ s_2 & s_1^* \\ s_3 & -s_4^* \\ s_4 & s_3^* \end{bmatrix}$$ [Equation 16]

Further, a reference communication node may combine a space diversity transmission and a space multiplexing transmission by transmitting a signal in which at least two signals are combined using at least two antennas. In one embodiment, if a reference communication node equips with four antennas, the reference communication node transmits in order to simultaneously perform a space diversity transmission and a space multiplexing transmission by transmitting a signal in which a $s_1$ and a $s_4$ are combined and a signal in which a $s_2$ and a $s_3$ are combined via two antennas expressed as Equation (17).

$$E = \frac{1}{\sqrt{1+r^2}} \begin{bmatrix} s_1 + jrs_4 & rs_2 + s_3 \\ s_2 - rs_3 & jrs_1 + s_4 \end{bmatrix}, r = \frac{-1+\sqrt{5}}{2}$$ [Equation 17]

A diversity-multiplexing hybrid combining method includes a Double Alamouti, a Stacked Alamouti, a Double ABBA, a Diagonal ABBA, a Quasi-Orthogonal STBC (QOSTBC), a Threaded Algebraic Space-Time (TAST) code, a Golden code, a Heath code, a Generalized optimal diversity (GOD) code, and the like. A detailed concept of the diversity-multiplexing hybrid combining method refers to following studies. Double Alamouti: [S. M. Alamouti, "A simple transmit diversity technique for wireless communications", IEEE Journal on Selected Areas in Communications, 16(8):1451-1458, October 1998.] Stacked Alamouti: [A. Sezgin and E. A. Jorswieck, "Capacity Achieving High Rate Space-Time Block Codes", IEEE Communications Letters, vol. 9, no. 5, pp. 435-437, May 2005.] Double ABBA, Diagonal ABBA: [Hottinen A., Tirkkonen O., Wichman R., "Multi-antenna Transceiver Techniques for 3G and Beyond", John Wiley & Sons Ltd, 2003] QOSTBC: [A. Sezgin, E. A. Jorswieck and E. Costa, "Optimal transmit strategies for QSTBC in MIMO Ricean Channels with Linear Detection", PIMRC 2005, Sep. 11-14, 2005] TAST code: [H. El. Gamal, M. O. Damen, "Universal space-time coding", IEEE Trans. Inform. Theory, vol. 49, no. 5, May 2003.] Golden code: [M. O. Damen, H. E. Gamal and N. C. Beaulieu., "Linear threaded algebraic space-time constellations," IEEE Trans. Inform. Theory, vol. 49, pp. 2372-2388, October 2003.] Heath code: [R. Heath. Jr. and A. Paulraj, "Capacity maximizing linear space-time codes," IEICE Trans. Electron., vol. E85-C, no. 3, pp. 428-435, March 2002.] GOD code: [M. I. Lee, S. K. Oh and D. S. Kwon, "Design of space-time codes achieving generalized optimal diversity," GLOBECOM'05, November 2005.]

In a Cyclic Delay Diversity (CDD) mode as a sixth embodiment of a combined operation mode of a communicating antenna set, upon transmitting a signal through at least two antennas, the CDD mode is a combined operation mode for an antenna set, which a reference communication node transmits cyclic delayed signals in order to acquire diversity gain by increasing the frequency selectivity through the introduction of cyclic delays.

Figure 14A:
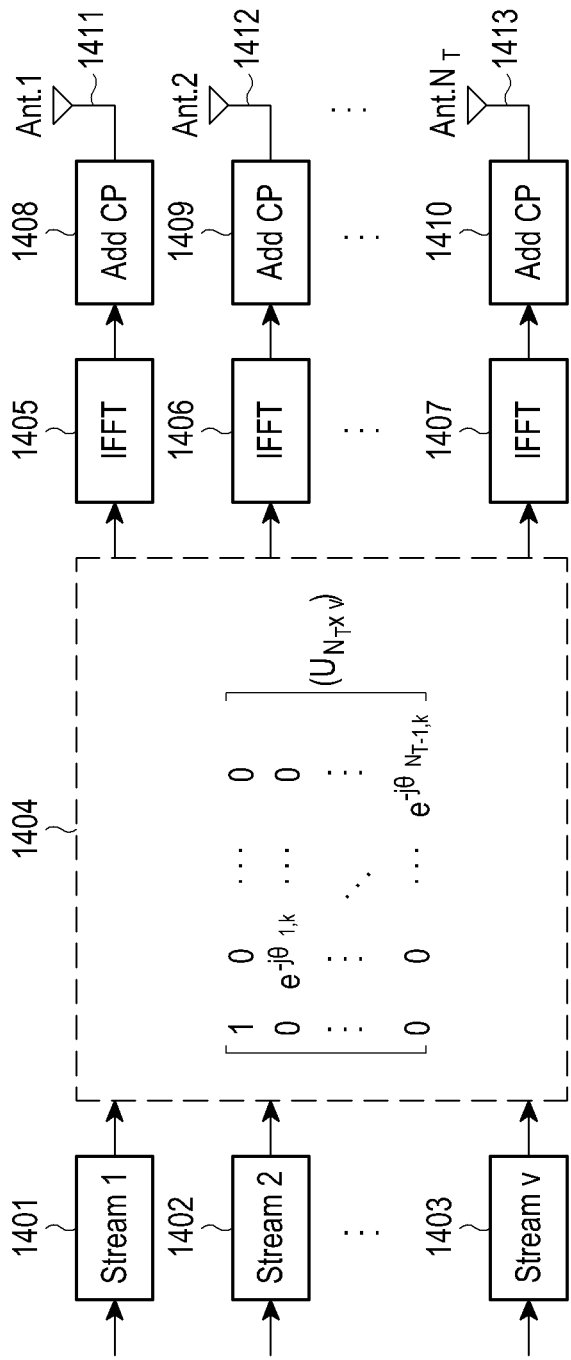
FIG. 14a illustrates a combined Cyclic Delay Diversity (CDD) mode as an embodiment of a combined operation mode of a communicating antenna set.

FIG. 14a schematically illustrates a combined Cyclic Delay Diversity (CDD) mode as a sixth embodiment of a combined operation mode of a communicating antenna set. A reference communication node in FIG. 14a transmits a signal in a combined CDD mode in an Orthogonal Frequency Division Multiplexing (OFDM) system.

As illustrated in FIG. 14a, a reference communication node 1404 includes a first antenna 1411, a second antenna 1412, . . . , an $N_T$ antenna 1423. The reference communication node 1404 receives inputs of a first stream 1401, a second stream 1402, . . . , and a v-th stream 1403, processes the first stream 1401, the second stream 1402, . . . , and the v-th stream 1403 through a unitary matrix, and outputs each stream to a first IFFT unit 1405, a second IFFT unit 1406, . . . , and an $N_T$ IFFT unit 1407. The first IFFT unit 1405, the second IFFT unit 1406, . . . , and the $N_T$ IFFT unit 1407 transforms the input, the unitary matrix processed stream, and outputs the transformed stream to a first Add CP unit 1408, a second Add CP unit 1409, and an $N_T$ Add CP unit 1410. The first Add CP unit 1408, the second Add CP unit 1409, and the $N_T$ Add CP unit 1410 may transmit a stream by outputting the input value to an antenna.

Upon transmitting simultaneously v signals, the reference communication node 1404 allocates a cyclic delay value $\theta_{i,k}(i-1, \ldots, N_{r1}, k=0, 1, \ldots, M-1)$ which is different for each antenna to each of the v signals, and transmits v signals to which the different cyclic delay values $\theta_{i,k}(i-1, \ldots, N_{r1}, k=0, 1, \ldots, M-1)$ are allocated. Here, $U_{N_T \times v}$ denotes $N_T \times v$ unitary matrix, $\theta_{i,k}(i-1, \ldots, N_{r1}, k=0, 1, \ldots, M-1)$ denotes a cyclic delay value for each antenna, and M denotes the number of modulation symbols composing one codeword. If the reference communication node 1404 transmits v same signals, a CDD mode is a combined CDD mode which is combined with space diversity transmission. If the reference communication node 1404 transmits v different signals, a CDD mode is a combined CDD mode which is combined with a space multiplexing transmission.

Figure 14B:
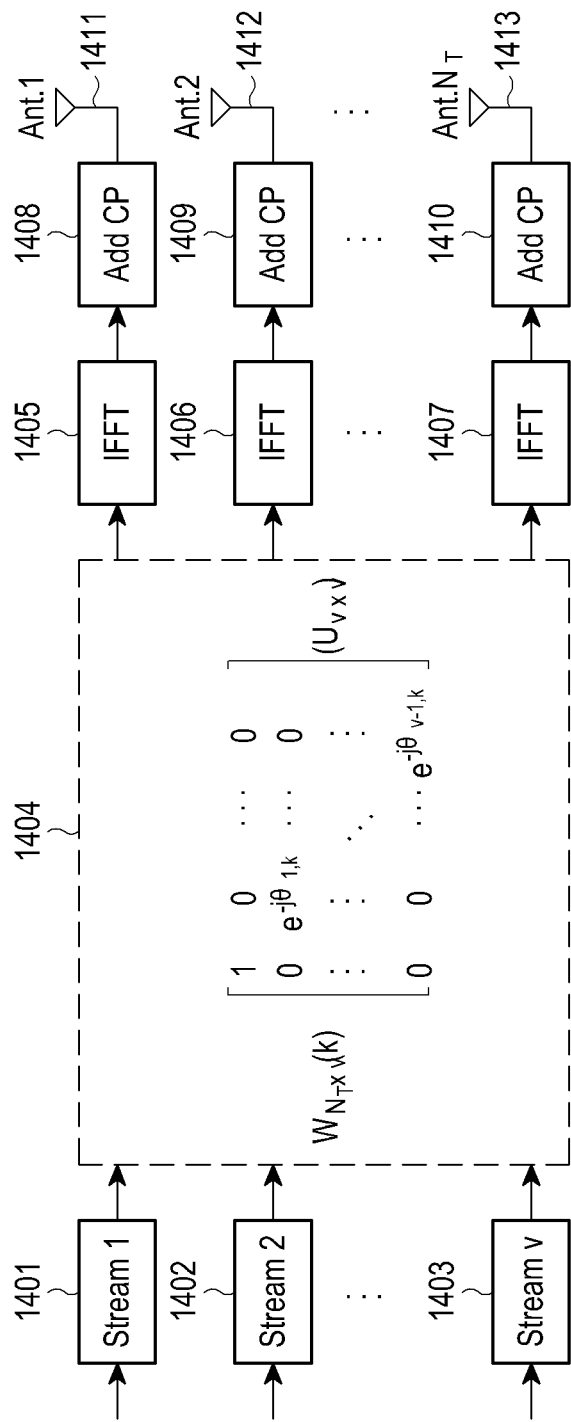
FIG. 14b illustrates a transmission block diagram of a reference communication node for transmitting a signal in a combined CDD mode using a pre-coding in an Orthogonal Frequency Division Multiplexing (OFDM) system.

FIG. 14b is a block diagram of a reference communication node for transmitting a signal in a combined CDD mode using a pre-coding in an Orthogonal Frequency Division Multiplexing (OFDM) system.

Upon transmitting at least two signals through at least two antennas, a reference communication node 1404 in FIG. 14b uses a pre-coding vector which forms a directional beam by allocating a weight value for each antenna to each signal, so the reference communication node 1404 may implement a combined CDD mode that the reference communication node 1404 transmits a signal by allocating a different cyclic delay value to each of different directional beams which are formed by independent pre-coding vectors.

The reference communication node 1404 in FIG. 14*b* includes a first antenna 1411, a second antenna 1412, ..., an $N_T$ antenna 1423. The reference communication node 1404 receives inputs of a first stream 1401, a second stream 1402, ..., a v-th stream 1403, processes the first stream 1401, the second stream 1402, ..., the v-th stream 1403 through a unitary matrix, and outputs each stream to a first IFFT unit 1405, a second IFFT unit 1406, and an $N_T$ IFFT unit 1507. The first IFFT unit 1405, the second IFFT unit 1406, and the $N_T$ IFFT unit 1507 transforms the input, the unitary matrix processed stream, and outputs the transformed stream to a first Add CP unit 1408, a second Add CP unit 1409, and an $N_T$ Add CP unit 1410. The first Add CP unit 1408, the second Add CP unit 1409, and the $N_T$ Add CP unit 1410 may transmit a stream by outputting the input value to an antenna.

Unlike FIG. 14*a*, upon transmitting at least two signals using at least two antennas, the reference communication node 1404 in FIG. 14*b* uses a pre-coding vector which forms a directional beam by allocating a weight value for each antenna to each signal, so the reference communication node 1404 may adapt a combined CDD mode that the reference communication node 1404 allocates a different cyclic delay value to each of different directional beams which are formed by independent pre-coding vectors.

As illustrated in FIG. 14*b*, upon simultaneously transmitting v signals, a reference communication node which equips with $N_T$ antennas allocates a different cyclic delay value $\theta_{i,k}$ for each directional beam to the v signals, and transmits the v signals to which the different cyclic delay values are allocated. Here, $W_{N_T \times v}(k)$ denotes a $N_T \times v$ pre-coding matrix of a k-th modulation symbol.

In one embodiment, upon transmitting two signals by equipping with two antennas, a reference communication node allocates a cyclic delay value $2\pi k/2$ to a second directional beam which is formed through a pre-coding vector $[1\ 1]^T$ and then transmits the two signals without allocating a cyclic delay value to a first directional beam which is formed through a pre-coding vector $[1\ 1]^T$ in Equation (18). Here, k denotes an index of a modulation symbol, W(k) denotes a pre-coding matrix of the k-th modulation symbol, D(k) denotes a CDD matrix of the k-th modulation symbol, and U denotes a unitary matrix.

$$\frac{1}{2\sqrt{2}}$$

is a constant for a transmit power normalization. Referring to 3GPP TS 36.211: "Evolved Universal Terrestrial Radio Access (E-UTRA); Physical channels and modulation", a combined CDD mode according to the number of signals which will be transmitted is explained.

$$W(k)D(k)U\begin{bmatrix}s_1\\s_2\end{bmatrix} = \quad \text{[Equation (18)]}$$

-continued
$$\frac{1}{2\sqrt{2}}\begin{bmatrix}1 & 1\\1 & -1\end{bmatrix}\begin{bmatrix}1 & 0\\0 & e^{-j2\pi k/2}\end{bmatrix}\begin{bmatrix}1 & 1\\1 & e^{-j2\pi/2}\end{bmatrix}\begin{bmatrix}s_1\\s_2\end{bmatrix}$$

If there are a plurality of communicating antennas, transmitting/receiving a signal through various combined operation mode of an antenna set is possible by the described six embodiments of the combined operation mode of the communicating antenna set.

Hereinafter, an example of a connection configuration method according to various embodiments of the present invention will be described with reference to the appended drawings. In an embodiment which will be described below, a reference communication node may be a wireless terminal, a connection-target communication node may be a base station, and a resource for a connection among communication nodes may be a frequency.

A terminal equips with two or three antennas, however, the terminal may one of all communication nodes which equip with at least one antenna. In the next embodiment, for a detailed description, a system is a system where a terminal which equips with two antennas communicates with two base stations by considering a cellular system, however, this may be applied to establishing connection with base stations which consist of different RATs in a various wireless communication environments such as a WMAN, a WLAN, an ad-hoc, and the like, and an environment where there are various RATs as well as the cellular system.

FIGS. 15*a* to 15*h* schematically illustrate a method that a terminal establishes connection with at least one base station using at least one communicating antenna.

Figure 15A:
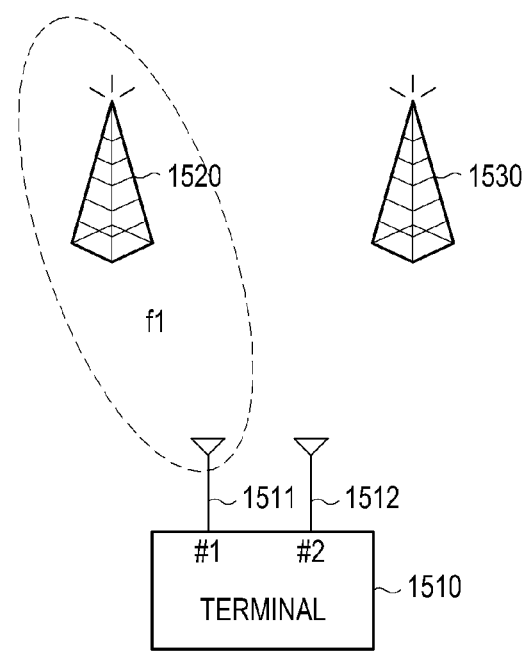
FIGS. 15a to 15h illustrate a scheme that a terminal establishes connection with at least one base station using at least one antenna.

FIG. 15*a* illustrates a method that a terminal establishes connection with at least one connection-target communication node using at least one communicating antenna.

As described in FIG. 15*a*, a terminal 1510 may include a first antenna 1511, and a second antenna 1512. The terminal 1510 may determine a first base station 1520 as a connection-target communication node, and a first antenna 1511 as a communicating antenna. The terminal 1510 may determine an antenna element operation mode of the first antenna 1511, and establish connection with a first base station through a first frequency (f1) based on the antenna element operation mode.

In this way, a reference communication node establishes connection with at least one connection-target communication node by determining a connection-target communication node set, an antenna set for each connection-target communication node, and an antenna element operation mode. The described process may be equally applied to establishing connection with base stations of which RATs are different.

Figure 15B:
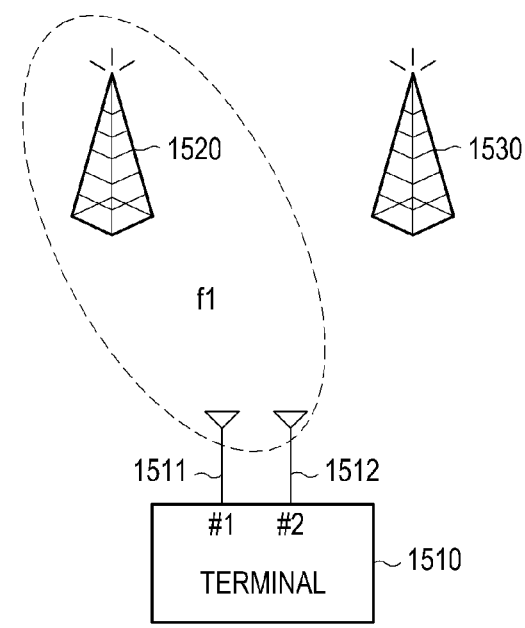

FIG. 15*b* illustrates a method that a terminal establishes connection with at least one connection-target communication node using two communicating antennas.

As described in FIG. 15*b*, a terminal 1510 may include a first antenna 1511 and a second antenna 1512. The terminal 1510 may determine a first base station 1520 as a connection-target communication node, and determine the first antenna 1511 and the second antenna 1512 as a communicating antenna. The terminal 1510 may determine an antenna element operation mode of the first antenna 1511 and the second antenna 1512.

The terminal 1510 establishes connection with a first base station through a first frequency (f1) using an antenna element operation mode and a combined operation mode of an antenna set which are determined through an antenna set which consists of the first antenna 1511 and the second antenna 1512 by determining a combined operation mode of an antenna set which consists of the first antenna 1511 and the second antenna 1512.

Each of the antennas 1511, 1512 may be operated in one of an element antenna omni directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, a signal transmission/reception scheme for element antenna. The element on-off state is defined as an on state where a related antenna is operated and an off state where the related antenna is not operated.

An antenna set which consists of at least two antennas, i.e., the first antenna 1511 and the second antenna 1512 may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

In this way, a reference communication node establishes connection with at least one connection-target communication node by determining a connection-target communication node set, an antenna set for each connection-target communication node, an antenna element operation mode, and a combined operation mode of an antenna set. The described process may be equally applied to establishing connection with base stations of which RATs are different.

Figure 15C:
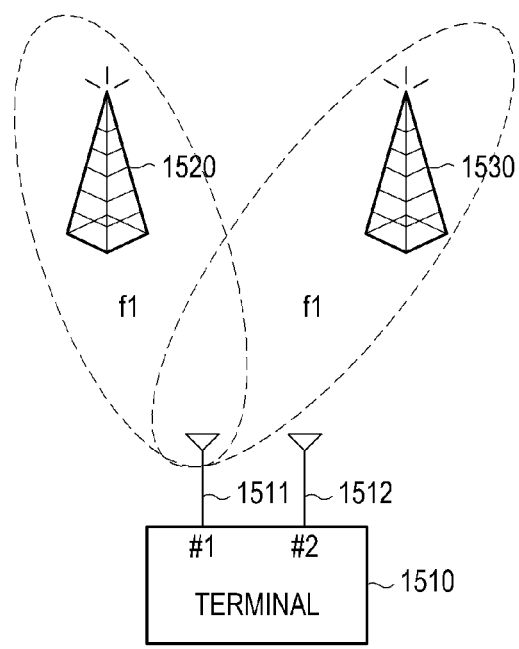

FIG. 15*c* illustrates a method that a terminal establishes connection with two connection-target communication nodes in order to use commonly one communicating antenna.

As described in FIG. 15*c*, a terminal 1510 may include a first antenna 1511 and a second antenna 1512. The terminal 1510 may determine a first base station 1520 and a second base station 1530 as a connection-target communication node, and determine the first antenna 1511 as a communicating antenna. The terminal 1510 may determine an antenna element operation mode of the first antenna 1511, and may establish connection with the first base station 1520 and the second base station 1530 through a first frequency (f1) based on the determined antenna element operation mode.

Each antenna 1511 may be operated in one of an element antenna omni directional mode, an element antenna directional mode, an element antenna directional diversity mode, an element antenna directional multiplexing mode, and an element antenna off mode. Here, each antenna 1511 may be operated in various antenna element operation modes according to an element antenna on-off state, an element antenna beam pattern, an element antenna signal transmission/reception scheme for each antenna.

The terminal 1510 may cooperatively transmit/receive to/from the first base station 1520 and the second base station 1530, or perform a multi-homing by independently transmitting/receiving a signal to/from each of base stations.

In this way, a reference communication node determines an antenna set for each connection-target communication node, and an antenna element operation mode, so the reference communication node establishes connection with at least two connection-target communication nodes in order that each of connection-target communication nodes uses commonly at least one antenna and shares resource for each of at least one connection-target communication node. The described process may be equally applied to establishing connection with base stations of which RATs are different.

Figure 15D:
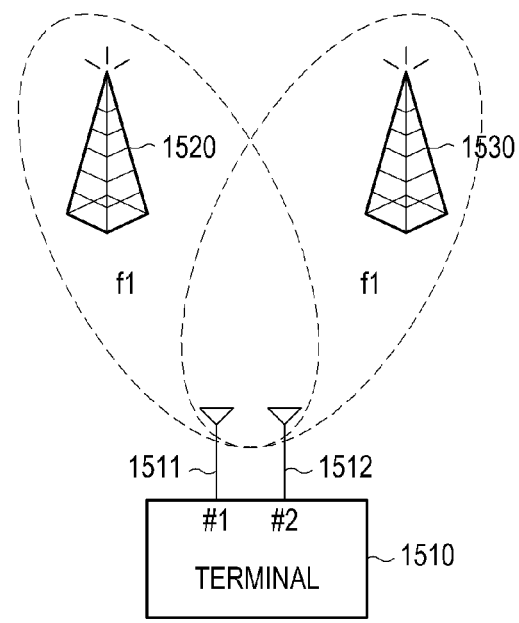

FIG. 15*d* illustrates a method that a terminal establishes connection with two connection-target communication nodes in order to use commonly two communicating antennas and share resource.

As described in FIG. 15*d*, a terminal 1510 may include a first antenna 1511 and a second antenna 1512. The terminal 1510 may determine a first base station 1520 and a second base station 1530 as a connection-target communication node, and determine the first antenna 1511 and the second antenna 1512 as a communicating antenna. The terminal 1510 may determine an antenna element operation mode of the first antenna 1511 and the second antenna 1512.

The terminal 1510 may determine a combined operation mode of an antenna set which consists of the first antenna 1511 and the second antenna 1512, so the terminal 1510 establishes connection with a first base station through a first frequency (f1) using the antenna element operation mode and the combined operation mode of the antenna set which are determined using the antenna set which consists of the first antenna 1511 and the second antenna 1512.

Each of the antennas 1511, 1512 may be operated in one of an element antenna omni-directional mode, an element antenna directional mode, an element antenna directional diversity mode, an element antenna directional multiplexing mode, and an element antenna off mode. Here, each of the antennas 1511,1512 may be operated in various antenna element operation modes according to an element antenna on-off state, an element antenna beam pattern, an element antenna signal transmission/reception scheme for each antenna.

An antenna set which consists of at least two antennas, i.e., the first antenna 1511 and the second antenna 1512 may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

The terminal 1510 may cooperatively transmit/receive to/from the first base station 1520 and the second base station 1530, or perform a multi-homing by independently transmitting/receiving a signal to/from each of base stations.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses commonly at least one antenna included in each of antenna sets for each connection-target communication node and shares resource for each of at least one connection-target communication node. The described process may be equally applied to establishing connection with base stations of which RATs are different.

Figure 15E:
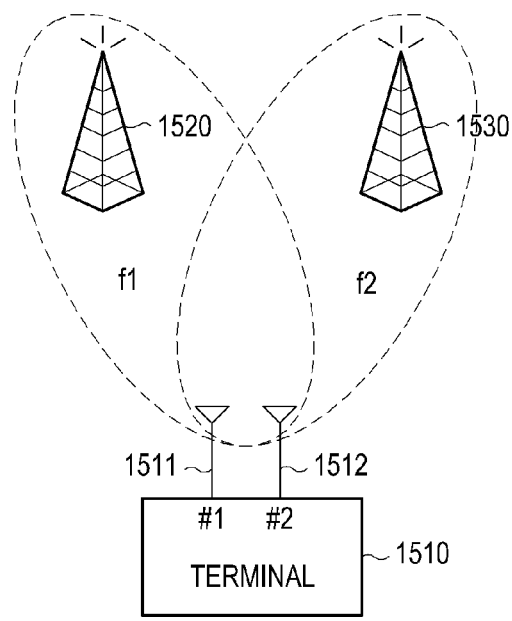

FIG. 15*e* illustrates a method that a terminal establishes connection with two connection-target communication nodes via different resources by using commonly two communicating antennas.

As described in FIG. 15*e*, a terminal 1510 may include a first antenna 1511 and a second antenna 1512. The terminal

1510 may determine a first base station 1520 and a second base station 1530 as a connection-target communication node, and determine the first antenna 1511 and the second antenna 1512 as a communicating antenna. The terminal 1510 may determine an antenna element operation mode of the first antenna 1511 and the second antenna 1512.

The terminal 1510 determines a combined operation mode of an antenna set which consists of the first antenna 1511 and the second antenna 1512, so a terminal configures connection with a first base station through a first frequency (f1) using an antenna element operation mode and a combined operation mode of an antenna set which are determined using an antenna set which consists of the first antenna 1511 and the second antenna 1512.

The terminal 1510 establishes connection with a second base station through a second frequency (f2) using the antenna element operation mode and the combined operation mode of the antenna set which are determined using the antenna set which consists of the first antenna 1511 and the second antenna 1512.

Each of the antennas 1511, 1512 may be operated in one of an element antenna omni-directional mode, an element antenna directional mode, an element antenna directional diversity mode, an element antenna directional multiplexing mode, and an element antenna off mode. Here, each of the antennas 1511,1512 may be operated in various antenna element operation modes according to an element antenna on-off state, an element antenna beam pattern, an element antenna signal transmission/reception scheme for each antenna.

An antenna set which consists of at least two antennas, i.e., the first antenna 1511 and the second antenna 1512 may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

The terminal 1510 may cooperatively transmit/receive to/from the first base station 1520 and the second base station 1530, or perform a multi-homing by independently transmitting/receiving a signal to/from each of base stations.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses commonly at least one antenna included in each of antenna sets for each connection-target communication node and uses resource for each different connection-target communication nodes. The described process may be equally applied to establishing connection with base stations of which RATs are different.

Figure 15F:
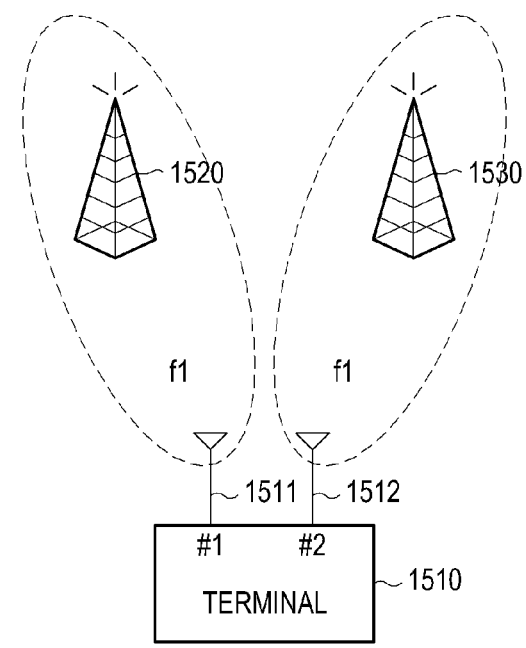

FIG. 15*f* schematically illustrates a method that a terminal establishes connection with two connection-target communication nodes via the same resource using two communicating antennas.

As described in FIG. 15*f*, a terminal 1510 may include a first antenna 1511 and a second antenna 1512. The terminal 1510 may determine a first base station 1520 and a second base station 1530 as a connection-target communication node, and determine the first antenna 1511 and the second antenna 1512 as a communicating antenna. The terminal 1510 may determine an antenna element operation mode of the first antenna 1511 and the second antenna 1512.

The terminal 1510 determines a combined operation mode of an antenna set which consists of the first antenna 1511 and the second antenna 1512, so a terminal establishes connection with a first base station through a first frequency (f1) using an antenna element operation mode and a combined operation mode of an antenna set which are determined using the first antenna 1511.

The terminal 1510 establishes connection with a second base station through the first frequency (f1) using an antenna element operation mode and a combined operation mode of an antenna set which are determined using the second antenna 1512.

Each of the antennas 1511, 1512 may be operated in one of an element antenna omni directional mode, an element antenna directional mode, an element antenna directional diversity mode, an element antenna directional multiplexing mode, and an element antenna off mode. Here, each of the antennas 1511, 1512 may be operated in various antenna element operation modes according to an element antenna on-off state, an element antenna beam pattern, an element antenna signal transmission/reception scheme for each antenna.

The terminal 1510 may cooperatively transmit/receive to/from the first base station 1520 and the second base station 1530, or perform a multi-homing by independently transmitting/receiving a signal to/from each of base stations.

In this way, a reference communication node determines a connection-target communication node set, an antenna set for each connection-target communication node, and an antenna element operation mode, so the reference communication node establishes connection with at least two connection-target communication nodes in order that each of connection-target communication nodes uses antenna sets for each connection-target communication node which consists of at least one different antenna and shares resource for each of at least one connection-target communication node. The described process may be equally applied to establishing connection with base stations of which RATs are different.

Figure 15G:
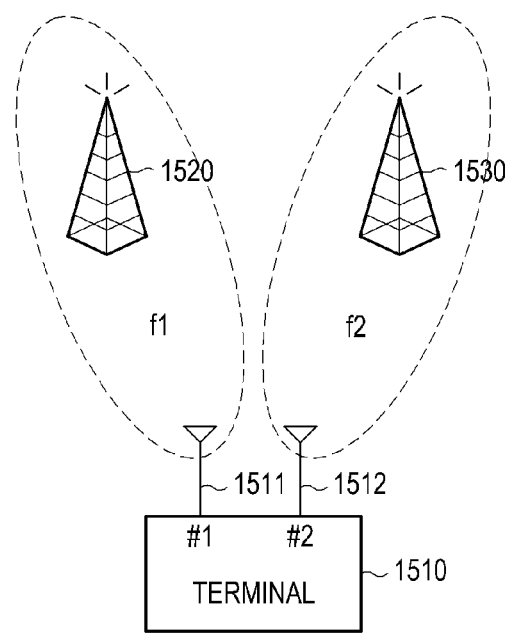

FIG. 15*g* schematically illustrates a method that a terminal establishes connection with two connection-target communication nodes via different resources using two communicating antennas.

As described in FIG. 15*g*, a terminal 1510 may include a first antenna 1511 and a second antenna 1512. The terminal 1510 may determine a first base station 1520 and a second base station 1530 as a connection-target communication node, and determine the first antenna 1511 and the second antenna 1512 as a communicating antenna. The terminal 1510 may determine an antenna element operation mode of the first antenna 1511 and the second antenna 1512.

The terminal 1510 determines a combined operation mode of an antenna set which consists of the first antenna 1511 and the second antenna 1512, so a terminal establishes connection with a first base station through a first frequency (f1) using an antenna element operation mode and a combined operation mode of an antenna set which are determined using the first antenna 1511.

A terminal establishes connection with a second base station through a second frequency (f2) using an antenna element operation mode and a combined operation mode of an antenna set which are determined using the second antenna 1512.

Each of the antennas 1511, 1512 may be operated in one of an element antenna omni-directional mode, an element antenna directional mode, an element antenna directional diversity mode, an element antenna directional multiplexing mode, and an element antenna off mode. Here, each of the antennas 1511,1512 may be operated in various antenna element operation modes according to an element antenna on-off state, an element antenna beam pattern, an element antenna signal transmission/reception scheme for each antenna.

The terminal 1510 may cooperatively transmit/receive to/from the first base station 1520 and the second base station 1530, or perform a multi-homing by independently transmitting/receiving a signal to/from each of base stations.

In this way, a reference communication node determines a connection-target communication node set, an antenna set for each connection-target communication node, and an antenna element operation mode, so the reference communication node establishes connection with at least two connection-target communication nodes in order that each of connection-target communication nodes uses antenna sets for each connection-target communication node which consists of at least one different antenna and uses resource for each of at least one different connection-target communication node. The described process may be equally applied to establishing connection with base stations of which RATs are different.

Figure 15H:
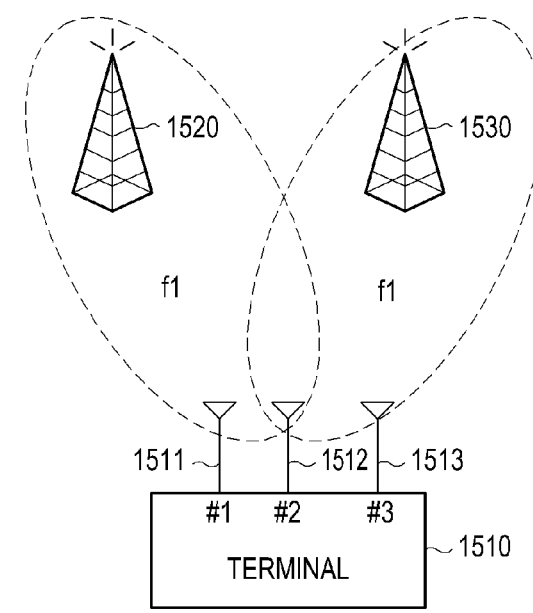

FIG. 15h schematically illustrates a method that a terminal establishes connection with two connection-target communication nodes in order to use commonly a part of antenna set and share resource using three communicating antennas.

As described in FIG. 15h, a terminal 1510 may include a first antenna 1511, a second antenna 1512, and a third antenna 1513. The terminal 1510 may determine a first base station 1520 and a second base station 1530 as a connection-target communication node, and determine the first antenna 1511, the second antenna 1512, and the third antenna 1513 as a communicating antenna. The terminal 1510 may determine an antenna element operation mode of the first antenna 1511, the second antenna 1512, and the third antenna 1513.

The terminal 1510 may determine a communicating antenna set corresponding to the first base station 1520 as the first antenna 1511 and the second antenna 1512, and determine a communicating antenna set corresponding to the second base station 1520 as the second antenna 1512 and the third antenna 1513.

A terminal establishes connection with a first base station through a first frequency (f1) using an antenna element operation mode and a combined operation mode of an antenna set which are determined using the first antenna 1511 and the second antenna 1512 by determining a combined operation mode of an antenna set which consists of the first antenna 1511 and the second antenna 1512.

The terminal 1510 establishes connection with the second base station 1520 through the first frequency (f1) using an antenna element operation mode and a combined operation mode of an antenna set which are determined using the second antenna 1512 and the third antenna 1513 by determining a combined operation mode of an antenna set which consists of the second antenna 1512 and the third antenna 1513.

Each antenna may be operated in one of an element antenna omni directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least three antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

The terminal 1510 may cooperatively transmit/receive to/from the first base station 1520 and the second base station 1530, or perform a multi-homing by independently transmitting/receiving a signal to/from each of base stations.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses commonly a part or all of antennas composing antenna sets for each connection-target communication node, and shares resource for each of at least one connection-target communication node. The described process may be equally applied to establishing connection with base stations of which RATs are different.

Hereinafter, a scheme in which a terminal establishes connection with two base stations of which RATs are different will be described.

Figure 16A:
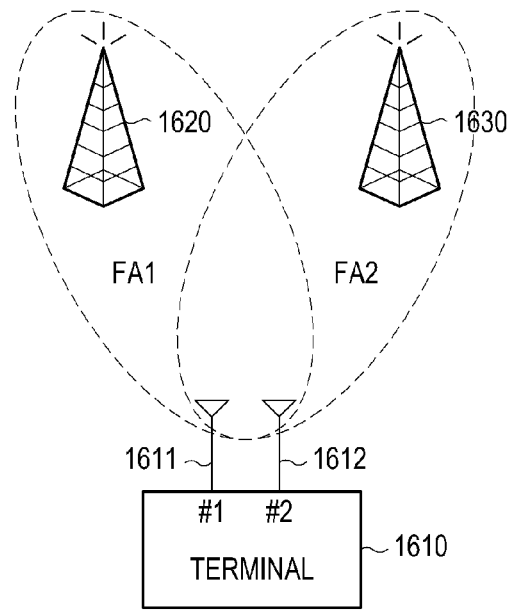
FIGS. 16a to 16c illustrate a scheme that a terminal establishes connection with at least two base stations of which frequency bands or RATs are different using at least two antennas.
Figure 16B:
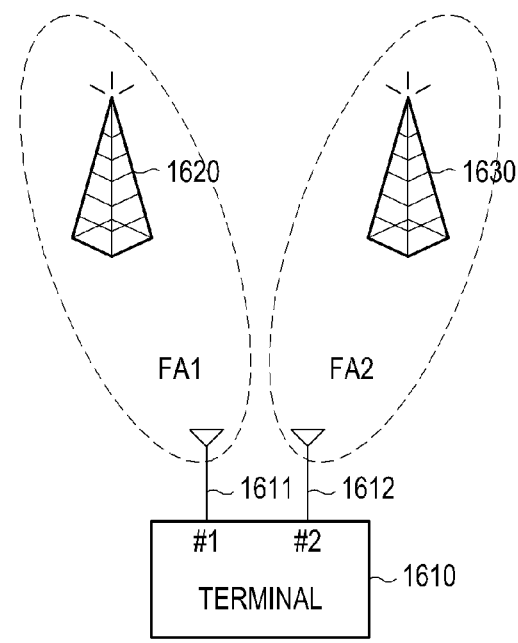
Figure 16C:
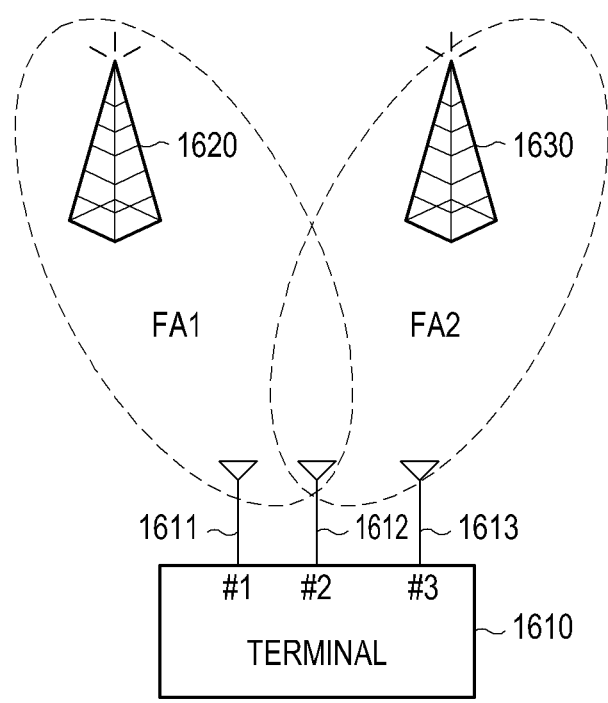

FIGS. 16a to 16c schematically illustrate a scheme that a terminal establishes connection with at least two base stations of which frequency bands or RATs are different using at least two antennas.

FIG. 16a schematically illustrates a scheme that a terminal establishes connection with two base stations of which RATs are different by using commonly at least two communicating antennas.

As described in FIG. 16a, a terminal 1610 may include a first antenna 1611, and a second antenna 1612. The terminal 1610 may determine a first base station 1620 which consists of a first RAT and a second base station 1630 which consists of a second RAT as a connection-target communication node, and the first antenna 1611, and the second antenna 1612 as a communicating antenna.

The terminal 1610 may determine a communicating antenna set corresponding to the first base station 1620 as the first antenna 1611 and the second antenna 1612, and a communicating antenna set corresponding to the second base station 1630 as the first antenna 1611 and the second antenna 1612.

The terminal 1610 may determine a combined operation mode of the communicating antenna set corresponding to the first base station 1620 and a combined operation mode of the communicating antenna set corresponding to the second base station 1630.

Each antenna may be operated in one of an element antenna omni directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

The terminal 1610 establishes connection with the first base station 1620 through a first frequency band (FA1), and connection with the second base station 1630 through a second frequency band (FA2) based on the determined antenna element operation mode and a combined operation mode of each antenna set.

The terminal 1610 may perform a multi-homing by independently transmitting/receiving a signal to/from each of the first base station 1620 and the second base station 1630.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses commonly at least one antenna composing each antenna set for each connection-target communication node, and RATs of a part or all of connection-target communication nodes composing a connection-target communication node set are different one another.

FIG. 16b schematically illustrates a scheme that a terminal establishes connection with two base stations of which RATs are different using two communicating antennas.

As described in FIG. 16b, a terminal 1610 may include a first antenna 1611, and a second antenna 1612. The terminal 1610 may determine a first base station 1620 which consists of a first RAT and a second base station 1630 which consists of a second RAT as a connection-target communication node, and the first antenna 1611, and the second antenna 1612 as a communicating antenna.

The terminal 1610 may determine a communicating antenna corresponding to the first base station 1620 as the first antenna 1611, and a communicating antenna corresponding to the second base station 1630 as the second antenna 1612.

Each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

The terminal 1610 establishes connection with the first base station 1620 through a first frequency band (FA1), and connection with the second base station 1630 through a second frequency band (FA2) based on the determined antenna element operation mode.

The terminal 1610 may perform a multi-homing by independently transmitting/receiving a signal to/from each of the first base station 1620 and the second base station 1630.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses antenna sets for each connection-target communication node which consists of at least one different antenna, and RATs of a part or all of connection-target communication nodes composing a connection-target communication node set are different one another.

FIG. 16c schematically illustrates a scheme that a terminal establishes connection with two base stations of which RATs are different in order to use commonly a part of an antenna set using three antennas.

As described in FIG. 16c, a terminal 1610 may include a first antenna 1611, a second antenna 1612, and a third antenna 1613. The terminal 1610 may determine a first base station 1620 which consists of a first RAT and a second base station 1630 which consists of a second RAT as a connection-target communication node, and the first antenna 1611, the second antenna 1612, and the third antenna 1613 as a communicating antenna.

The terminal 1610 may determine a communicating antenna set corresponding to the first base station 1620 as the first antenna 1611 and the second antenna 1612, and determine a communicating antenna set corresponding to the first second station 1630 as the second antenna 1612 and the third antenna 1613.

The terminal 1610 may determine a combined operation mode of a communicating antenna set corresponding to the first base station 1610, and determine a combined operation mode of a communicating antenna set corresponding to the second base station 1630.

Each antenna may be operated in an antenna element operation mode of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

The terminal 1610 establishes connection with the first base station 1620 through a first frequency band (FA1), and establishes connection with the second base station 1630 through a second frequency band (FA2) based on the determined antenna element operation mode and combined operation mode of each antenna set.

The terminal 1610 may perform a multi-homing by independently transmitting/receiving a signal to/from each of the first base station 1620 and the second base station 1630.

In this way, a reference communication node determines a connection-target communication node set, an antenna set for each connection-target communication node, an antenna element operation mode, and a combined operation mode of an antenna set, so the reference communication node establishes connection with at least two connection-target communication nodes in order that each of connection-target communication nodes uses commonly a part or all of antennas composing antenna sets for each connection-target communication node, and RATs of a part or all of connection-target communication nodes composing a connection-target communication node set are different one another.

Hereinafter, embodiments of changing a connection configuration between a terminal and a base station according to a lapse of time will be described with reference to appended drawings.

FIG. 17 to FIG. 37 schematically illustrate embodiments in which a terminal changes a whole connection configuration according to a lapse of time.

Figure 17:
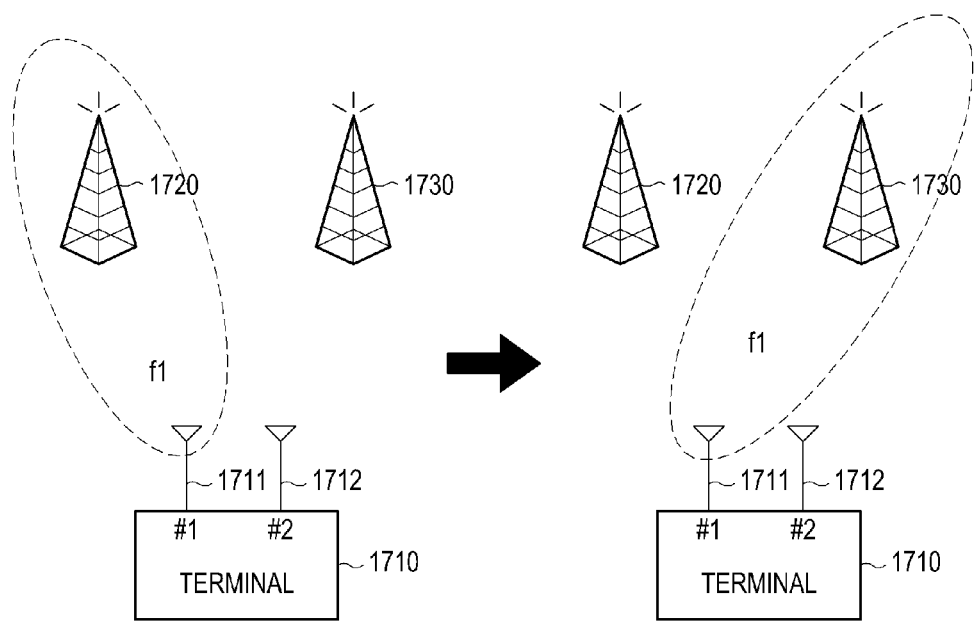
FIGS. 17 to 37 illustrate an embodiment of changing a total connection configuration according to a time lapse.

FIG. 17 schematically illustrates an embodiment in which a terminal changes a whole connection configuration by changing a base station with which the terminal establishes connection according to a lapse of time.

As described in FIG. 17, a terminal 1710 may include a first antenna 1711 and a second antenna 1712. The terminal 1710 may determine a first base station 1720 as a connection-target communication node and the first antenna 1711 as a communicating antenna. That is, the terminal 1710 may determine a communicating antenna set corresponding to the first base station 1720 as the first antenna 1711.

The terminal 1710 may determine an antenna element operation mode of the first antenna 1711, and establish connection with a first base station through a first frequency (f1) based on the determined antenna element operation mode.

For example, according to a lapse of time, in a case such as a case that the terminal 1710 hands over from the first base station 1720 to the second base station 1730, the terminal 1710 may determine the second base station 1730 as a connection-target communication node as described in a right of an arrow.

The terminal 1710 may maintain a communicating antenna as the first antenna 1711, and re-determine an antenna element operation mode of the first antenna 1711. The terminal 1710 may establish connection with the second base station 1730 through a first frequency (f1) based on the determined antenna element operation mode.

In the terminal 1710, each antenna may be operated in one of an element antenna omni directional mode, an element antenna directional mode, an element antenna directional diversity mode, an element antenna directional multiplexing mode, and an element antenna off mode. Here, each antenna may be operated in various antenna element operation modes according to an element on-off state, an element antenna beam pattern, an element antenna signal transmission/reception scheme for each antenna.

In this way, a reference communication node changes at least one connection-target communication node and a connection configuration by deleting at least one connection-target communication node included in a connection-target communication node set and adding at least one new connection-target communication node. This scheme may be equally applied to changing a connection configuration with base stations of which RATs are different.

Figure 18:
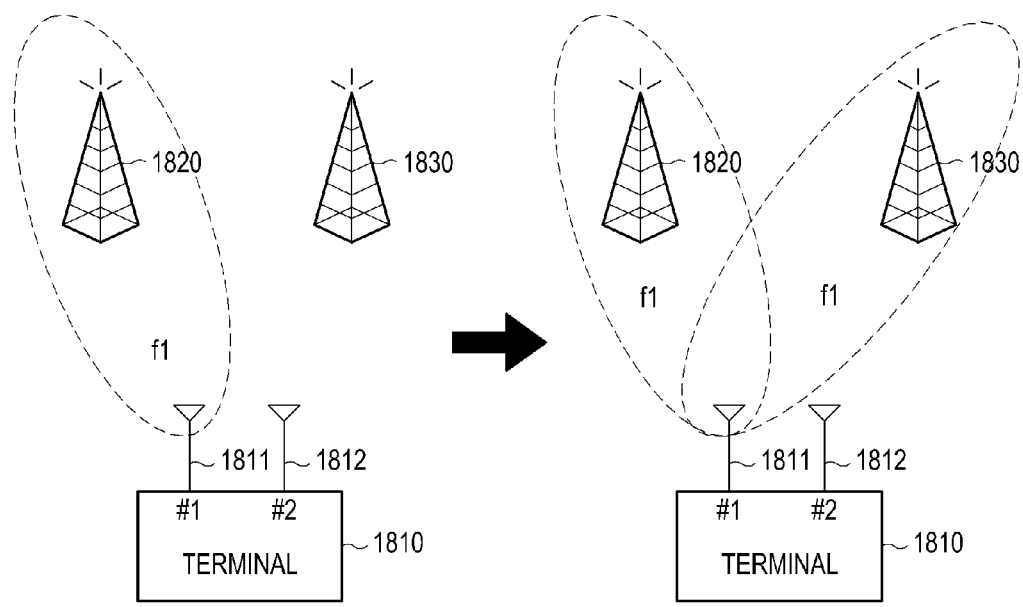

FIG. 18 schematically illustrates an embodiment in which a terminal changes a whole connection configuration by adding a base station with which the terminal establishes connection according to a lapse of time.

As described in FIG. 18, a terminal 1810 may include a first antenna 1811 and a second antenna 1812. The terminal 1810 may determine a first base station 1820 as a connection-target communication node and the first antenna 1811 as a communicating antenna. That is, the terminal 1810 may determine a communicating antenna set corresponding to the first base station 1820 as the first antenna 1811.

The terminal 1810 may determine an antenna element operation mode of the first antenna 1811, and establish connection with a first base station through a first frequency (f1) based on the determined antenna element operation mode.

For example, according to a lapse of time, in a case such as a case that the terminal 1810 hands over from the first base station 1820 to the second base station 1830, the terminal 1810 may determine the second base station 1830 as a connection-target communication node as described in a right of an arrow.

The terminal 1810 may determine a communicating antenna corresponding to the first base station 1820 as the first antenna 1811, and a communicating antenna corresponding to the second station 1830 as the first antenna 1811 even though the terminal 1810 maintains a communicating antenna as the first antenna 1811. The terminal 1810 may re-determine an antenna element operation mode. The terminal 1810 may establish connection with the first base station 1820 through the first frequency (f1) and connection with the second base station 1830 through the first frequency (f1) based on the determined antenna element operation mode.

In the terminal 1810, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by including at least one new connection-target communication node into a connection-target communication node set in order that each of connection-target communication nodes uses commonly at least one antenna and each of the connection-target communication nodes shares resource for each of at least one connection communication node. This scheme may be equally applied to changing a connection configuration with base stations of which RATs are different.

Figure 19:
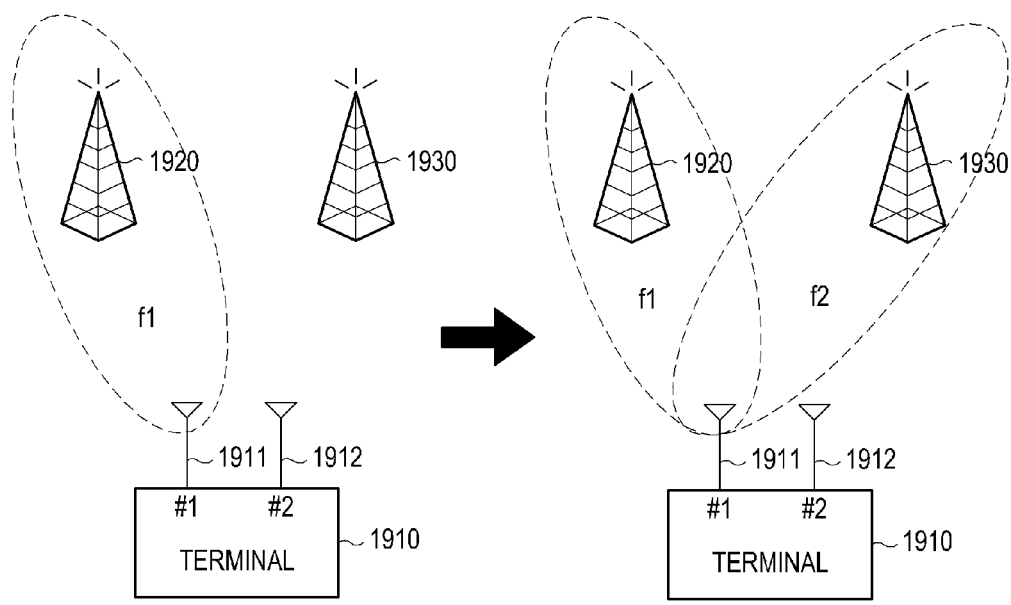

FIG. 19 schematically illustrates another embodiment in which a terminal changes a whole connection configuration by adding a base station with which the terminal establishes connection according to a lapse of time.

As described in FIG. 19, a terminal 1910 may include a first antenna 1911 and a second antenna 1912. The terminal 1910 may determine a first base station 1920 as a connection-target communication node and the first antenna 1911 as a communicating antenna. That is, the terminal 1910 may determine a communicating antenna set corresponding to the first base station 1920 as the first antenna 1911.

The terminal 1910 may determine an antenna element operation mode of the first antenna 1911, and establish connection with a first base station through a first frequency (f1) based on the determined antenna element operation mode.

For example, according to a lapse of time, in a case such as a case that the terminal 1910 hands over from the first base station 1920 to the second base station 1930, the terminal 1910 may determine the second base station 1930 as a connection-target communication node as described in a right of an arrow.

The terminal 1910 may determine a communicating antenna corresponding to the first base station 1920 as the first antenna 1911, and a communicating antenna corresponding to the second station 1930 as the first antenna 1911 even though the terminal 1910 maintains a communicating antenna as the first antenna 1911. The terminal 1910 may re-determine an antenna element operation mode. The terminal 1910 may establish connection with the first base station 1920 through the first frequency (f1) and connection with the second base station 1930 through the second frequency (f2) based on the determined antenna element operation mode.

In the terminal 1910, each antenna may be operated in one of an element antenna omni directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by including at least one new connection-target communication node into a connection-target communication node set in order that each of connection-target communication nodes uses commonly at least one antenna and each of the connection-target communication nodes uses resource for each of different connection communication nodes. This scheme may be equally applied to changing a connection configuration with base stations of which RATs are different.

Figure 20:
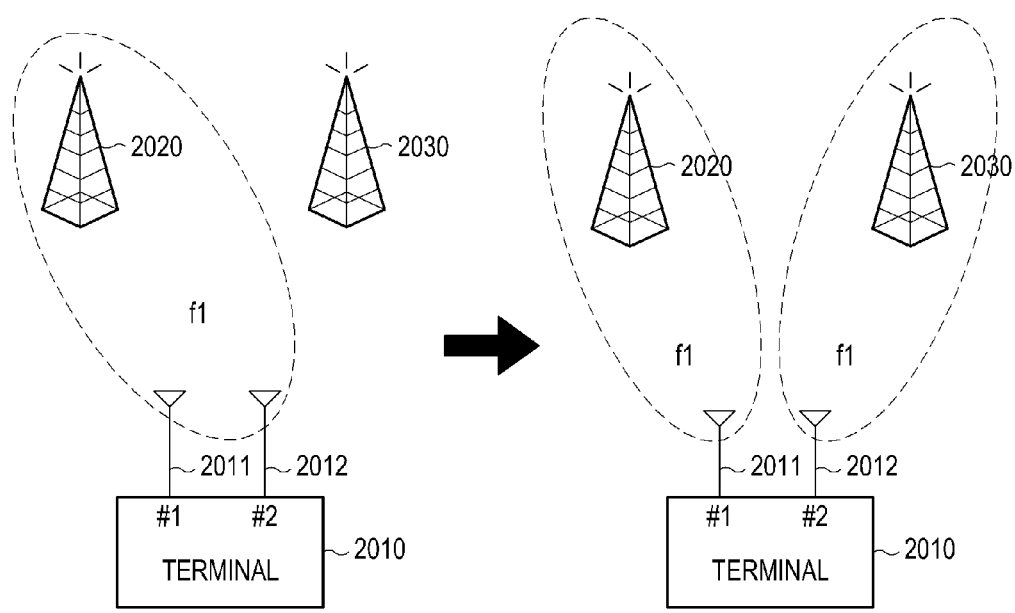

FIG. 20 schematically illustrates an embodiment in which a terminal changes a whole connection configuration by adding a base station with which the terminal establishes connection and changing a communicating antenna for each base station according to a lapse of time.

As described in FIG. 20, a terminal 2010 may include a first antenna 2011 and a second antenna 2012. The terminal 2010 may determine a first base station 2020 as a connection-target communication node and the first antenna 2011 and the second antenna 2012 as a communicating antenna. That is, the terminal 2010 may determine a communicating antenna set corresponding to the first base station 2020 as the first antenna 2011 and the second antenna 2012.

The terminal 2010 determines an antenna element operation mode of the first antenna 2011 and the second antenna 2012, and a terminal may determine a combined operation mode of a communicating antenna set which consists of the first antenna 2011 and the second antenna 2012. The terminal 2010 may establish connection with a first base station through a first frequency (f1) based on the determined antenna element operation mode and combined operation mode of the antenna set.

For example, according to a lapse of time, in a case such as a case that the terminal 2010 hands over from the first base station 2020 to the second base station 2030, the terminal 2010 may determine the second base station 2030 as a connection-target communication node as described in a right of an arrow.

The terminal 2010 may determine a communicating antenna corresponding to the first base station 2020 as the first antenna 2011, and a communicating antenna corresponding to the second base station 2030 as the second antenna 2012.

The terminal 2010 may determine a communicating antenna as the first antenna 2011 and the second antenna 2012, and may re-determine an antenna element operation mode of the first antenna 2011 and the second antenna 2012. The terminal 2010 may establish connection with the first base station 2020 through a first frequency (f1), and connection with the second base station 2030 through a second frequency (f2) based on the determined antenna element operation mode.

In the terminal 2010, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by including at least one new connection-target communication node into a connection-target communication node set in order that each of connection-target communication nodes uses antenna sets for each connection-target communication node which consists of at least one different antenna and shares resource for each of at least one connection-target communication node. This scheme may be equally applied to changing a connection configuration with base stations of which RATs are different.

Figure 21:
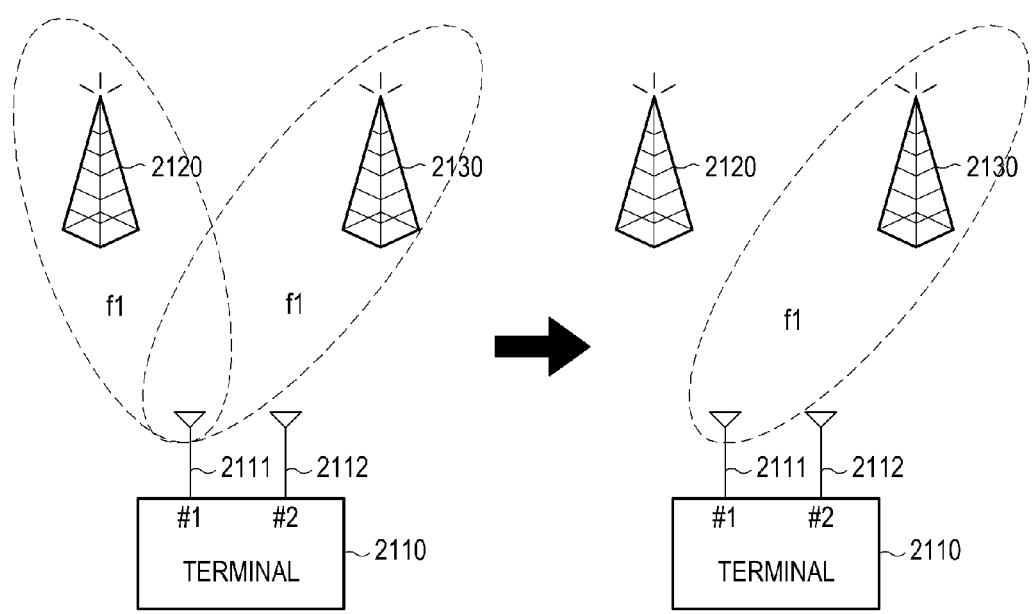

FIG. 21 schematically illustrates an embodiment in which a terminal changes a whole connection configuration by deleting a part of base stations with which the terminal establishes connection according to a lapse of time.

As described in FIG. 21, a terminal 2110 may include a first antenna 2111 and a second antenna 2112. The terminal 2110 may determine a first base station 2120 and a second base station 2130 as a connection-target communication node and the first antenna 2111 as a communicating antenna. Specially, the terminal 2110 may determine a communicating antenna set corresponding to the first base station 2120 as the first antenna 2111, and a communicating antenna set corresponding to the second base station 2130 as the first antenna 2111.

The terminal 2110 may determine an antenna element operation mode of the first antenna 2111. The terminal 2110 may establish connection with the first base station 2120 and the second base station 2130 through a first frequency (f1) based on the determined antenna element operation mode.

For example, according to a lapse of time, in a case such as a case that the terminal 2110 hands over from the first base station 2120 to the second base station 2130, the terminal 2110 may exclude the first base station 2120 from a connection-target communication node as described in a right of an arrow.

The terminal 2110 may determine a communicating antenna corresponding to the second base station 2130 as the first antenna 2111.

The terminal 2110 may determine a communicating antenna of the first antenna 2111, and may re-determine an antenna element operation mode of the first antenna 2111. The terminal 2110 may establish connection with the second base station 2130 through the first frequency (f1) based on the determined antenna element operation mode.

In the terminal 2110, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by deleting at least one connection-target communication node included in a connection-target communication node set which is connected by sharing resource. This scheme may be equally applied to changing a connection configuration with base stations of which RATs are different.

Figure 22:
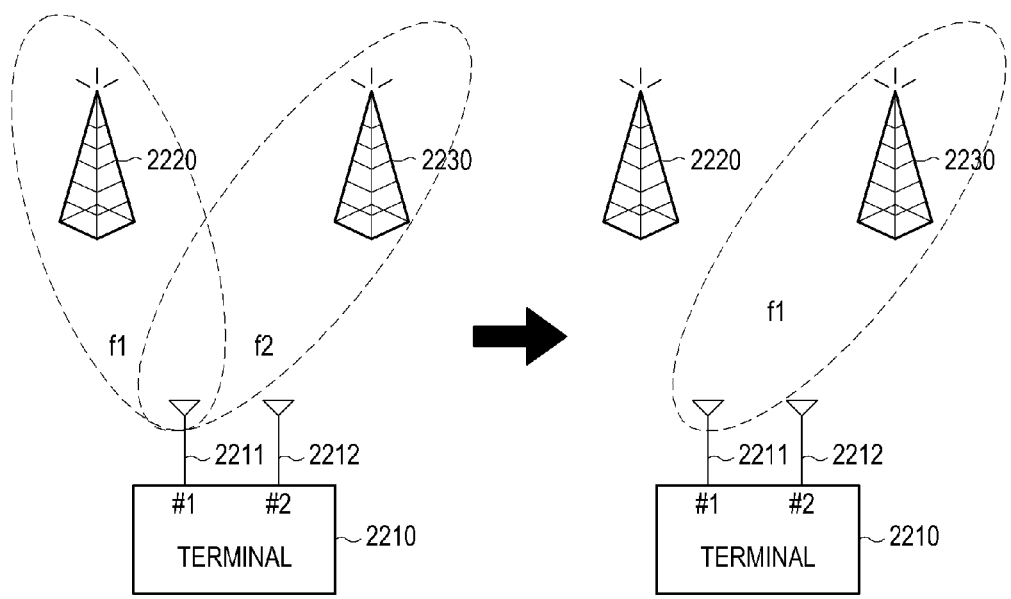

FIG. 22 schematically illustrates another embodiment in which a terminal changes a whole connection configuration by deleting a part of base stations with which the terminal establishes connection according to a lapse of time.

As described in FIG. 22, a terminal 2210 may include a first antenna 2211 and a second antenna 2212. The terminal 2210 may determine a first base station 2220 and a second base station 2230 as a connection-target communication node and the first antenna 2211 as a communicating antenna. Specially, the terminal 2210 may determine a communicating antenna set corresponding to the first base station 2220 as the first antenna 2211, and a communicating antenna set corresponding to the second base station 2230 as the first antenna 2211.

The terminal 2210 may determine an antenna element operation mode of the first antenna 2211. The terminal 2210 may establish connection with the first base station 2120 through a first frequency (f1) and establish connection with the second base station 2130 through a second frequency (f2) based on the determined antenna element operation mode.

For example, according to a lapse of time, in a case such as a case that the terminal 2210 hands over from the first base station 2220 to the second base station 2230, the terminal 2210 may exclude the first base station 2220 from a connection-target communication node as described in a right of an arrow.

The terminal 2210 may determine a communicating antenna corresponding to the second base station 2230 as the first antenna 2211.

The terminal 2210 may determine a communicating antenna of the first antenna 2211, and may re-determine an antenna element operation mode of the first antenna 2211. The terminal 2210 may establish connection with the second base station 2230 through the first frequency (f1) based on the determined antenna element operation mode.

In the terminal 2210, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by deleting at least one connection-target communication node included in a connection-target communication node set which is connected using different resources. This scheme may be equally applied to changing a connection configuration with base stations of which RATs are different.

Figure 23:
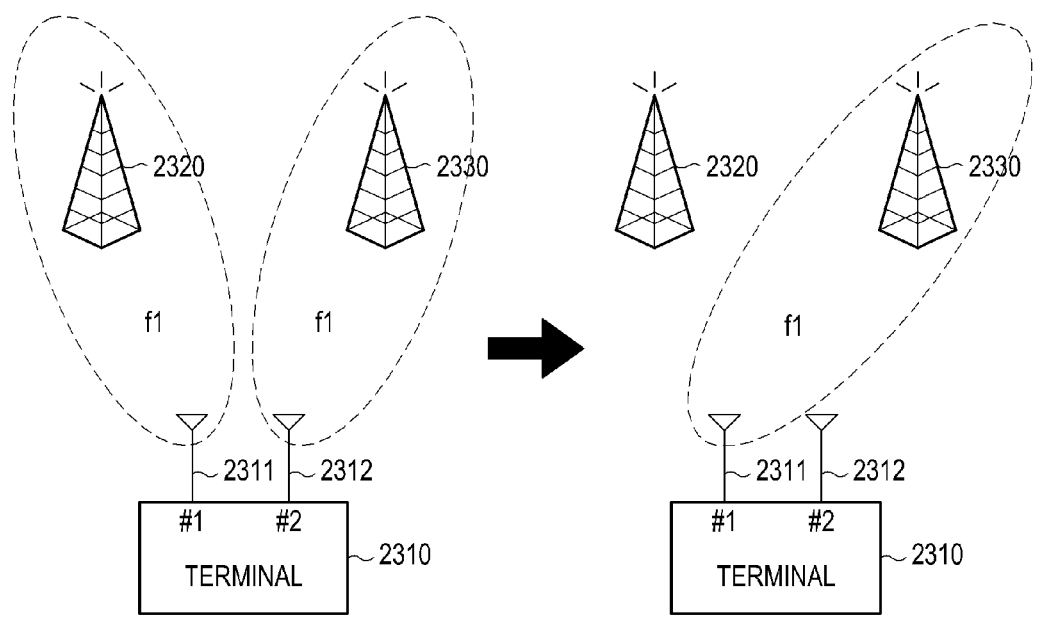

FIG. 23 schematically illustrates an embodiment in which a terminal changes a whole connection configuration by deleting a part of base stations with which the terminal establishes connection and changing a communicating antenna for each base station according to a lapse of time.

As described in FIG. 23, a terminal 2310 may include a first antenna 2311 and a second antenna 2312. The terminal 2310 may determine a first base station 2320 and a second base station 2330 as a connection-target communication node, and the first antenna 2311 and the second antenna 2312 as a communicating antenna. Specially, the terminal 2310 may determine a communicating antenna set corresponding to the first base station 2320 as the first antenna 2311, and a communicating antenna set corresponding to the second base station 2330 as the second antenna 2312.

The terminal 2310 may determine an antenna element operation mode of the first antenna 2311 and the second antenna 2312. The terminal 2310 may establish connection with the first base station 2320 through a first frequency (f1) and establish connection with the second base station 2330 through a second frequency (f2) based on the determined antenna element operation mode.

For example, according to a lapse of time, in a case such as a case that the terminal 2310 hands over from the first base station 2320 to the second base station 2330, the terminal 2310 may exclude the first base station 2320 from a connection-target communication node as described in a right of an arrow.

The terminal 2310 may determine a communicating antenna corresponding to the second base station 2330 as the first antenna 2311.

The terminal 2310 may determine a communicating antenna of the first antenna 2311, and may re-determine an antenna element operation mode of the first antenna 2311. The terminal 2310 may establish connection with the second base station 2330 through the first frequency (f1) based on the determined antenna element operation mode.

In the terminal 2310, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by deleting at least one connection-target communication node included in a connection-target communication node set which is connected using an antenna set which consists of different antennas. This scheme may be equally applied to changing a connection configuration with base stations of which RATs are different.

Figure 24:
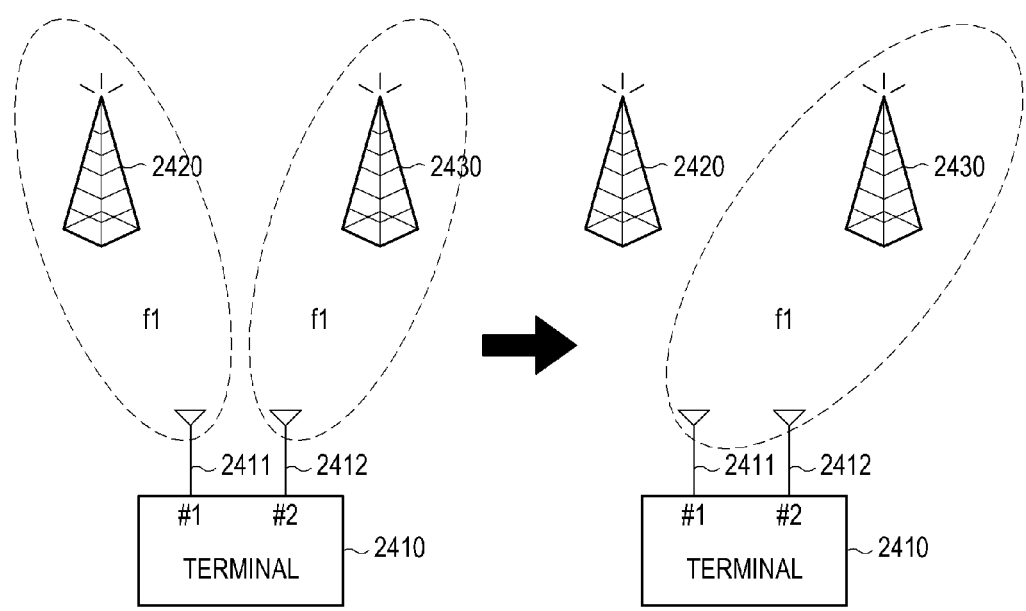

FIG. 24 schematically illustrates another embodiment in which a terminal changes a whole connection configuration by deleting a part of base stations with which the terminal establishes connection and changing a communicating antenna for each base station according to a lapse of time.

As described in FIG. 24, a terminal 2410 may include a first antenna 2411 and a second antenna 2412. The terminal 2410 may determine a first base station 2420 and a second base station 2430 as a connection-target communication node, and the first antenna 2411 and the second antenna 2412 as a communicating antenna. Specially, the terminal 2410 may determine a communicating antenna set corresponding to the first base station 2420 as the first antenna 2411, and a communicating antenna set corresponding to the second base station 2430 as the second antenna 2412.

The terminal 2410 may determine an antenna element operation mode of the first antenna 2411 and the second antenna 2412. The terminal 2410 may establish connection with the first base station 2420 through a first frequency (f1) and establish connection with the second base station 2430 through the first frequency (f1) based on the determined antenna element operation mode.

For example, according to a lapse of time, in a case such as a case that the terminal 2410 hands over from the first base station 2420 to the second base station 2430, the terminal 2410 may exclude the first base station 2420 from a connection-target communication node as described in a right of an arrow.

The terminal 2410 may determine a communicating antenna corresponding to the second base station 2430 as the first antenna 2411 and the second antenna 2412.

The terminal 2410 may determine a communicating antenna as the first antenna 2411 and the second antenna 2412, and re-determine an antenna element operation mode of the first antenna 2411 and the second antenna 2412. The terminal 2410 may determine a combined operation mode of an antenna set for a communicating antenna set which consists of the first antenna 2411 and the second antenna 2412.

The terminal 2410 may establish connection with the second base station 2430 through the first frequency (f1) based on the determined antenna element operation mode and combined operation mode of the antenna set.

In the terminal 2410, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

Figure 25:
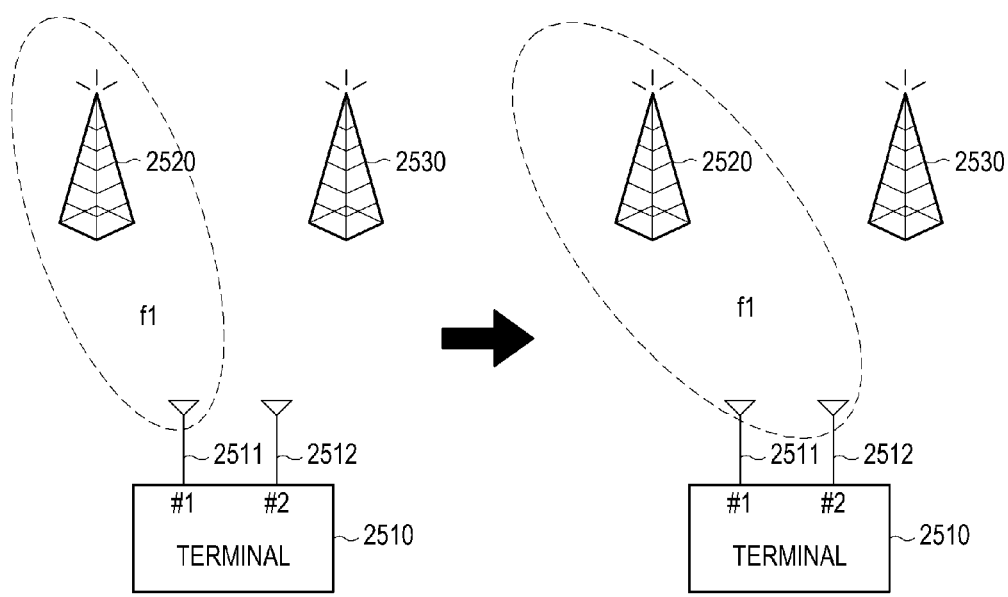

FIG. 25 illustrates an embodiment in which a terminal changes a whole connection configuration by changing at least one communicating antenna for each base station with which the terminal establishes connection, according to a lapse of time.

As described in FIG. 25, a terminal 2510 may include a first antenna 2511 and a second antenna 2512. The terminal 2510 may determine a first base station 2520 and a second base station 2530 as a connection-target communication node, and the first antenna 2511 as a communicating antenna. That is, the terminal 2510 may determine a communicating antenna set corresponding to the first base station 2520 as the first antenna 2511.

The terminal 2510 may determine an antenna element operation mode of the first antenna 2511. The terminal 2510 may establish connection with the first base station 2520 through a first frequency (f1) based on the determined antenna element operation mode.

For example, according to a lapse of time, in a case such as a case that a channel condition of the terminal 2510 becomes bad, the terminal 2510 may add the second antenna 2512 as a communicating antenna as described in a right of an arrow.

The terminal 2510 may determine a communicating antenna as the first antenna 2511 and the second antenna 2512, and re-determine an antenna element operation mode of the first antenna 2511 and the second antenna 2512. The terminal 2510 may determine a combined operation mode of an antenna set for a communicating antenna set which consists of the first antenna 2511 and the second antenna 2512.

The terminal 2510 may establish connection with the first base station 2520 through the first frequency (f1) based on the determined antenna element operation mode and combined operation mode of the antenna set.

In the terminal 2510, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

In this way, a reference communication node changes at least one connection-target communication node and a connection configuration by changing an antenna set for each connection-target communication node. This scheme may be equally applied to changing a connection configuration with base stations of which RATs are different.

Figure 26:
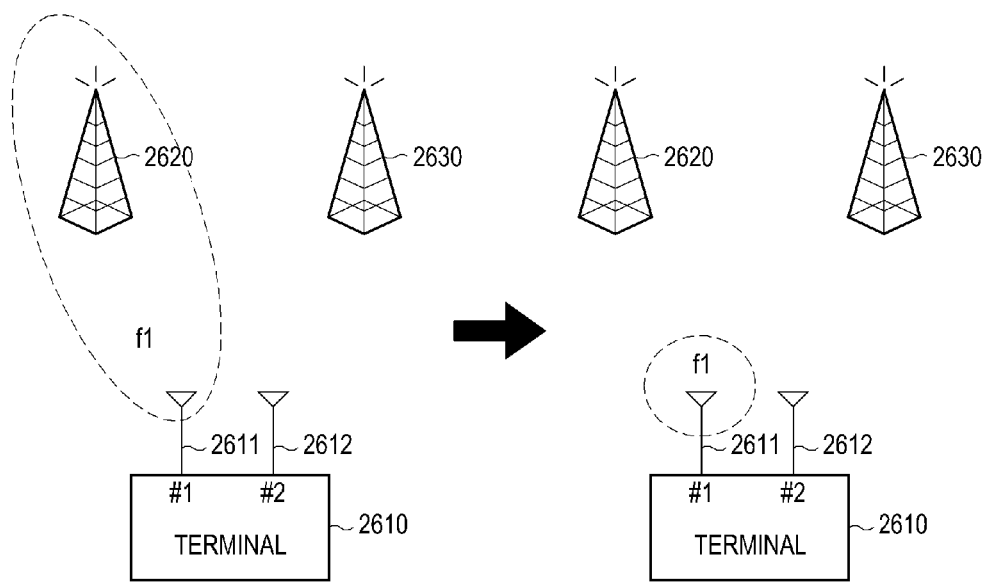

FIG. 26 illustrates an embodiment in which a terminal changes a whole connection configuration by changing an antenna element operation mode of each of at least one antenna, according to a lapse of time.

As described in FIG. 26, a terminal 2610 may include a first antenna 2611 and a second antenna 2612. The terminal 2610 may determine a first base station 2620 as a connection-target communication node, and the first antenna 2611 as a communicating antenna. That is, the terminal 2610 may determine a communicating antenna set corresponding to the first base station 2620 as the first antenna 2611.

The terminal 2610 may determine an antenna element operation mode of the first antenna 2611. The terminal 2610 may determine an antenna element operation mode as an element antenna directional mode in order that the first antenna 2611 radiates a signal towards the first base station 2620.

The terminal 2610 may establish connection with the first base station 2620 through the first frequency (f1) based on the determined antenna element operation mode, e.g., an element antenna directional mode.

For example, according to a lapse of time, in a case such as a case that a channel condition of the terminal 2610 becomes bad, the terminal 2610 may change an antenna element operation mode of the first antenna 2611 from an element antenna directional mode to an element omni-directional mode as described in a right of an arrow.

In the terminal 2610, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by changing an antenna element operation mode. This scheme may be equally applied to changing a connection configuration with base stations of which RATs are different.

Figure 27:
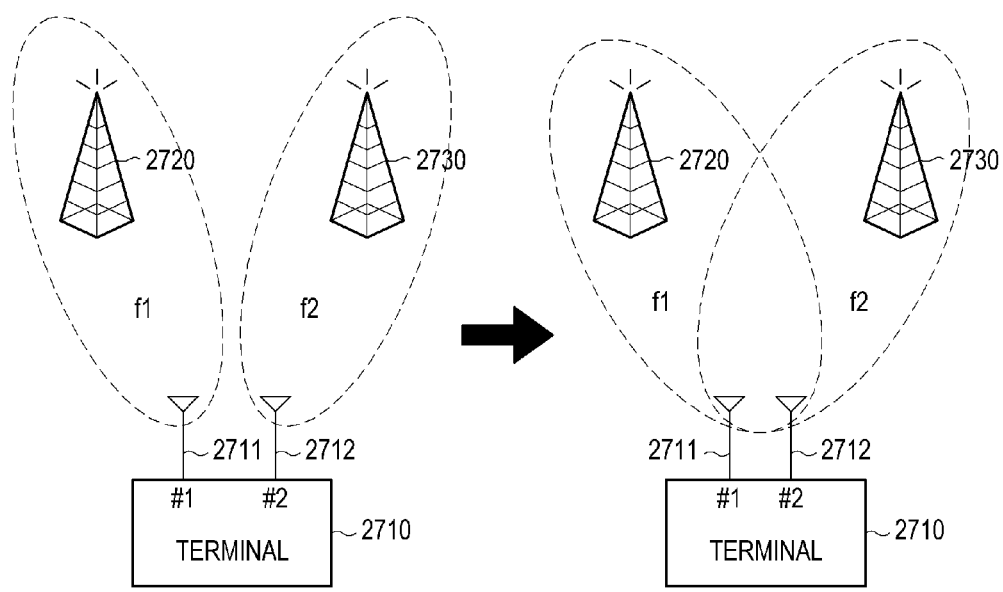

FIG. 27 illustrates an embodiment in which a terminal changes a whole connection configuration by changing a common use configuration of a communicating antenna set, according to a lapse of time.

As described in FIG. 27, a terminal 2710 may include a first antenna 2711 and a second antenna 2712. The terminal 2710 may determine a first base station 2720 and a second base station 2730 as a connection-target communication node, and the first antenna 2711 and the second antenna 2712 as a communicating antenna. Specially, the terminal 2710 may determine a communicating antenna set corresponding to the first base station 2720 as the first antenna 2711, and a communicating antenna set corresponding to the second base station 2730 as the second antenna 2712.

The terminal 2710 may determine an antenna element operation mode of the first antenna 2711 and the second antenna 2712. The terminal 2710 may establish connection with the first base station 2720 through a first frequency (f1) and establish connection with the second base station 2730 through a second frequency (f2) based on the determined antenna element operation mode.

According to a lapse of time, the terminal 2710 may change a communicating antenna set as described in a right of an arrow.

The terminal 2710 may determine a communicating antenna corresponding to the first base station 2720 as the first antenna 2711 and the second antenna 2712, and determine a communicating antenna corresponding to the second base station 2730 as the first antenna 2711 and the second antenna 2712.

The terminal 2710 may re-determine an antenna element operation mode of the first antenna 2711 and the second antenna 2712. The terminal 2710 may determine a combined operation mode of an antenna set for a communicating antenna set which consists of the first antenna 2711 and the second antenna 2712.

The terminal 2710 may establish connection with the first base station 2720 through the first frequency (f1), and establish connection with the second base station 2730 through the second frequency (f2) based on the determined antenna element operation mode and combined operation mode of the antenna set.

In the terminal 2710, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

In this way, a reference communication node changes at least one connection-target communication node and a connection configuration by changing a common use configuration of an antenna set for each connection-target communication node. This scheme may be equally applied to changing a connection configuration with base stations of which RATs are different.

Figure 28:
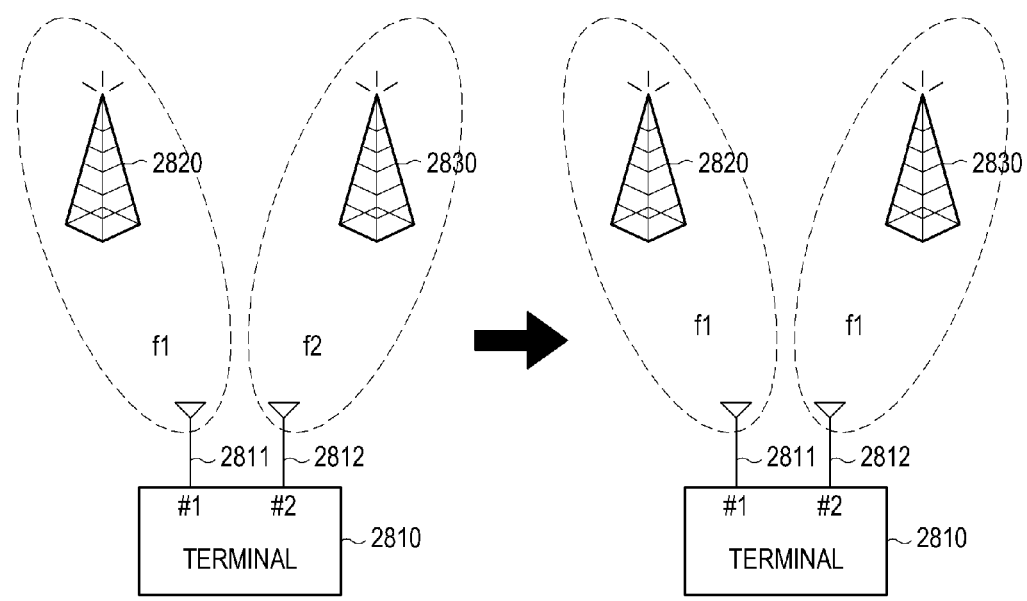

FIG. 28 illustrates an embodiment of changing a whole connection configuration by changing a sharing configuration of resource for each base station with which a terminal establishes connection, according to a lapse of time.

As described in FIG. 28, a terminal 2810 may include a first antenna 2811 and a second antenna 2812. The terminal 2810 may determine a first base station 2820 and a second base station 2830 as a connection-target communication node, and the first antenna 2811 and the second antenna 2812 as a communicating antenna. Specially, the terminal 2810 may determine a communicating antenna set corresponding to the first base station 2820 as the first antenna 2811, and a communicating antenna set corresponding to the second base station 2830 as the second antenna 2812.

The terminal 2810 may determine an antenna element operation mode of the first antenna 2811 and the second antenna 2812. The terminal 2810 may establish connection with the first base station 2820 through a first frequency (f1) and establish connection with the second base station 2830 through a second frequency (f2) based on the determined antenna element operation mode.

According to a lapse of time, the terminal 2810 may change a frequency for connecting with the second base station 2830 to a first frequency (f1) as described in a right of an arrow.

In the terminal 2810, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

In this way, a reference communication node changes at least one connection-target communication node and a connection configuration by changing a sharing configuration of resource for each connection-target communication node. This scheme may be equally applied to changing a connection configuration with base stations of which RATs are different.

Figure 29:
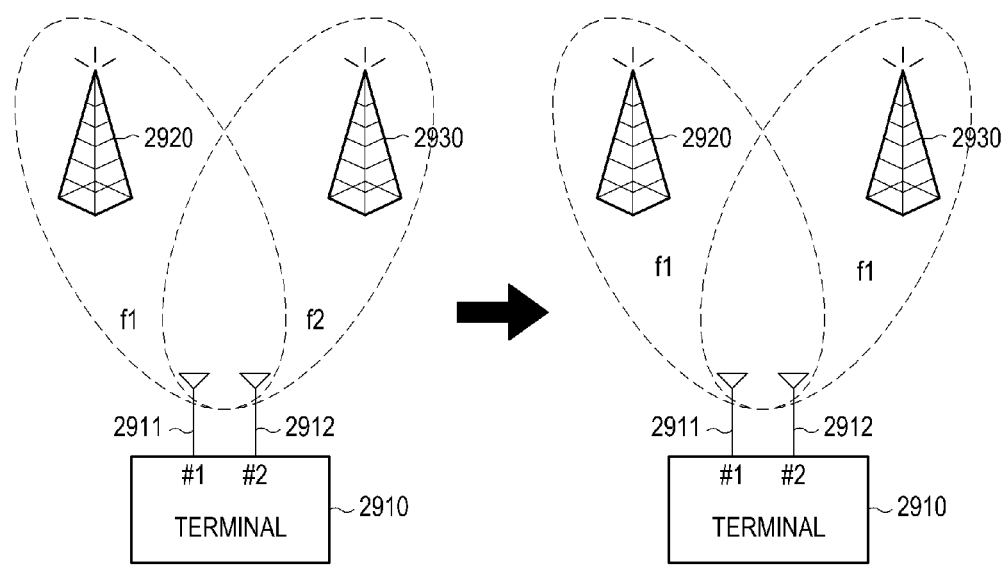

FIG. 29 illustrates another embodiment of changing a whole connection configuration by changing a sharing configuration of resource for each base station with which a terminal establishes connection, according to a lapse of time.

As described in FIG. 29, a terminal 2910 may include a first antenna 2911 and a second antenna 2912. The terminal 2910 may determine a first base station 2920 and a second base station 2930 as a connection-target communication node, and the first antenna 2911 and the second antenna 2912 as a communicating antenna. Specially, the terminal 2910 may determine a communicating antenna set corresponding to the first base station 2920 as the first antenna 2911 and the second antenna 2912, and a communicating antenna set corresponding to the second base station 2930 as the first antenna 2911 and the second antenna 2912.

The terminal 2910 may determine an antenna element operation mode of the first antenna 2911 and the second antenna 2912. The terminal 2910 may determine a combined operation mode of an antenna set which consists of the first antenna 2911 and the second antenna 2912.

The terminal 2910 may establish connection with the first base station 2920 through the first frequency (f1), and establish connection with the second base station 2930 through the second frequency (f2) based on the determined antenna element operation mode and combined operation mode of the antenna set.

According to a lapse of time, the terminal 2910 may change a frequency for connecting with the second base station 2930 to a first frequency (f1) as described in a right of an arrow.

In the terminal 2910, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

In this way, a reference communication node changes at least one connection-target communication node and a connection configuration by changing a sharing configuration of resource for each connection-target communication node. This scheme may be equally applied to changing a connection configuration with base stations of which RATs are different.

Figure 30:
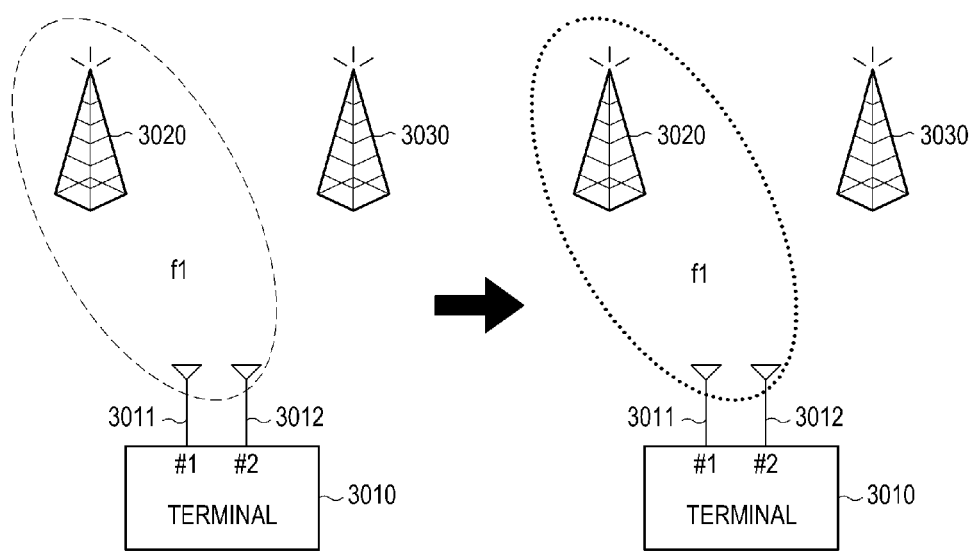

FIG. 30 illustrates an embodiment of changing a combined operation mode of an antenna set for each base station with which a terminal establishes connection according to a lapse of time.

As described in FIG. 30, a terminal 3010 may include a first antenna 3011 and a second antenna 3012. The terminal 3010 may determine a first base station 3020 as a connection-target communication node, and the first antenna 3011 and the second antenna 3012 as a communicating antenna. That is, the terminal 3010 may determine a communicating antenna set corresponding to the first base station 3020 as the first antenna 3011 and the second antenna 3012.

The terminal 3010 may determine an antenna element operation mode of the first antenna 3011 and the second antenna 3012. The terminal 3010 may determine a combined operation mode of an antenna set which consists of the first antenna 3011 and the second antenna 3012. For example, the terminal 3010 may determine a combined diversity mode.

The terminal 3010 may establish connection with the first base station 3020 through the first frequency (f1) based on the determined antenna element operation mode and combined operation mode of the antenna set.

According to a lapse of time, the terminal 3010 may change a combined operation mode of an antenna set from a combined diversity mode to a combined multiplexing mode as described in a right of an arrow.

In the terminal 3010, each antenna may be operated in one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, an element antenna signal transmission/reception scheme for each antenna.

An antenna set which consists of at least two antennas may be operated in a combined operation mode as one of a combined omni-directional mode, a combined directional mode, a combined diversity mode, a combined multiplexing mode, a combined diversity-multiplexing hybrid mode, and a combined CDD mode. Here, the antenna set may be operated in a combined operation mode of various antenna sets according to a combined beam pattern and a combining signal transmission/reception scheme for each antenna set.

In this way, a reference communication node changes at least one connection-target communication node and a connection configuration by changing a combined operation mode of an antenna set for each connection-target communication node. This scheme may be equally applied to changing a connection configuration with base stations of which RATs are different.

Figure 31:
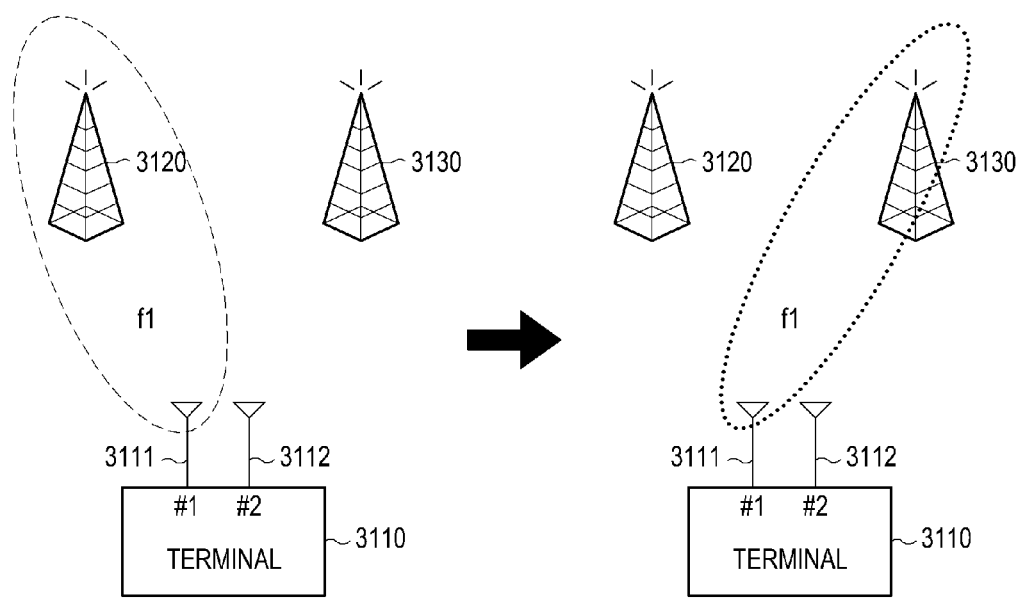

FIG. 31 illustrates an embodiment of changing a whole connection configuration by changing a base station with which a terminal establishes connection and an antenna element operation mode according to a lapse of time.

As described in FIG. 31, a terminal 3110 may include a first antenna 3111 and a second antenna 3112. The terminal 3110 may determine a first base station 3120 as a connection-target communication node, and the first antenna 3111 as a communicating antenna. The terminal 3110 may determine an antenna element operation mode of the first antenna 3111, and establish connection with a first base station through a first frequency (f1) based on the determined an antenna element operation mode, e.g., an element antenna directional diversity mode.

For example, according to a lapse of time, in a case such as a case that the terminal 3110 hands over from the first base station 3120 to the second base station 3130, the terminal 3110 may determine the second base station 3130 as a connection-target communication node as described in a right of an arrow.

For example, the terminal 3110 may maintain a communicating antenna as the first antenna 3111, and re-determine an antenna element operation mode of the first antenna 3111 as an element antenna directional multiplexing mode. The terminal 3110 may establish connection with the second base station 3130 through the first frequency (f1) based on the determined antenna element operation mode.

Each antenna which is used as an antenna element operation mode as one of an element antenna omni-directional mode, an element antenna directional mode, an element antenna directional diversity mode, an element antenna directional multiplexing mode, and an element antenna off mode may change an antenna element operation mode to an antenna element operation mode as one of the element antenna omni-directional mode, the element antenna directional mode, the element antenna directional diversity mode, the element antenna directional multiplexing mode, and the element antenna off mode. Here, the antenna element operation mode may be changed to various antenna element operation modes according to a change of at least one of an element antenna on-off state, an element antenna beam pattern, and an element antenna signal transmission/reception scheme for each antenna.

In this way, a reference communication node changes at least one connection-target communication node and a connection configuration by changing a connection-target communication node set and an antenna element operation mode. This scheme may be equally applied to changing a connection configuration with base stations of which RATs are different.

Figure 32:
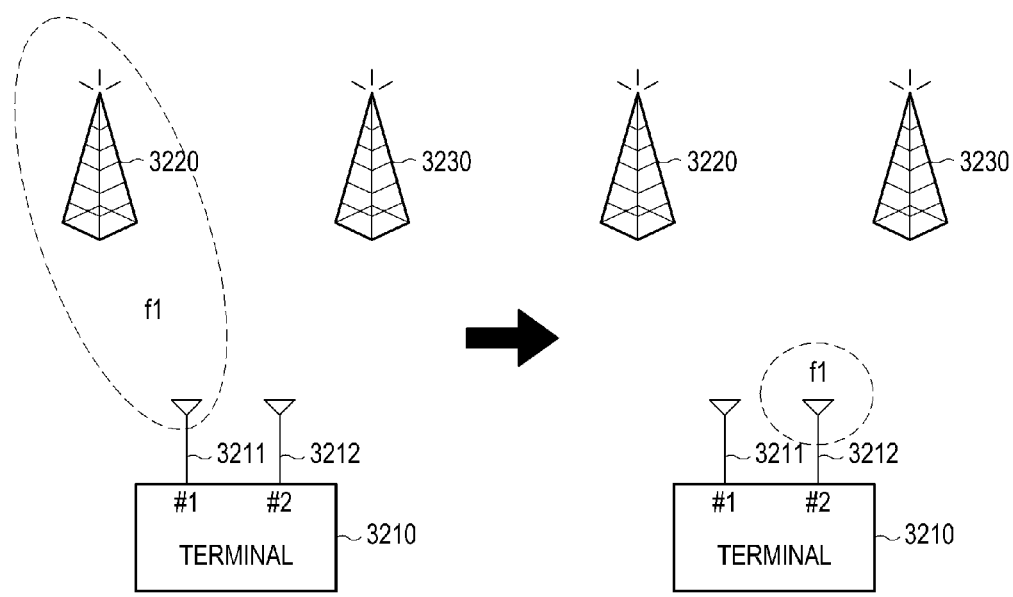

FIG. 32 illustrates an embodiment of changing a whole connection configuration by changing a communicating antenna for each base station with which a terminal establishes connection and an antenna element operation mode of each antenna according to a lapse of time.

As described in FIG. 32, a terminal 3210 may include a first antenna 3211 and a second antenna 3212. The terminal 3210 may determine a first base station 3220 as a connection-target communication node, and the first antenna 3211 as a communicating antenna. That is, the terminal 3210 may determine a communicating antenna set corresponding to the first base station 3220 as the first antenna 3211.

The terminal 3210 may determine an antenna element operation mode of the first antenna 3211. The terminal 3210 may determine an antenna element operation mode as an element antenna directional mode in order that the first antenna 3211 radiates towards the first base station 3220.

The terminal 3210 may establish connection with the first base station 3220 through the first frequency (f1) based on the determined antenna element operation mode, e.g., an element antenna directional mode.

For example, according to a lapse of time, in a case such as a case that a channel condition of the terminal 3210 becomes bad, the terminal 3210 may determine the second antenna 3212 as a communicating antenna, and change an antenna element operation mode of the second antenna 3212 to an element antenna omni-directional mode as described in a right of an arrow.

Each antenna which is used as an antenna element operation mode as one of an element antenna omni-directional mode, an element antenna directional mode, an element antenna directional diversity mode, an element antenna directional multiplexing mode, and an element antenna off mode may change an antenna element operation mode to an antenna element operation mode as one of the element antenna omni-directional mode, the element antenna directional mode, the element antenna directional diversity mode, the element antenna directional multiplexing mode, and the element antenna off mode. Here, the antenna element operation mode may be changed to various antenna element operation modes according to a change of at least one of an element antenna on-off state, an element antenna beam pattern, and an element antenna signal transmission/reception scheme for each antenna.

In this way, a reference communication node changes at least one connection-target communication node and a connection configuration by changing an antenna set and an antenna element operation mode for each connection-target communication node. This scheme may be equally applied to changing a connection configuration with base stations of which RATs are different.

Figure 33:
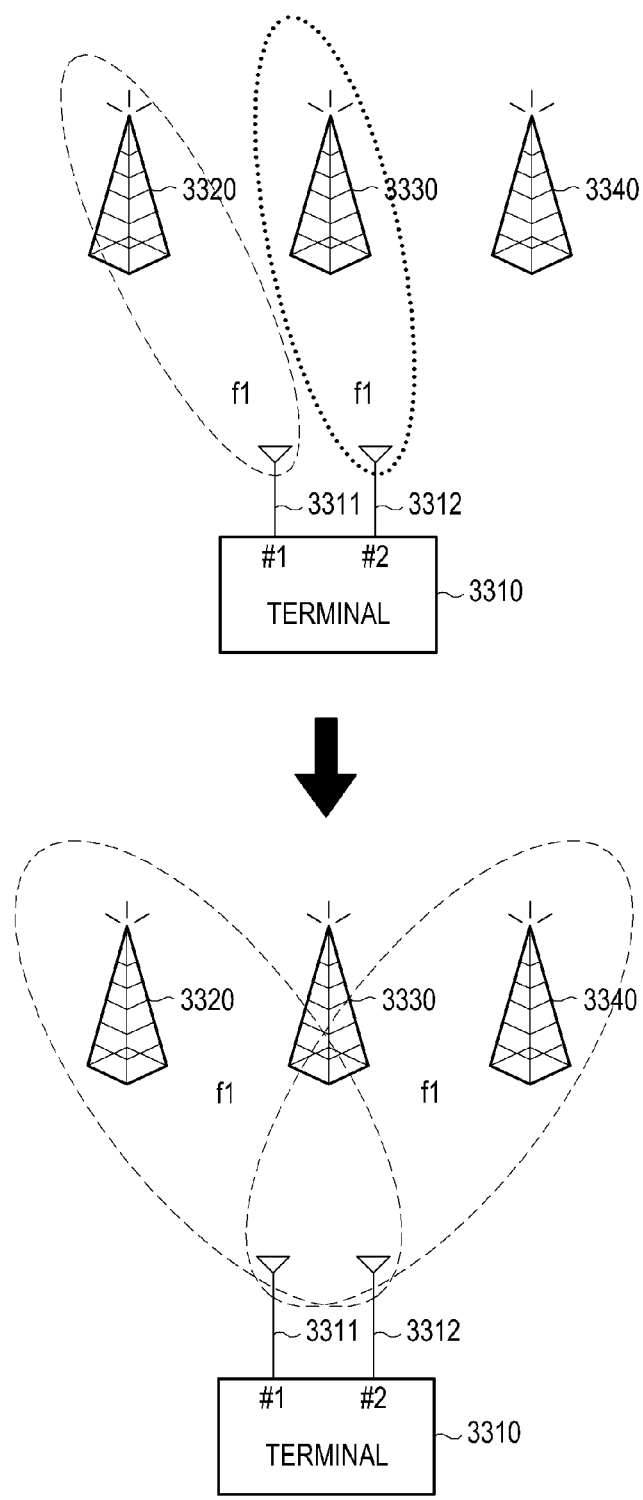

FIG. 33 illustrates an embodiment of changing a total connection configuration by changing a base station with which a terminal establishes connection, an element operation mode of each antenna, and a common use configuration of an antenna set according to a lapse of time.

As described in FIG. 33, a terminal 3310 may include a first antenna 3311 and a second antenna 3312. The terminal 3310 may determine a first base station 3320 and a second base station 3330 as a connection-target communication node, and the first antenna 3311 and the second antenna 3312 as a communicating antenna.

The terminal 3310 may determine a communicating antenna set corresponding to the first base station 3320 as the first antenna 3311, and determine a communicating antenna set corresponding to the second base station 3330 as the second antenna 3312.

The terminal 3310 may determine an antenna element operation mode of the first antenna 3311 and the second antenna 3312. For example, the terminal 3310 may determine the antenna element operation mode of the first antenna 3311 and the second antenna 3312 as an element antenna directional diversity mode. The terminal 3310 may establish connection with the first base station 3320 through a first frequency (f1) and establish connection with the first second station 3330 through the first frequency (f1).

According to a lapse of time, the terminal 3310 may change a base station as described in a right of an arrow. For example, the terminal 3310 may change a connection-target communication node to the first base station 3320 and the third base station 3340.

The terminal 3310 may determine a communicating antenna set corresponding to a first base station 3320 as a first antenna 3311 and a second antenna 3312, and determine a communicating antenna set corresponding to a third base station 3340 as the first antenna 3311 and the second antenna 3312.

The terminal 3310 may re-determine an antenna element operation mode for each communicating antenna, and determine a combined operation mode of an antenna set. For example, the terminal 3310 changes an antenna element operation mode of the first antenna 3311 from an element antenna directional diversity mode to an element antenna directional mode, and changes an antenna element operation mode of the second antenna 3312 from an element antenna directional multiplexing mode to an element antenna directional mode. The terminal 3310 uses commonly an antenna set which consists of a first antenna and a second antenna and changes a connection configuration in order to connect to a first base station and a third base station through the first frequency (f1) by changing a common use configuration of an antenna set for each connection-target communication node in order that the first base station and a second base station use commonly the antenna set which consists of the first antenna and the second antenna.

Each antenna which is used as an antenna element operation mode as one of an element antenna omni-directional mode, an element antenna directional mode, an element antenna directional diversity mode, an element antenna directional multiplexing mode, and an element antenna off mode may change an antenna element operation mode to an antenna element operation mode as one of the element antenna omni-directional mode, the element antenna directional mode, the element antenna directional diversity mode, the element antenna directional multiplexing mode, and the element antenna off mode. Here, the antenna element operation mode may be changed to various antenna element operation modes according to a change of at least one of an element antenna on-off state, an element antenna beam pattern, and an element antenna signal transmission/reception scheme for each antenna.

In this way, a reference communication node changes at least one connection-target communication node and a connection configuration by changing a connection-target communication node set, an antenna element operation mode, and a common use configuration of an antenna set for each connection-target communication node. A reference communication node may changes at least one connection-target communication node and a connection configuration by changing an antenna set for each connection-target communication node set, an antenna element operation mode, and a common use configuration of an antenna set for each connection-target communication node. This scheme may be equally applied to changing a connection configuration with base stations of which RATs are different.

Figure 34:
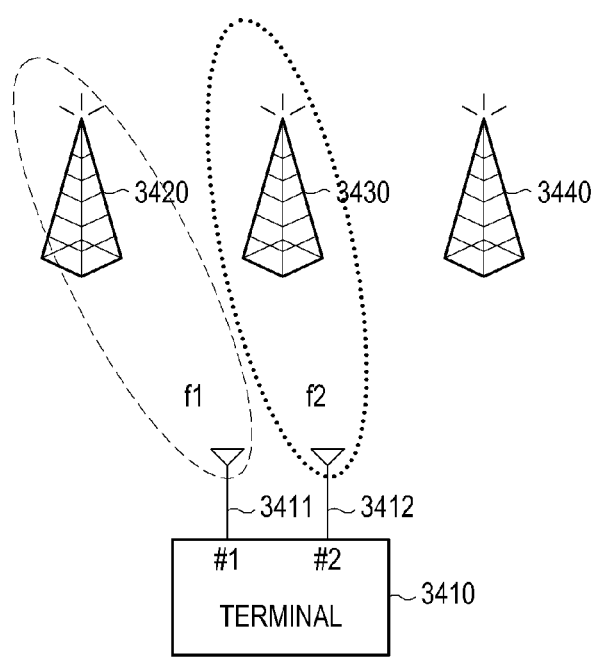
Figure 34:
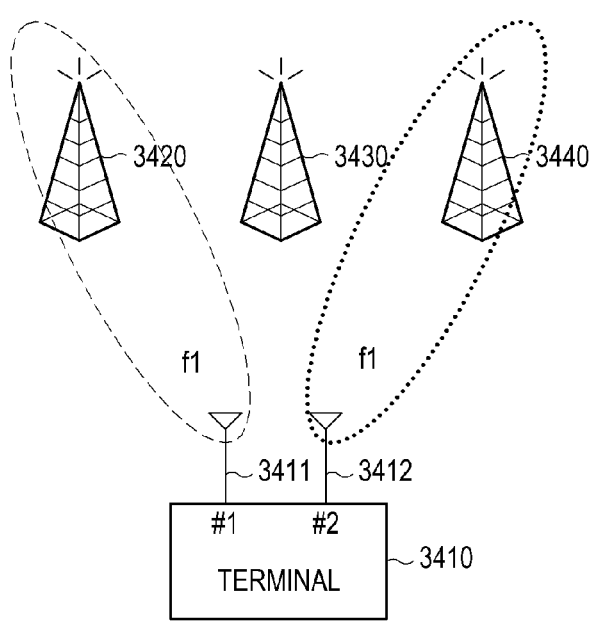

FIG. 34 illustrates an embodiment of changing a total connection configuration by changing a base station with which a terminal establishes connection, an element operation mode of each antenna, and a resource sharing configuration according to a lapse of time.

As described in FIG. 34, a terminal 3410 may include a first antenna 3411 and a second antenna 3412. The terminal 3410 may determine a first base station 3420 and a second base station 3430 as a connection-target communication node, and the first antenna 3411 and the second antenna 3412 as a communicating antenna.

The terminal 3410 may determine a communicating antenna set corresponding to the first base station 3420 as the first antenna 3411, and determine a communicating antenna set corresponding to the second base station 3430 as the second antenna 3412.

The terminal 3410 may determine an antenna element operation mode of the first antenna 3411 and the second antenna 3412. For example, the terminal 3410 may determine the antenna element operation mode of the first antenna 3411 and the second antenna 3412 as an element antenna directional diversity mode. The terminal 3410 may establish connection with the first base station 3420 through the first frequency (f1) and establish connection with the second base station 3430 through the second frequency (f2) based on the antenna element operation mode.

According to a lapse of time, the terminal 3410 may change a base station as described in a right of an arrow. For example, the terminal 3410 may change a connection-target communication node to the first base station 3420 and the third base station 3440.

The terminal 3410 may determine a communicating antenna set corresponding to the first base station 3420 as the first antenna 3411, and determine a communicating antenna set corresponding to the third base station 3440 as the second antenna 3412.

The terminal 3410 may re-determine an antenna element operation mode for each communicating antenna. For example, the terminal 3410 changes an antenna element operation mode of the first antenna 3411 from an element antenna directional diversity mode to an element antenna directional mode, and changes an antenna element operation mode of the second antenna 3412 from an element antenna directional diversity mode to an element antenna directional mode. The terminal 3410 may establish connection with the first base station 3420 through the first frequency (f1) and establish connection with the third base station 3440 through the first frequency (f1) based on the changed antenna element operation mode.

Upon changing an antenna element operation mode, each of antennas which are used as one of an element antenna omni-directional mode, an element antenna directional mode, an element antenna directional diversity mode, an element antenna directional multiplexing mode, and an element antenna off mode may be changed to one of the element antenna omni-directional mode, the element antenna directional mode, the element antenna directional diversity mode, the element antenna directional multiplexing mode, and the element antenna off mode. Here, an antenna element operation mode of each of the antennas may be changed to various antenna element operation modes according to a change of at least one of an element antenna on-off state, an element antenna beam pattern, and an element antenna signal transmission/reception scheme for each antenna.

In this way, a reference communication node changes at least one connection-target communication node and a connection configuration by changing a connection-target communication node set, an antenna element operation mode, and a sharing configuration of resource for each connection-target communication node. Further, a reference communication node may change at least one connection-target communication node and a connection configuration by changing an antenna set for each connection-target communication node set, an antenna element operation mode, and a sharing configuration of resource for each connection-target communication node. This scheme may be equally applied to changing a connection configuration with base stations of which RATs are different.

Figure 35:
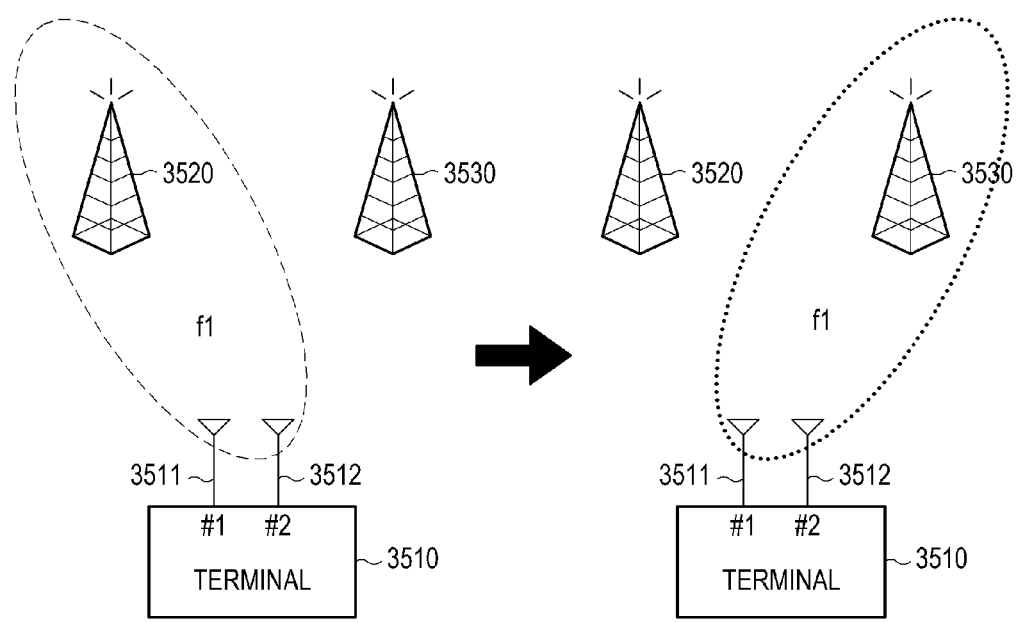

FIG. 35 illustrates an embodiment of changing an antenna set for each of base stations with which a terminal establishes connection, an antenna element operation mode of each antenna, and a combined operation mode of an antenna set for each of the base stations according to a lapse of time.

As described in FIG. 35, a terminal 3510 may include a first antenna 3511 and a second antenna 3512. The terminal 3510 may determine a first base station 3520 as a connection-target communication node, and the first antenna 3511 and the second antenna 3512 as a communicating antenna. That is, the terminal 3210 may determine a communicating antenna set corresponding to the first base station 3520 as the first antenna 3211 and the second antenna 3512.

The terminal 3510 may determine an antenna element operation mode of the first antenna 3511 and the second antenna 3512. The terminal 3510 may determine a combined operation mode of an antenna set which consists of the first antenna 3511 and the second antenna 3512. For example, the terminal 3510 may determine a combined diversity mode.

The terminal 3510 may establish connection with the first base station 3520 through the first frequency (f1) based on the determined antenna element operation mode and combined operation mode of the antenna set.

According to a lapse of time, the terminal 3510 may change a combined operation mode of an antenna set from a combined diversity mode to a combined multiplexing mode as described in a right of an arrow. So, the terminal 3510 may establish connection with the second base station 3530 based on a combined multiplexing mode.

Each antenna may be operated in one of antenna element operation mode, each of antennas which are used as one of an element antenna omni-directional mode, an element antenna directional mode, an element antenna directional diversity mode, an element antenna directional multiplexing mode, and an element antenna off mode. Here, each antenna may be operated in various antenna element operation modes according to an element antenna on-off state, an element antenna beam pattern, and an element antenna signal transmission/reception scheme for each antenna.

Upon changing a combined operation mode of an antenna set, each of antenna sets which consist of at least two antennas which are used as one of a combined omni-directional mode, a combined directional mode, a combined diversity mode, a combined multiplexing mode, a combined diversity-multiplexing complex mode, and a combined CDD mode may be changed to another one of the combined omni-directional mode, the combined directional mode, the combined diversity mode, the combined multiplexing mode, the combined diversity-multiplexing complex mode, and the combined CDD mode. Here, a combined operation mode of each of the antenna sets may be changed to various combined operation modes through change of at least one of a combined beam pattern and a combining signal transmission/reception scheme for each of the antenna sets.

In this way, a reference communication node changes at least one connection-target communication node and a connection configuration by changing a connection-target communication node set, an antenna element operation mode, and a combined operation mode of an antenna set for each connection-target communication node. Further, a reference communication node may change at least one connection-target communication node and a connection configuration by changing an antenna set for each connection-target communication node set, an antenna element operation mode, and a combined operation mode of an antenna set for each connection-target communication node. This scheme may be equally applied to changing a connection configuration with base stations of which RATs are different.

Figure 36:
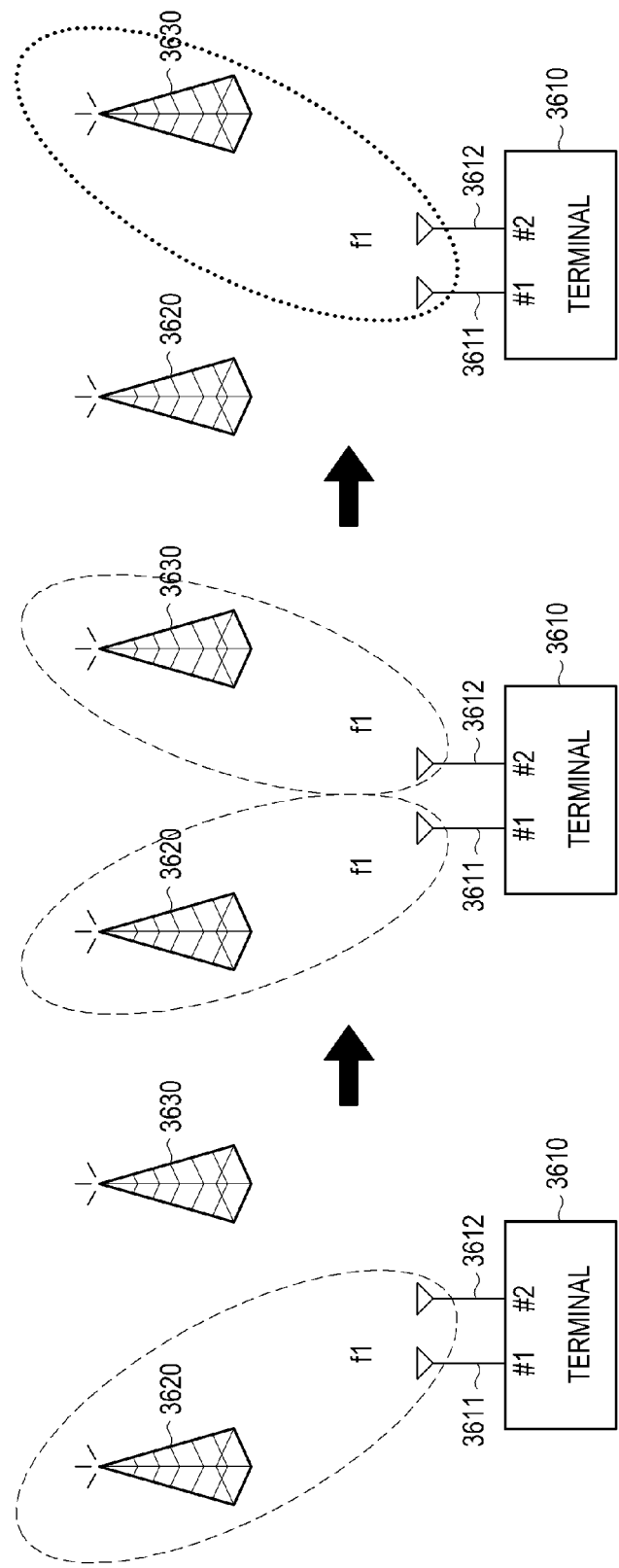

FIG. 36 illustrates an embodiment of sequentially changing a base station with which a terminal establishes connection, an antenna set for each base station, and an antenna element operation mode of each antenna according to a lapse of time.

Referring to FIG. 36, upon sequentially changing a connection configuration, a terminal 3610 which establishes connection with a first base station 3620 through a first frequency (f1) through an element antenna directional diversity mode and a combined diversity mode using two antennas 3611, 3612 firstly changes a connection-target communication node set from the first base station 3620 to the first base station 3620 and a second base station 3630.

The terminal 3610 changes a connection configuration in order to connect to a first base station through the first frequency (f1) and the first antenna 3611 using an element antenna directional mode, and connect to the second base station 3630 through the first frequency (f1) and the second antenna 3612 using the element, by changing antenna set for each connection-target communication node from an antenna set of the first base station 3620 to an antenna set which consists of the first antenna 3611, and from an antenna set of the second base station 3630 to an antenna set which consists of the second antenna 3612, and changing an antenna element operation mode of each of the first antenna 3611 and the second antenna 3612 from an element antenna directional diversity mode to an element antenna directional mode.

The terminal 3610 changes a connection configuration in order to connect to the second base station 3630 using an element antenna directional multiplexing mode and a combined multiplexing mode through the first frequency (f1) and an antenna set which consists of the first antenna 3611 and the second antenna 3612 by changing a connection-target communication node set from the first base station 3620 and the second base station 3630 to the second base station 3630, changing an antenna set for each connection-target communication node from an antenna set of the second base station 3630 to an antenna set which consists of the first antenna 3611 and the second antenna 3612, changing an antenna element operation mode of each of the first antenna 3611 and the second antenna 3612 from an element antenna directional mode to an element antenna directional multiplexing mode, and determining two antennas as a combined multiplexing mode.

When an antenna element operation mode of each antenna, the antenna element operation mode of the each antenna which is one of an element antenna omni-directional mode, an element antenna directional mode, an element antenna directional diversity mode, an element antenna directional multiplexing mode, and an element antenna off mode may be changed to another one of an element antenna omni-directional mode, an element antenna directional mode, an element antenna directional diversity mode, an element antenna directional multiplexing mode, and an element antenna off mode. Here, the antenna element operation mode may be changed to various antenna element operation modes according to a change of at least one of an element antenna on-off state, an element antenna beam pattern, and an element antenna signal transmission/reception scheme for each antenna.

In this way, a reference communication node changes a connection configuration with at least one connection-target communication node by sequentially changing a connection-target communication node set, an antenna set for each connection-target communication node, and an antenna element operation mode. The reference communication node may change a connection configuration with at least one connection-target communication node by sequentially changing a connection-target communication node set, an antenna set for each connection-target communication node, an antenna element operation mode, whether to use commonly an antenna set and/or whether to share resource, antenna combination of each of antenna sets for each connection-target communication node, and the like.

Figure 37:
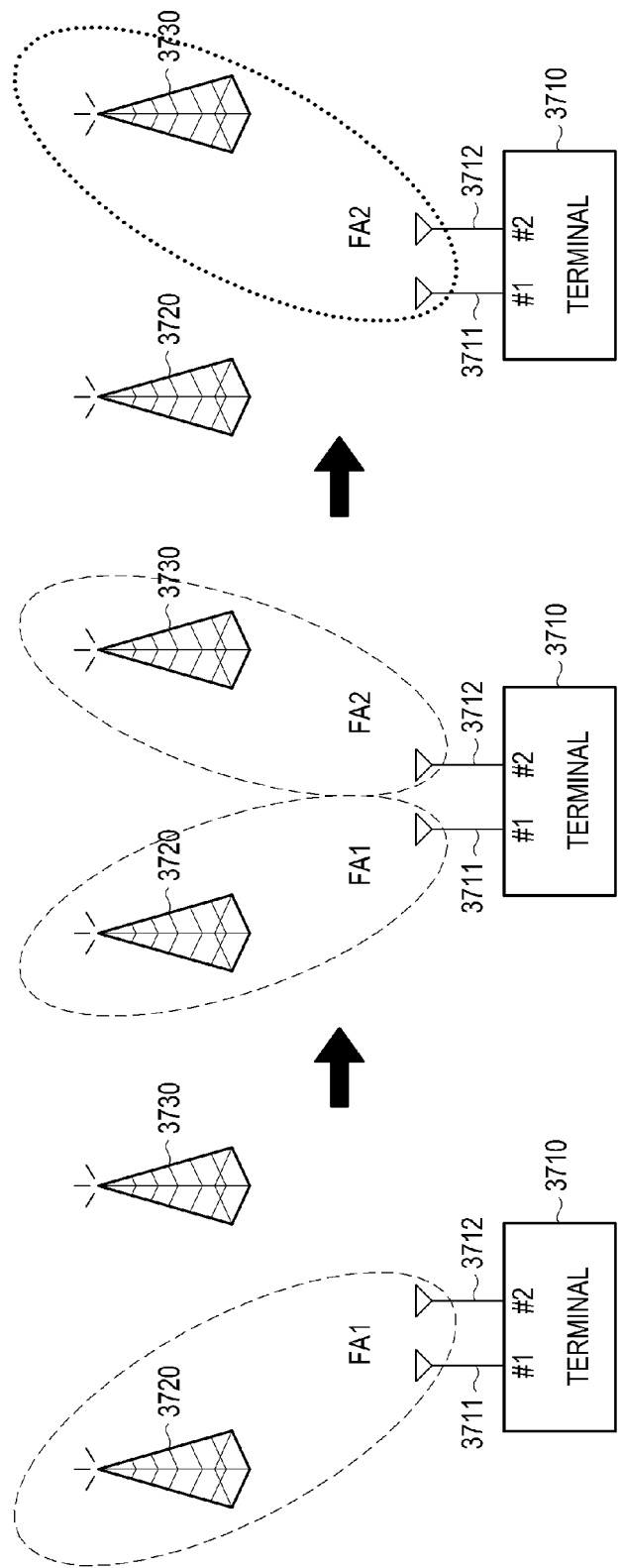

FIG. 37 illustrates an embodiment of sequentially changing a base station with which a terminal establishes connection, an antenna set for each base station, and an antenna element operation mode of each antenna according to a lapse of time if the terminal changes a connection configuration with base stations which consist of different RATs.

Referring to FIG. 37, upon sequentially changing a connection configuration, a terminal 3710 which establishes connection with a first base station 3720 which consists of a first RAT using an element antenna directional diversity mode and a combined diversity mode through a first frequency band (FA1) and two antennas 3711, 3712 changes a connection configuration in order to connect to the first base station 3720 using an element antenna directional mode through the first frequency band (FA1) and the first antenna 3711 and to connect to the second base station 3730 using an element antenna directional mode through a second frequency band (FA2) and the second antenna 3712 by firstly changing a connection-target communication node set from the first base station 3720 to the first base station 3720 and the second base station 3730, changing an antenna set for each connection-target communication node by changing an antenna set of the first base station 3720 to an antenna set which consists of the first antenna 3711 and changing an antenna set of the second base station 3730 to an antenna set which consists of the second antenna 3712, and changing an antenna element operation mode of each of the first antenna 3711 and the second antenna 3712 from an element antenna directional diversity mode to an element antenna directional mode.

The terminal 3710 changes a connection configuration in order to connect to the second base station 3730 using an element antenna directional multiplexing mode and a combined multiplexing mode through a second frequency band (FA2) and an antenna set which consists of the first antenna 3711 and the second antenna 3712 by changing a connection-target communication node set from the first base station 3720 and the second base station 3730 to the second base station 3730, changing an antenna set for each connection-target communication node from an antenna set of the second base station 3730 to an antenna set which consists of the first antenna 3711 and the second antenna 3712, changing an antenna element operation mode of each of the first antenna 3711 and the second antenna 3712 from an element antenna directional mode to an element antenna directional multiplexing mode, and determining a combined operation mode of two antennas as a combined multiplexing mode.

When an antenna element operation mode of each antenna is changed, the antenna element operation mode of the each antenna which is one of an element antenna omni-directional mode, an element antenna directional mode, an element antenna directional diversity mode, an element antenna directional multiplexing mode, and an element antenna off mode may be changed to another one of an element antenna omni-directional mode, an element antenna directional mode, an element antenna directional diversity mode, an element antenna directional multiplexing mode, and an element antenna off mode. Here, the antenna element operation mode may be changed to various antenna element operation modes according to a change of at least one of an element antenna on-off state, an element antenna beam pattern, and an element antenna signal transmission/reception scheme for each antenna.

In this way, upon changing a connection configuration with base stations which consist of different RATs, a reference communication node changes a connection configuration with at least two connection-target communication nodes in order that RATs of a part or all of connection-target communication nodes which compose a connection-target communication node set and are different one another are different one another by sequentially changing a connection-target communication node set, an antenna set for each connection-target communication node, and an antenna element operation mode. The reference communication node may change a connection configuration with at least two connection-target communication nodes in order that RATs of a part or all of connection-target communication nodes which compose a connection-target communication node set and are different one another are different one another by sequentially changing a connection-target communication node set, an antenna set for each connection-target communication node, an antenna element operation mode, whether to use commonly an antenna set and/or whether to share resource, antenna combination of each of antenna sets for each connection-target communication node, and the like.

Figure 38:
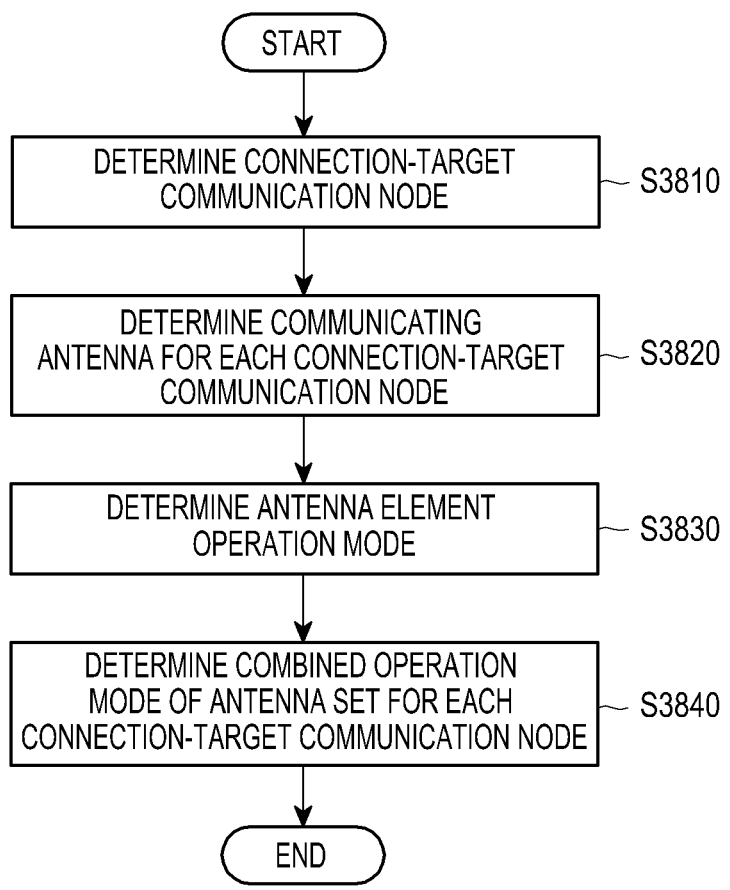
FIG. 38 is a flow chart of a control method of a reference communication node including at least one antenna for communicating with at least one communication node according to an embodiment of the present invention.

FIG. 38 is a flow chart of a control method of a reference communication node including at least one antenna for communicating with at least one communication node according to an embodiment of the present invention.

The reference communication node may determine a connection-target communication node set including at least one connection-target communication node (S3810).

The reference communication node may determine antenna sets including at least one communicating antenna for communicating with each of the at least one connection-target communication node among the at least one antenna (S3820).

The reference communication node may determine an antenna element operation mode of each of the at least one antenna (S3830), and may transmit/receive data to/from the connection-target communication node set using the antenna sets according to the antenna element operation mode of each of the at least one antenna.

If there are a plurality of communicating antennas, the reference communication node may determine a combined operation mode of an antenna set (S3840).

In the step of determining the connection-target communication node, the reference communication node may determine the connection-target communication node based on at least one of a moving speed between the reference communication node and the communication node, a channel condition, an external input, a channel information use method, a service condition, a user profile, and an access condition.

In this case, in the step of determining the connection-target communication node, the reference communication node may determine a communication node of which a channel condition between the reference communication node and the communication node is equal to greater than a preset criterion as the connection-target communication node.

In the step of determining the connection-target communication node, the reference communication node may determine the connection-target communication node based on at least one of a RSSI, an SNR, an SINR, an error rate, a channel capacity, a providable transmit rate, a variance of the providable transmit rate, and an outage rate.

The step of determining the connection-target communication node includes a step of selecting a type of RAT, and the reference communication node may determine a communication node which provides the selected type of RAT as the connection-target communication node.

The type of RAT may one of a Wi-Fi, an LTE, a 3GPP2, 3GPP, a WiMAX, and an IEEE 802.16m.

In other embodiment of the present invention, in the step of determining the connection-target communication node, the reference communication node may determine a communication node which provides a preset frequency via which the data is transmitted/received as the connection-target communication node.

The step of determining the connection-target communication node further includes a step of inputting an external information for selecting the connection-target communication node, and the reference communication node determines the connection-target communication node based on the external input.

In the step of determining the connection-target communication node, the reference communication node may determine the connection-target communication node based on a channel information use method. In the step of determining the connection-target communication node, the reference communication node may determine the connection-target communication node based on an open-loop transmission. The open-loop transmission may include at least one of a power division transmission, a code division transmission, a space multiplexing, a beam forming, a transmit diversity, an antenna selection, and an antenna set division.

In the step of determining the connection-target communication node, the reference communication node may determine connection-target communication node according to a closed-loop transmission. The closed-loop transmission includes at least one of a DPC, an interference ordering, a pre-coding, and a beam forming.

In the step of determining the connection-target communication node, the reference communication node may determine connection-target communication node based on the space characteristic quality factor. The space characteristic quality factor may include at least one of a cross-correlation among user channels, a cross-correlation among antennas, a rank of a channel matrix, and a channel quality factor for each stream.

The correlation among the user channels may be an index indicating a similarity of a channel characteristic among the user channels. The correlation among the antennas may be an index indicating a similarity of a channel characteristic among channels which are formed by a plurality of antennas if the connection-target communication node uses the plurality of antennas. The rank of the channel matrix may be an index indicating the number of data streams which are independently available for a matrix channel which is formed between the reference communication node and the connection-target communication node. The channel quality factor for each stream may be an index indicating channel quality of each stream corresponding to the number of data streams which are independently available for a matrix channel which is formed between the reference communication node and the connection-target communication node.

The channel quality factor for each stream includes at least one of a RSSI, an SNR, an SINR, an error rate, a channel capacity, a providable transmit rate, a variance of the providable transmit rate, and an outage rate.

In the step of determining the connection-target communication node, the reference communication node may determine connection-target communication node based on the service condition. The service condition may be at least one of a QoS, a traffic class, and a location of the reference communication node, and the QoS may be at least one of a required transmission rate for a required service, a packet loss, and delay. The traffic class may be at least one of a huge file, a voice conversation, a video conversation, a video streaming, a web-browsing, a game.

In the step of determining the connection-target communication node, the reference communication node may determine connection-target communication node based on the user condition. The user condition may be at least one of a cost, a terminal capacity, and a security level.

The terminal capacity may be at least one of the number of antennas, a consumed power, a memory capacity, and a signal processing speed. The security level is a security grade which a user requires, and may be sequentially determined. The access condition includes at least one of an available RAT type, the number of available communication nodes for each RAT, the availability of each communication node, a load condition of each communication node, an access purpose, and an access format.

In the step of determining the communicating antenna, the reference communication node may determine the communicating antenna based on at least one of a moving speed between the reference communication node and the communication node, a channel condition, an external input, a channel information use method, a service condition, a user profile, and an access condition. Each condition has been described above, so a detailed description will be omitted herein.

The antenna element operation mode may be at least one of an element antenna omni-directional mode, an antenna directional mode, an element antenna directional diversity mode, an element antenna directional multiplexing mode, and an element antenna off mode.

In the step of determining the antenna element operation mode, the reference communication node may determine the antenna element operation mode based on at least one of a moving speed between the reference communication node and the communication node, a channel condition, an external nal input, a channel information use method, a service condition, a user profile, and an access condition.

The antenna element operation mode may be determined by controlling at least one of an element antenna on-off state, an element antenna beam pattern, an element antenna transmission/reception scheme for each antenna. The element antenna beam pattern may be determined by controlling at least one of a beam space shape, the number of beam spaces, and a beam space direction.

If there are a plurality of communicating antenna, the control method further includes a step of determining a combined operation mode of an antenna set which consists of the communicating antennas. In the step of determining the combined operation mode of the communicating antenna set, the reference communication node may determine combined operation mode of the communicating antenna set based on at least one of a moving speed between the reference communication node and the communication node, a channel condition, an external input, a channel information use method, a service condition, a user profile, and an access condition.

The combined operation mode of the communicating antenna set may be at least one of a combined omni-directional mode, a combined directional mode, a combined diversity mode, a combined multiplexing mode, a combined diversity-multiplexing hybrid mode, and a combined CDD mode.

In the step of determining the combined operation mode of the communicating antenna set, the reference communication node may determine the combined operation mode of the communicating antenna set by controlling at least one of a combined beam pattern and a combining transmission/reception scheme of the communicating antenna set. The combined beam pattern may be determined by controlling at least one of a shape of a combined beam, the number of combined beams, and a direction of the combined beam.

If there are a plurality of connection-target communication nodes, the plurality of connection-target communication nodes may share at least one of a frequency, time, a code with other connection-target communication node.

Scope of the present invention is defined the appended claims rather than the detailed description. It should be interpreted that meaning and scope of the appended claims and all changes and modifications which are derived from equivalents of the appended claims are included in the scope of the present invention. While the present invention has been shown and described with reference to various embodiments thereof, it will be understood by those skilled in the art that various changes in form and details may be made therein without departing from the spirit and scope of the present invention as defined by the appended claims and their equivalents.

The invention claimed is:

1. A terminal in a telecommunication system, comprising:
an antenna unit configured to equip with at least two antennas; and
a controller configured to determine at least one target communication node among a plurality of communication nodes, to determine at least two transceiving antennas among the at least two antennas, for communicating with each of the at least one target communication node, to determine an antenna element beam pattern for each of the at least two transceiving antennas, to determine a combined operation mode of an antenna set for each of or a part of the at least one target communication node with which the terminal communicates through the antenna set which consists of two or more antennas, and to control transmission/reception of data to/from the at least one target communication node through the at least two transceiving antennas for communicating with each of the at least one target communication node using both the antenna element beam pattern of each of the at least two transceiving antennas and the combined operation mode of the antenna set for each of or a part of the at least one target communication node, wherein the controller determines the at least one target communication node based on at least one of a user profile, an available Radio Access Technology (RAT) type, an access purpose and an access format, determines the at least two transceiving antennas among the at least two antennas based on a channel condition and a service requirement, determines the antenna element beam pattern for each of the at least two transceiving antennas based on the channel condition and at least one of the service requirement, the access condition and a moving speed, and determines the combined operation mode of the antenna set for each of or the part of the at least one target communication node based on the channel condition and the service requirement, wherein the channel condition is a quality factor for determining the channel characteristic between the at least one communication node and the terminal including a multi-antenna situation, and the access condition is an access environmental factor between the at least one communication node and the terminal.

2. The terminal of claim 1, wherein the combined operation mode of the antenna set for each of or the part of the at least one target communication node includes at least two of a combined omni-directional mode, a combined directional mode, a combined diversity mode, a combined multiplexing mode, a combined diversity-multiplexing hybrid mode, and a combined Cyclic Delay Diversity (CDD) mode.

3. The terminal of claim 1, wherein each of the at least two antennas configures a plurality of beam spaces, and wherein the controller determines the antenna element beam pattern of each of the at least two transceiving antennas by activating at least one beam space among the plurality of beam spaces configured to each of the at least two transceiving antennas.

4. The terminal of claim 1, wherein the service requirement includes at least one of a quality of service (QoS) and a traffic class.

5. A control method of a terminal which equips with at least two antennas in a telecommunication system, comprising:

determining at least one target communication node among a plurality of communication nodes based on at least one of a user profile, an available Radio Access Technology (RAT) type, an access purpose and an access format;

determining at least two transceiving antennas among the at least two antennas based on a channel condition and a service requirement;

determining an antenna element beam pattern of each of the at least two transceiving antennas based on the channel condition and at least one of the service requirement, the access condition and a moving speed;

determining a combined operation mode of an antenna set for each of a part or all of the at least one target communication node with which the terminal communicates through the antenna set which consists of two or more antennas based on the channel condition and the service requirement; and transmitting/receiving data to/from the at least one target communication node through the at least two transceiving antennas for communicating with each of the at least one target communication node using both the antenna element beam pattern of each of the at least two transceiving antennas and the combined operation mode of the antenna set for each of or a part of the at least one target communication node, wherein the channel condition is a quality factor for determining the channel characteristic between the at least one communication node and the terminal including a multi-antenna situation, and the access condition is an access environmental factor between the at least one communication node and the terminal.

6. The control method of claim 5, wherein the combined operation mode of the antenna set for each of or the part of the at least one target communication node includes at least two of a combined omni-directional mode, a combined directional mode, a combined diversity mode, a combined multiplexing mode, a combined diversity-multiplexing hybrid mode, and a combined Cyclic Delay Diversity (CDD) mode.

7. The control method of claim 5, wherein each of the at least two antennas configures a plurality of beam spaces, and wherein the controller determines the antenna element beam pattern of each of the at least two transceiving antennas by activating at least one beam space among the plurality of beam spaces configured to each of the at least two transceiving antennas.

8. The control method of claim 5, wherein the service requirement includes at least one of a quality of service (QoS) and a traffic class.

9. A control method of a terminal which equips with at least two antennas for communicating with at least one communication node, comprising:

changing the at least one communication node with which the terminal communicates based on at least one of a user profile, an available Radio Access Technology (RAT) type, an access purpose and an access format;

changing the at least two transceiving antennas among the at least two antennas of the terminal, for communicating with each of the at least one communication node based on a channel condition and a service requirement;

changing an antenna element beam pattern for each of the at least two transceiving antennas based on the channel condition and at least one of the service requirement, the access condition and a moving speed;

changing a combined operation mode of an antenna set for each of a part or all of the at least one communication node with which the terminal communicates through the antenna set which consists of two or more antennas based on the channel condition and the service requirement; and changing a common use configuration of a part or all of the at least two transceiving antennas for the part or all of the at least one communication node, or changing a sharing configuration of a part or all of resource for the part or all of the at least one communication node; and transmitting/receiving data to/from at least one communication node through the at least two transceiving antennas for communicating with each of at least one communication node using both the antenna element beam pattern of each of the at least two transceiving antennas and the combined operation mode of the antenna set for each of or a part of the at least one communication node, wherein the channel condition is a quality factor for determining the channel characteristic between the at least one communication node and the terminal including a multi-antenna situation, and the access condition is an access environmental factor between the at least one communication node and the terminal.

10. The control method of claim 9, wherein each of the at least two antennas configures a plurality of beam spaces, and
wherein the controller determines the antenna element beam pattern of each of the at least two transceiving antennas by activating at least one beam space among the plurality of beam spaces configured to each of the at least two transceiving antennas.

11. The control method of claim 9, wherein the service requirement includes at least one of a quality of service (QoS) and a traffic class.

12. A terminal for communicating with at least one communication node, comprising:
an antenna unit configured to equip with at least two antennas; and
a controller configured to change the at least one communication node with which the terminal communicates, wherein the controller is further configured to change at least one of:
an antenna element beam pattern of each of the at least two transceiving antennas among the at least two antennas of the terminal, the at least two transceiving antennas among the at least two antennas, for communicating with each of the at least one communication node,
a combined operation mode of an antenna set for each of a part or all of the at least one communication node with which the terminal communicates through the antenna set which consists of two or more antennas, and
a common use configuration of a part or all of the at least two transceiving antennas for the part or all of the at least one communication node, or a sharing configuration of a part or all of resource for the part or all of the at least one communication node, and configured to transmit/receive data to/from at least one communication node through the at least two transceiving antennas for communicating with each of at least one communication node using both the antenna element beam pattern of each of the at least two transceiving antennas and the combined operation mode of the antenna set for each of or a part of the at least one communication node,
wherein the controller changes the at least one target communication node based on at least one of a user profile, an available Radio Access Technology (RAT) type, an access purpose and an access format, changes the at least two transceiving antennas among the at least two antennas based on a channel condition and a service requirement, changes the antenna element beam pattern for each of the at least two transceiving antennas based on the channel condition and at least one of the service requirement, the access condition and a moving speed, and changes the combined operation mode of the antenna set for each of the at least one target communication node based on the channel condition and the service requirement,
wherein the channel condition is a quality factor for determining the channel characteristic between the at least one communication node and the terminal including a multi-antenna situation, and the access condition is an access environmental factor between the at least one communication node and the terminal.

13. The terminal of claim 12,
wherein each of the at least two antennas configures a plurality of beam spaces, and
wherein the controller determines the antenna element beam pattern of each of the at least two transceiving antennas by activating at least one beam space among the plurality of beam spaces configured to each of the at least two transceiving antennas.

14. The terminal of claim 12, wherein the service requirement includes at least one of a quality of service (QoS) and a traffic class.

* * * * *